US011240184B2

(12) United States Patent
Manning et al.

(10) Patent No.: US 11,240,184 B2
(45) Date of Patent: *Feb. 1, 2022

(54) INTERACTION DRIVEN ARTIFICIAL INTELLIGENCE SYSTEM AND USES FOR SAME, INCLUDING PRESENTATION THROUGH PORTIONS OF WEB PAGES

(71) Applicant: REALPAGE INC., Richardson, TX (US)

(72) Inventors: Dorian Lowell Thomas Manning, Austin, TX (US); Terrell B. Jones, Incline Village, NV (US); Kyle W. Kothe, Austin, TX (US)

(73) Assignee: REALPAGE, INC., Richardson, TX (US)

( * ) Notice: Subject to any disclaimer, the term of this patent is extended or adjusted under 35 U.S.C. 154(b) by 854 days.

This patent is subject to a terminal disclaimer.

(21) Appl. No.: 16/015,112

(22) Filed: Jun. 21, 2018

(65) Prior Publication Data

US 2018/0375806 A1    Dec. 27, 2018

Related U.S. Application Data

(60) Provisional application No. 62/523,936, filed on Jun. 23, 2017, provisional application No. 62/523,934, filed on Jun. 23, 2017.

(51) Int. Cl.
*H04L 12/00* (2006.01)
*H04L 12/58* (2006.01)
(Continued)

(52) U.S. Cl.
CPC ........ *H04L 51/046* (2013.01); *G06F 16/9535* (2019.01); *G06F 16/9566* (2019.01);
(Continued)

(58) Field of Classification Search
CPC .. G06F 16/9566; G06F 16/9535; G06F 40/40; G06F 9/451; G06F 40/295;
(Continued)

(56) References Cited

U.S. PATENT DOCUMENTS 6,073,127 A * 6/2000 Lannert .................... G09B 7/04
706/45
6,904,423 B1    6/2005 Nicolaou
(Continued)

FOREIGN PATENT DOCUMENTS

| WO | WO 2005013152 | 2/2005 |
| WO | WO 2008109781 | 9/2008 |
| WO | WO 2017151899 | 9/2017 |

OTHER PUBLICATIONS

Kaplan, How Location Will Impact the Weather Company's Voice-Activated Watson Ads, GeoMarketing.com, Jun. 2, 2016, 6 pages.
(Continued)

*Primary Examiner* — Frantz Coby
(74) *Attorney, Agent, or Firm* — Haynes and Boone, LLP

(57) ABSTRACT

Artificial intelligence systems utilizing a chat driven interface that includes a chat portion and a display portion are disclosed. The user may interact with the chat portion of the interface in a human understandable and comfortable manner (e.g., through natural language). The artificial intelligence system uses the context of the interactions in the chat potion of the interface to drive the presentation of content in the display portion interface and the chat portion of the such that the content presented in the display portion of the interface reflects the intents or concepts expressed in the chat portion of the interface and the chat portion and the display portion of the interface are kept in synchronicity.

18 Claims, 17 Drawing Sheets

(51) Int. Cl.

| | | |
|---|---|---|
| H04L 29/08 | (2006.01) | |
| G06N 5/02 | (2006.01) | |
| G06F 16/955 | (2019.01) | |
| G06F 16/9535 | (2019.01) | |
| G06N 5/04 | (2006.01) | |
| G06N 3/00 | (2006.01) | |
| G06F 40/30 | (2020.01) | |
| G06F 40/295 | (2020.01) | |
| G06N 20/00 | (2019.01) | |
| G06F 3/0481 | (2013.01) | |
| G06F 9/451 | (2018.01) | |
| G06F 40/40 | (2020.01) | |
| G06Q 50/14 | (2012.01) | |

(52) U.S. Cl.
CPC ............ *G06F 40/295* (2020.01); *G06F 40/30* (2020.01); *G06N 3/006* (2013.01); *G06N 5/02* (2013.01); *G06N 5/022* (2013.01); *G06N 5/025* (2013.01); *G06N 5/046* (2013.01); *G06N 20/00* (2019.01); *H04L 51/02* (2013.01); *H04L 67/02* (2013.01); *H04L 67/146* (2013.01); *H04L 67/20* (2013.01); *G06F 3/0481* (2013.01); *G06F 9/451* (2018.02); *G06F 40/40* (2020.01); *G06Q 50/14* (2013.01)

(58) Field of Classification Search
CPC ....... G06F 3/0481; G06F 40/30; G06N 3/006; G06N 5/022; G06N 20/00; G06N 5/02; G06N 5/046; G06N 5/025; H04L 67/146; H04L 67/20; H04L 51/02; H04L 67/02; H04L 51/046; G06Q 50/14
USPC ............................ 706/11; 709/204, 206, 207
See application file for complete search history.

(56) References Cited

U.S. PATENT DOCUMENTS

| | | | |
|---|---|---|---|
| 7,027,974 B1 | 4/2006 | Busch | |
| 7,299,180 B2 | 11/2007 | Wang | |
| 7,716,571 B2 | 5/2010 | Tien | |
| 8,214,433 B2 | 7/2012 | Dawson et al. | |
| 8,626,836 B2 | 1/2014 | Dawson et al. | |
| 8,639,638 B2* | 1/2014 | Shae | G06F 16/332 706/11 |
| 8,738,739 B2* | 5/2014 | Makar | G06Q 30/02 709/219 |
| 8,818,926 B2* | 8/2014 | Wallace | G06Q 30/02 706/47 |
| 8,949,377 B2* | 2/2015 | Makar | G06F 16/9535 709/219 |
| 9,009,085 B2 | 4/2015 | Boyle et al. | |
| 9,020,841 B2 | 4/2015 | Akolkar et al. | |
| 9,077,749 B2 | 7/2015 | Guo et al. | |
| 9,213,940 B2 | 12/2015 | Beilby et al. | |
| 9,369,410 B2* | 6/2016 | Capper | H04L 51/02 |
| 9,794,199 B2 | 10/2017 | Capper et al. | |
| 9,886,501 B2 | 2/2018 | Krishnamurthy et al. | |
| 9,892,192 B2 | 2/2018 | Chandrasekaran et al. | |
| 10,872,125 B2* | 12/2020 | Pan | G06F 40/295 |
| 10,997,259 B2* | 5/2021 | Stillwell, Jr. | G06F 40/20 |
| 2001/0047346 A1* | 11/2001 | Liu | G06F 40/284 706/13 |
| 2001/0053968 A1 | 12/2001 | Galitsky | |
| 2003/0200077 A1 | 10/2003 | Leacock | |
| 2005/0144324 A1 | 6/2005 | George et al. | |
| 2007/0271256 A1 | 11/2007 | Chang et al. | |
| 2008/0281915 A1 | 11/2008 | Elad | |
| 2009/0037509 A1 | 2/2009 | Parekh | |
| 2009/0076987 A1 | 3/2009 | Chmura | |
| 2009/0176198 A1 | 7/2009 | Fife | |
| 2009/0245500 A1* | 10/2009 | Wampler | H04M 3/5191 379/265.09 |
| 2010/0036783 A1 | 2/2010 | Rodriguez | |
| 2010/0049708 A1 | 2/2010 | Kawai | |
| 2010/0262606 A1 | 10/2010 | Bedolla | |
| 2012/0233188 A1 | 9/2012 | Majumdar | |
| 2013/0086191 A1* | 4/2013 | Slotznick | G06Q 10/107 709/206 |
| 2014/0074826 A1 | 3/2014 | Cooper | |
| 2014/0122495 A1 | 5/2014 | Kawai | |
| 2014/0279050 A1* | 9/2014 | Makar | G06F 16/9535 705/14.66 |
| 2015/0088598 A1 | 3/2015 | Acharyya et al. | |
| 2015/0168150 A1 | 6/2015 | Kahn et al. | |
| 2015/0371632 A1 | 12/2015 | Skobeltsyn | |
| 2015/0379228 A1 | 12/2015 | Seward | |
| 2016/0203130 A1 | 7/2016 | Roque | |
| 2016/0210351 A1 | 7/2016 | Krauss | |
| 2016/0379106 A1* | 12/2016 | Qi | G06F 40/295 706/11 |
| 2017/0098269 A1* | 4/2017 | Kim | H04L 51/046 |
| 2017/0109655 A1 | 4/2017 | Miyazaki | |
| 2017/0201851 A1 | 7/2017 | Huang | |
| 2017/0213131 A1 | 7/2017 | Hammond | |
| 2017/0242886 A1 | 8/2017 | Jolley et al. | |
| 2017/0293609 A1 | 10/2017 | Seow et al. | |
| 2018/0183735 A1* | 6/2018 | Naydenov | G06N 3/006 |
| 2018/0211259 A1* | 7/2018 | Vu | G06Q 10/087 |
| 2018/0232741 A1* | 8/2018 | Jadhav | H04L 51/04 |
| 2018/0285413 A1* | 10/2018 | Vora | G06N 5/041 |
| 2018/0375804 A1* | 12/2018 | Stillwell, Jr. | G06F 16/9566 |
| 2019/0108285 A1 | 4/2019 | Stillwell et al. | |
| 2019/0108286 A1 | 4/2019 | Pan et al. | |

OTHER PUBLICATIONS

Kaplan, The Future of Car Talk: The Weather Company Runs First 'Cognitive Ads' for Toyota, GeoMarketing.com, Jun. 15, 2017, 7 pages.

AlchemyLanguage, IBM, retrieved from https://www.ibm.com/watson/developercloud/alchemy-language.html, 1 page.

Yuan, The Conversational Chatbox Design Challenge, developerWorks: Learn: Cognitive Computing, IBM, Aug. 15, 2016, retrieved from https://www.ibm.com/developerworks/library/cc-cognitive-chatbot-conversational-design/index.html, 5 pages.

Young, How Staples is Making Customer Service "Easy" with Watson Conversation, AI for the Enterprise, IBM, Feb. 10, 2017, retrieved from https://www.ibm.com/blogs/watson/2017/02/staples-making-customer-service-easy-watson-conversation/, 3 pages.

IBM, How Conversation (with Context) Will Usher in the AI Future, retrieved from https://www.ibm.com/watson/advantage-reports/future-of-artificial-intelligence/ai-conversation.html, 6 pages.

Bridgwater, Come Fly with AI, IBM Cloud Builds 'Chatbot' Virtual Travel Agent, Forbes, Nov. 22, 2016, retrieved from https://www.forbes.com/sites/adrianbridgwater/2016/11/22/come-fly-with-ai-ibm-cloud-builds-chatbot-virtual-travel-agent/#67e55c6d4813, 4 pages.

Elder, IBM Launches Watson-Powered Advertising Services, Business Insider, Sep. 28, 2016, retrieved from http://www.businessinsider.com/ibm-rolls-out-advertising-campaign-powered-by-artificial-intelligence-2016-9, 4 pages.

Royal Cyber, Act on Your Intelligence with AI & Chatbot with IBM Watson, RoyalCyber.com Blog, retrieved from http://blog.royalcyber.com/artificial-intelligence/act-on-your-intelligence-with-ai-chatbot-with-ibm-watson/, 2 pages.

Terekhova, IBM Helps Launch Insurance Chatbot, Business Insider, Jun. 8, 2017, retrieved from http://www.businessinsider.com/ibm-helps-launch-insurance-chatbot-2017-6, 3 pages.

Gion, VivaTech 2017: IBM Watson Conversational Solutions, LinkedIn SlideShare, Jun. 28, 2017, retrieved from https://www.slideshare.net/AlexisGion/vivatech-2017-ibm-watson-conversational-solutions, 5 pages.

Notice of Allowance for U.S. Appl. No. 16/150,954, dated Dec. 24, 2020, 17 pgs.

(56) References Cited

OTHER PUBLICATIONS

Office Action for U.S. Appl. No. 16/109,510, dated Jan. 7, 2021, 29 pgs.
Office Action for U.S. Appl. No. 16/109,510, dated May 8, 2020, 29 pgs.
Ditty Matthew, Dhivya Eswaran, Sutanu Chakraborti, Towards Creating Pedagogic Views form Encyclopedic Resources, Jun. 4, 2015, Department of Computer Science and Engineering Indian Institute of Technology Madras, 2015, pp. 190-195.
Office Action for U.S. Appl. No. 16/150,954, dated Aug. 7, 2020, 13 pgs.
Notice of Allowance for U.S. Appl. No. 16/150,975, dated Aug. 11, 2020, 6 pgs.

* cited by examiner

INTERACTION DRIVEN ARTIFICIAL INTELLIGENCE SYSTEM AND USES FOR SAME, INCLUDING PRESENTATION THROUGH PORTIONS OF WEB PAGES

RELATED APPLICATION(S)

This application claims a benefit of priority under 35 U.S.C. § 119(e) from U.S. Provisional Patent Application No. 62/523,934 by inventors Stillwell et al., entitled "Interaction Driven Artificial Intelligence System and Uses For Same, Including Travel Related Contexts" and U.S. Provisional Patent Application No. 62/523,936 by inventors Kothe et al., entitled "Interaction Driven Artificial Intelligence System and Uses For Same, Including Presentation Through Portions of Web Pages and Travel Related Contexts," both filed on Jun. 23, 2017. The entire contents of the above referenced applications are hereby fully incorporated by reference herein for all purposes.

TECHNICAL FIELD

This disclosure relates generally to chat driven artificial intelligence systems that may be utilized and distributed across a computer network environment. Specifically, embodiments disclosed herein relate to chat driven artificial intelligence systems that utilize multi-faceted interfaces that include a chat portion driving the facets of the interface. Even more particularly, this disclosure relates to historically aware chat driven artificial intelligence systems that utilize sophisticated and redundant natural language processing and data discovery to provide a chat driven interface that may be usefully applied in a variety of contexts, including travel related or real estate related context. Additionally, this disclosure relates to historically aware chat driven artificial intelligence systems that utilize natural language processing and data discovery to provide a travel or real estate related chat driven interface in a display container on a third party web site.

BACKGROUND

Despite the amount of information available in today's Internet environment, a number of problems exist. One of the most significant problems is how to locate and correlate data of interest that may be available at a single web site or distributed across a number of disparate web sites. In fact, in many cases the greater the amount of information available, the greater the difficulty in locating and correlating such information. These problems are exacerbated because, in many instances, web sites pertinent to a given context may be siloed with respect to their functionality or information and offer limited static searching interfaces. Thus, while it may be desirable to a user of such web sites to correlate information available at one web site with information available at another web site there is no way to accomplish such correlation that does not involve the manual location of data of interest and the tracking and correlation of such data across web sites by the user himself.

Within certain contexts such as travel or real-estate these problems may be particular prevalent and persistent, in no small part because of the historical development and current state of the Internet environment with respect to these contexts. As but one example, the travel industry has grown significantly over the past two decades. Despite the rise of the Internet and Internet based commerce over that same time period, travel service providers (e.g., airlines, hotels, rental car companies, tour providers, etc.) were relatively slow to migrate their offerings online. Though the travel service providers did eventually establish online presences, almost universally these travel service provider web sites function in the same manner. The web site provides an interface by which a traveler may provide a set of static itinerary data such as dates, point of origin, destination and number of travelers. The travel service provider web site then provides a listing of services corresponding to the traveler provided static data, such as a listing of available flights or hotel rooms.

With the proliferation of travel service providers, however, came a number of problems. Foremost among these problems was the amount of data that was now available to travelers. Specifically, travelers now could obtain travel service offerings through a large number of atomic web sites. So, for example, to obtain information on flights to a destination, a traveler would visit the web sites for each airline and obtain travel offerings (if any) for their particular itinerary. As there are literally thousands of airlines operating worldwide, it can be imagined what a herculean task it is to not only obtain this travel services data from each individual web site but, additionally, to compare the various travel service data amongst the various airlines. The same problems hold true almost no matter the type of travel service being provided.

To attempt to mitigate some of the issues with the myriad number of travel services, certain intermediary or aggregator web sites (e.g., Expedia, Hotwire, Travelocity, Kayak, etc.) have arisen. Essentially these sites functions as search aggregators, allowing travelers to search multiple independent travel service providers from a single site. The basic functionality of these aggregator sites is, however, still unchanged from the brute force methods of yore; the user must specify a set of static itinerary data through the interface of the search aggregator. The intermediary aggregator site, in turn, searches the data of each of the independent travel service providers for corresponding travel services associated with the traveler's static itinerary data and returns these results to the traveler through the intermediary site.

These intermediary aggregator sites have thus not alleviated the problems inherent in the implementation of travel service related web sites. This is the case at least because it cannot be sure that all the travel service related web sites are being searched by these intermediary sites, and because these intermediary sites are usually specific to one aspect of travel service (e.g., flights, hotels, etc.), or are only capable of searching one aspect at a time. Travelers must therefore still deal with the prospect of searching and vetting a large amount of travel service data from a variety of travel related web sites.

More importantly, however, a bigger problem remains: all of these travel related sites function in the same basic manner. A traveler must enter static itinerary data and the travel related web site returns travel services specific to that static data. These travel services related sites provide no insight to the user; they only return travel service options related to what the user already knows (e.g., their destination).

This situation compounds the already difficult problem of travel planning. The traveler must first determine such things as their intended destination before making these plans. Such determinations are not straightforward: often time the traveler has an idea or thoughts about what type of travel he would like to make, without any concrete destination in mind. The traveler must then engage in preliminary research even to determine their itinerary before engaging with the travel service related web sites. Given the number and variety of general travel related web sites, this is often a daunting and time consuming task.

While the travel related context serves as a particularly germane example of the problems of knowledge location or amalgamation, it will be understood that similar problems manifest in multiple contexts in the Internet world. As yet another example, in the real-estate related context it may be difficult to glean insight into real-estate or the real-estate market given the limited functionality of real-estate related web sites. Moreover, as real-estate is not a fungible good or service, the ability to obtain or correlate data on real-estate that is specific and pertinent to a particular user may be especially difficult.

What is desired, therefore, are systems that may dynamically provide personalized and insightful knowledge, including such systems that may be usefully applied in particular contexts, including for example, a travel related or real-estate related context. Additionally, what is desired are systems and methods for the distribution of such personalized and insightful knowledge through a variety of channels.

SUMMARY

To those ends, among others, attention is now directed to the artificial intelligence systems disclosed herein. These artificial intelligence systems may utilize a chat driven interface that includes a chat portion and a display portion. The user may interact with the chat portion of the interface in a human understandable and comfortable manner (e.g., through natural language). The artificial intelligence system uses the context of the interactions in the chat potion of the interface to drive the presentation of content in the display portion of the interface such that the content presented in the display portion of the interface reflects the intents or concepts expressed in the chat portion of the interface (e.g., in the last interaction, or historically in previous interactions).

Specifically, according to embodiments, a user's current interaction with the chat portion of the display may be evaluated in association with the context of historical interactions to determine user preferences, including intents or concepts expressed by the user during the current, or previous, chat sessions. Using these user preferences, relevant content can be determined to present to the user through the display portion of the interface along with a relevant response interaction to present through the chat portion of the interface. The chat portion of the interface and the display portion of the interface are thus kept in synchronicity.

Additionally, and importantly, the content determined for presentation to the user in the display area is based on the user's intents or concepts expressed in a natural, human understandable manner (even those which may not be directly expressed by the user), not (solely) on static data provided by the user. Accordingly, the content presented to the user in the display portion of the interface may include content providing insights, alternatives, supplemental information or additional data of which the user was previously unaware at the outset of their interaction. The content displayed can be also be refined in an ongoing manner based on the concepts or intents expressed in a human understandable and comfortable manner by the user in the chat portion of the display. This type of interaction may enable a level of trust with users. In this manner certain tasks, such as those involved in travel planning or the like, may be reduced and even, in some instance, made enjoyable.

Moreover, using embodiments of these artificial intelligence systems a chat driven interface that includes a chat portion and a display portion may be distributed through a variety of channels. In particular, the chat driven interface may be presented in a display container (or unit) on a third party web page or proprietary web site or application alongside content provided by the third party web site. The display container may be of the size typically used to display a web based advertisement such as a 600×300 size container (often referred to as an ad container or ad unit). The chat driven artificial intelligence system may utilize the context of the third party web site, including for example, the entities (including concepts) and destinations expressed in or derived from the content of the third party web page or site to initialize and drive the chat driven interface.

In certain embodiments, the context of the web page or site on which the chat driven interface is presented may be used to select content from an advertiser to present in the display portion of the chat driven interface presented through such a container based chat driven interface. The advertiser content selected may be associated with the context of the third party web page or site and, additionally, may be refined through the user's natural language interaction with the chat portion of the chat driven interface. Thus, the initial state of the chat driven interface (based on the context of the third party web page or site in which it is presented) serves to attract the user's attention initially as it is related to the context of the content they be actively seeking on the third party web page. The artificial intelligence system may subsequently use the context of the interactions in the chat potion of the interface to drive the presentation of content in the display portion of the interface such that the content presented in the display portion of the interface reflects the concepts or destinations expressed by the user in the chat portion of the interface. To further enhance the suitability of such content, the context may also be used in association with other data such as the user's historical data (e.g., past interactions with the artificial intelligence system) or other aspects of the user's online presence.

Embodiments of the chat driven interface as presented may thus improve the efficiency of using a computing device by bringing together disparate data that may typically be accessed independently accessed (if at all) in disparate location into a chat driven interface which can be accessed directly in a single interface, whereby displaying selected data of interest in the display portion of the interface allows the user to see the most relevant data without having to navigate between sites, windows or separate interfaces. Accordingly, the speed of a user's navigation through various views and windows can be improved because embodiments of the chat driven interfaces as presented herein saves the user from navigating to the required sites, opening them up, and then navigating within those sites to enable the data of interest to be seen. Rather than paging through multiple screens or navigating around multiple web sites and manually correlating data of interest between these web sites, interactions with only a single chat driven interface may be needed to access desired data.

In one embodiment, a chat driven artificial intelligence system, may initialize a chat system widget executing on the user device in a display container on a third party web page, by receiving a first request from the chat system widget at the user's device including an identifier associated with the chat system widget and determining a first concept associated with the third party web page. Based on the identifier associated with the chat system widget, a data service to call can be determined and a request sent to the determined data service, the request including the first concept associated with the third party web page. Content related to this first concept can be received from the data service. Additionally, an initial interaction based on the identifier for the chat system widget may be determined. A response is formed to the chat system widget including the first content related to the concept and the initial interaction; and the response returned to the chat system widget at the user device to be rendered at the users device in a chat driven interface displayed in the display container in the third party web page at the user device by presenting the initial interaction in a chat portion of the chat driven interface and the first content in the display portion of the chat driven interface such that the first content is presented in the display portion of the chat interface.

In one embodiment, a second request can be received from the chat system widget at the user device, the request including a current interaction entered by a user in a chat portion of the chat driven interface displayed at the user device. The chat system retrieves a session associated with the user, wherein the session includes one or more previous frames associated with previous user interactions with the chat portion of the chat driven interface in a current session and creates a working frame including one or more intents and one or more concepts expressed in the previous user interactions and included in the one or more previous frames associated with previous user interactions.

Embodiments of the chat system can then send a request to a natural language processing extraction service, wherein the request includes the current interaction, and receive a response from the natural language processing extraction service including a determined intent and a determined concept. The determined intent and the one or more intents in the previous frames can be evaluated to determine a canonical intent for the working frame. The determined concept and the one or more concepts included in the previous frames can be evaluated to determine a canonical concept for the working frame. Based on the canonical intent determined for the working frame the chat system can determine a data service to call and send a request to the determined data service including the canonical concept determined for the working frame. Content related to the canonical concept can be received from the data service and a set of follow-up rules applied to the current interaction and the previous interaction to determine a follow-up interaction.

The chat system can then form a response to the chat system widget including the content related to the canonical concept and the follow-up interaction and return the response to the chat system widget at the user device, to be rendered at the users device in the chat driven interface displayed at the user device by presenting the follow-up interaction in the chat portion of the interface and the content in the display portion of the interface such that the content presented in the display portion of the interface is synchronized with an intent or concept expressed in the chat portion of the interface.

In certain embodiments, the chat system widget was provided to the user's device in response to a request to a distribution network from the user's device, the distribution network distinct from the chat driven artificial intelligence system.

In some embodiments, the concept associated with the third party web page was included in the request and was determined at the user device by the chat system widget from one or more tags included in association with the third party web page or the display container on the third party web page.

In other embodiments, the concept was determined from a site index at the chat driven artificial intelligence system by determining a URL associated with the third party web page from the received request; and accessing the site index at the chat driven artificial intelligence system with the URL to determine the concept associated with the third party web page.

In some embodiments, the session includes one or more historical sessions conducted between the chat system and the user.

In an embodiment, the data service is queried based on a geographical region extracted from the current interaction or a previous user interaction with the chat portion of the chat based interface.

In a particular embodiment, the chat driven interface is presented in a third party publisher's web site.

In one specific embodiment, the chat system widget is executing on a third party's platform.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

Figure 1A:
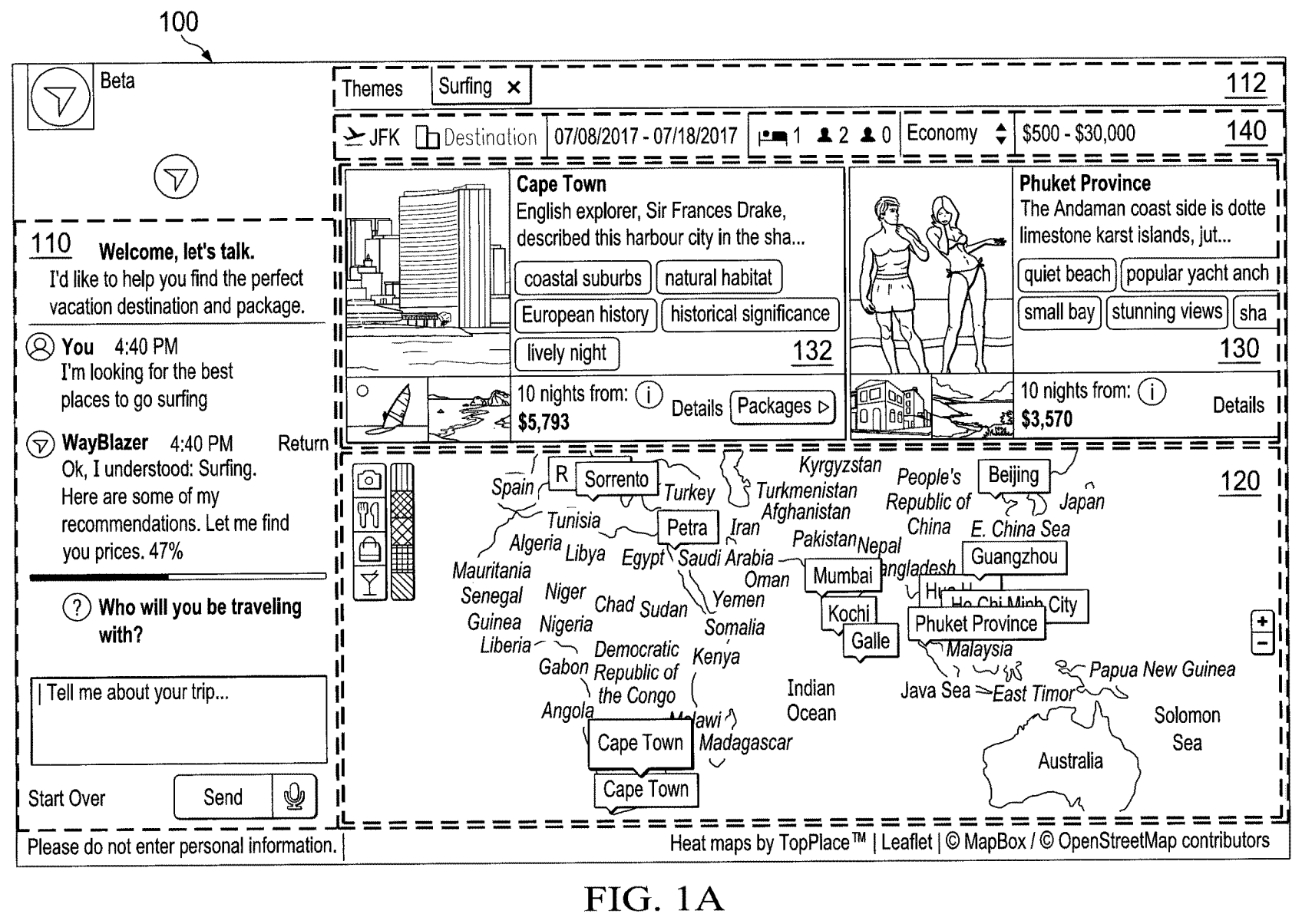
Figure 1B:
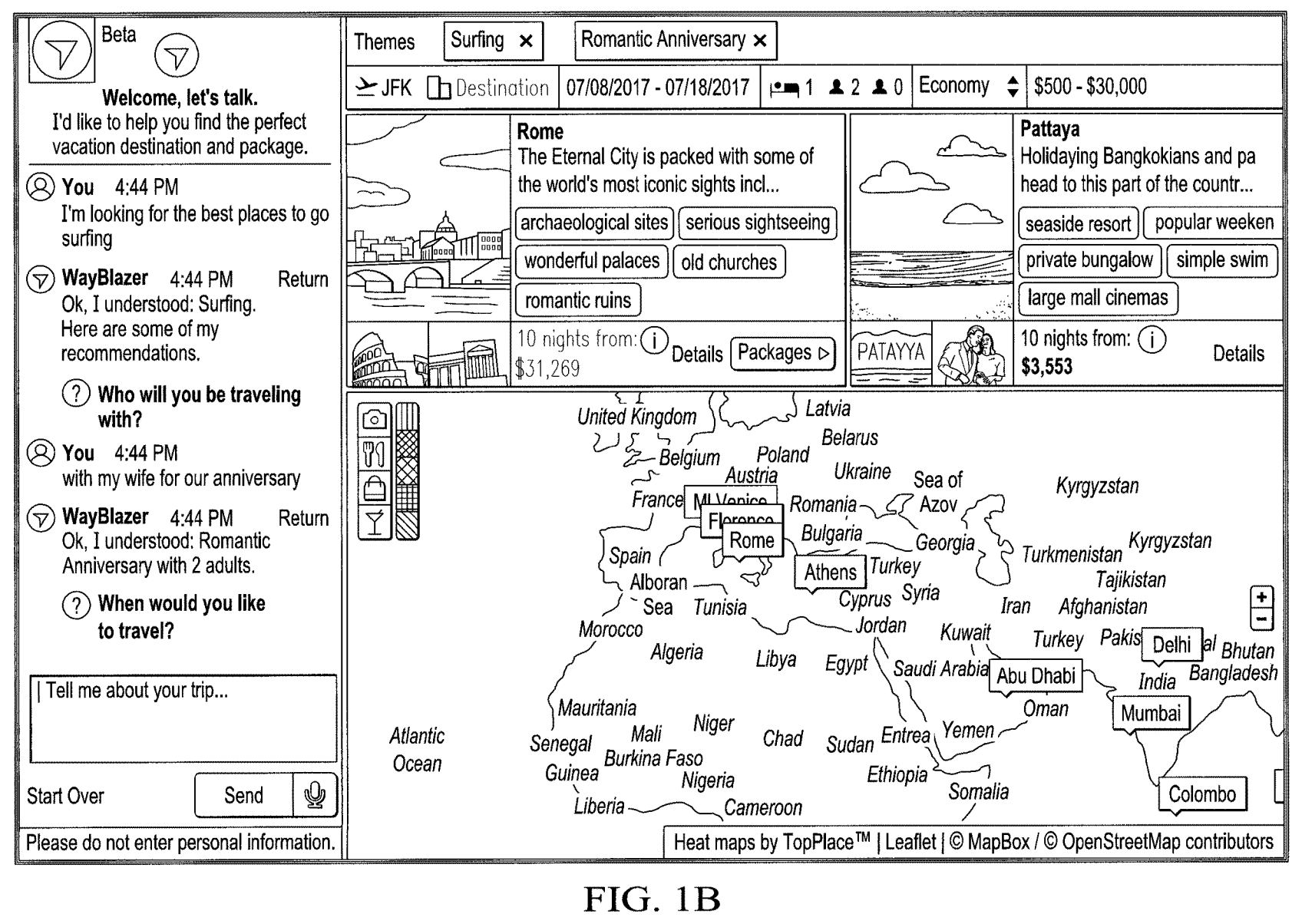
Figure 1C:
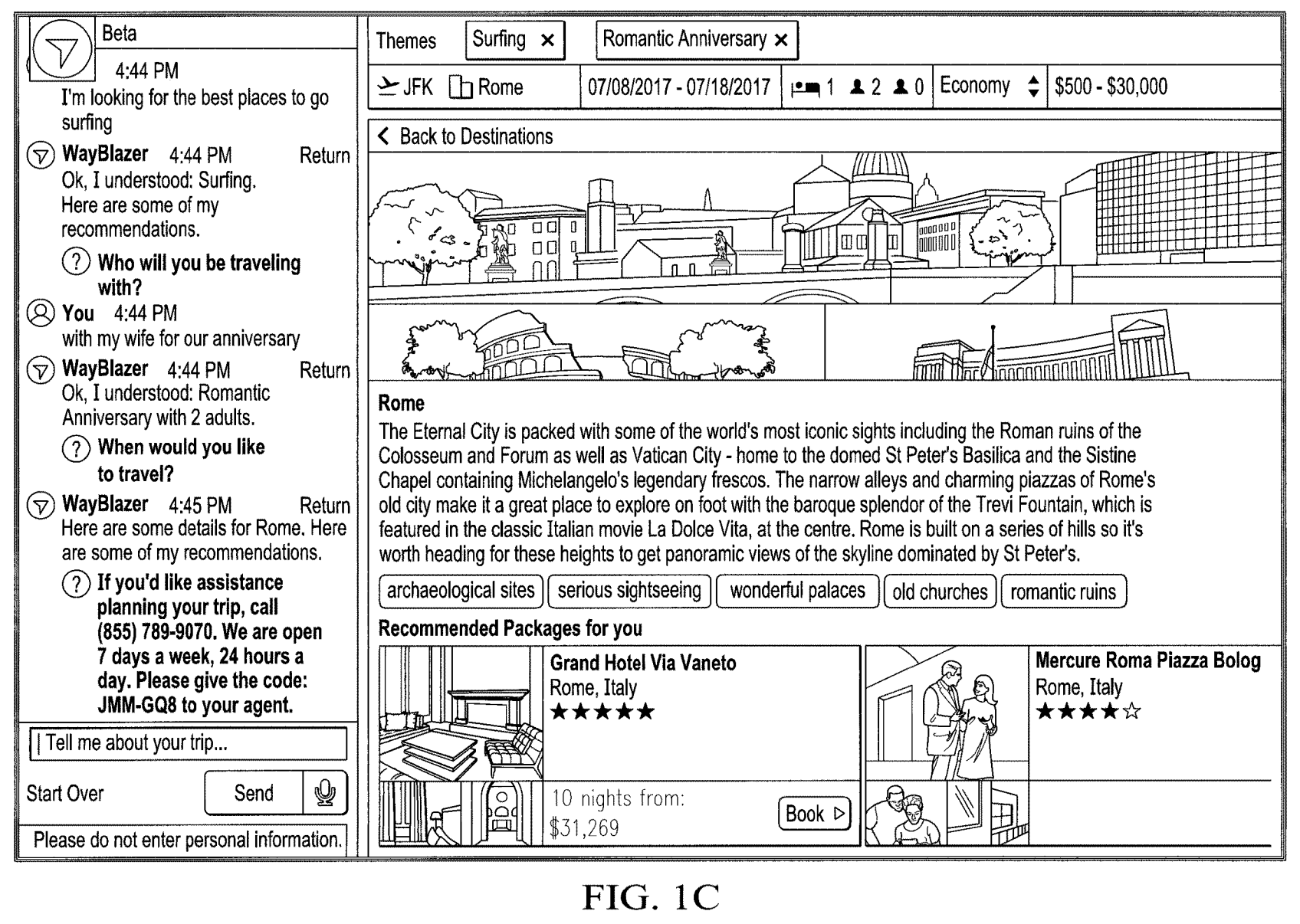

FIGS. 1A-1J are depictions of embodiments of an interface for use with embodiments of a chat driven artificial intelligence service used in a travel related context.

DETAILED DESCRIPTION

Figure 1D:
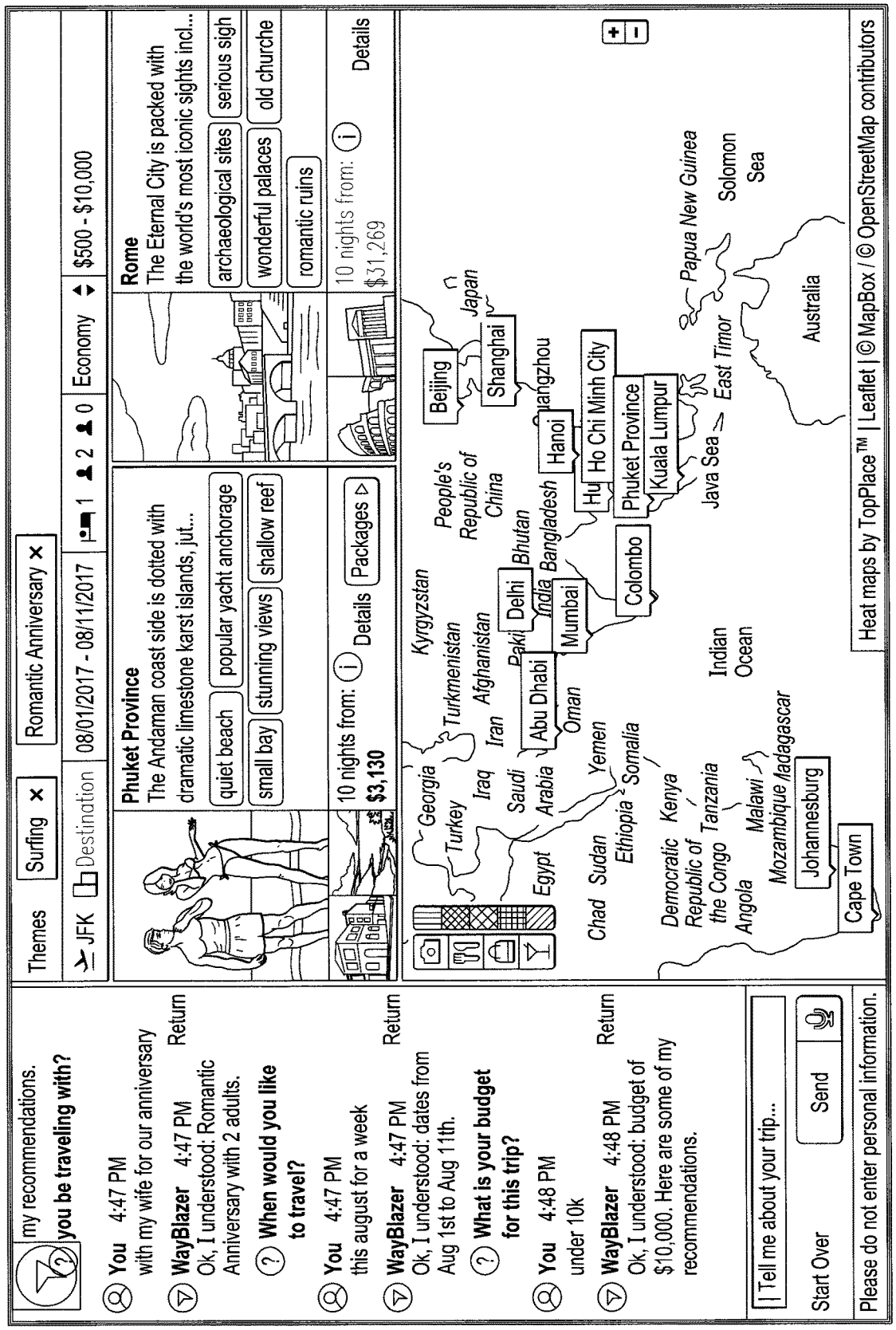

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail a brief description of the context in which embodiments can be utilized may be helpful. As mentioned above, a significant problem in today's Internet environment is how to locate and correlate data of interest that may be available at a single web site or distributed across a number of disparate web sites. These problems may be particularly pernicious as web sites pertinent to a given context may be siloed with respect to their functionality or information, and offer limited static searching interfaces. As an example of but one manifestation of such problems, in the travel related context travelers must usually determine such things as their intended destination or lodging before making travel plans. Such determinations are not straightforward: often time the traveler has an idea or thoughts about what type of travel he would like to make, without any concrete destination or lodgings in mind. The traveler must then engage in preliminary research even to determine their itinerary before engaging with the travel service related web sites. Similarly, in the context of real-estate, a tenant or purchaser may need to engage in a large amount of research regarding lodgings for rent or sale, prices, geographical areas, schools, or other pertinent topics before engaging with real estate web sites. Given the number and variety of general travel related or real-estate related web sites these are often daunting and time consuming tasks.

What is desired, therefore, are systems that may dynamically provide personalized and insightful knowledge, including such systems that may be usefully applied in a variety of contexts, including, for example, travel or real-estate related contexts.

To those ends, among others, attention is now directed to the artificial intelligence systems disclosed herein. These artificial intelligence systems may utilize a chat driven interface that includes a chat portion and a display portion. The user may interact with the chat portion of the interface in a human understandable and comfortable manner (e.g., through natural language). The artificial intelligence system uses the context of the interactions in the chat potion of the interface to drive the presentation of content in the display portion of the interface such that the content presented in the display portion of the interface reflects the intents or concepts expressed in the chat portion of the interface (e.g., in the last interaction, or historically in previous interactions). The display container may be of the size typically used to display a web based advertisement such as a 600×300 (or other) size container (often referred to as an ad container or ad unit). The chat driven artificial intelligence system may utilize the context of the third party web site, including for example, the entities (including concepts) and destinations expressed in or derived from the content of the third party web page or site to initialize and drive the chat driven interface.

Specifically, according to embodiments, a user's current interaction with the chat portion of the display may be evaluated in association with the context of historical interactions to determine user preferences, including intents or concepts expressed by the user during the current, or previous, chat sessions. Using these user preferences, relevant content can be determined to present to the user through the display portion of the interface along with a relevant response interaction to present through the chat portion of the interface. The chat portion of the interface and the display portion of the interface are thus kept in synchronicity.

Additionally, and importantly, the content determined for presentation to the user in the display area of the interface is based on the user's intents or concepts expressed in a natural, human understandable manner (even those which may not be directly expressed by the user), not (solely) on static data provided by the user. Accordingly, the content presented to the user in the display portion of the interface may include content providing insights, alternatives, supplemental information or additional data of which the user was previously unaware at the outset of their interaction. The content displayed can also be refined in an ongoing manner based on the concepts or intents expressed in a human understandable and comfortable manner by the user in the chat portion of the display.

Before delving into more details regarding the implementations of specific embodiments, it will be helpful here to now discuss embodiments of an interface for such a chat driven artificial intelligence system that may be usefully applied in the context of travel. Referring first then to FIGS. 1A-1D, embodiments of an interface for a travel related chat driven artificial intelligence system are depicted. For example in FIG. 1A, interface 100 may include a chat portion or area 110 and a display area 112. The user interacts with the chat driven artificial intelligence system through the chat area 110. In particular, a human understandable natural language conversation may occur in the chat area 110 such that the user may iteratively provide an interaction and the chat driven artificial intelligence system may provide an interaction prompt or a response interaction. These interactions can be exchanged between the user and the chat driven artificial intelligence system in the chat area 110.

The interactions taking place in the chat area 110 drive the display of content in display area 112 such that the display area 112 is maintained in synchronicity with the user's preferences as expressed (either explicitly or inherently) through the interactions in the chat area 110. In this embodiment, utilized with a travel related chat driven artificial intelligence system, the display area 112 includes a map area 120 and a card display area 130. The map area 120 displays a geographic area or one or more location points (e.g., destinations) associated with the user preferences expressed through interactions with the chat area 110, while the card display area 130 may display a number of display objects (i.e., "cards"), where each of the cards presents content associated with a particular entity (e.g., destination, flight, hotel, travel packages, etc.) associated with the user preferences expressed though interactions with the chat area 110.

The card display area 130 may be a slider or carousel as is known in the art such that it may contain multiple cards, a subset of which may be displayed at a given point. The user may scroll or flip through the various cards by interacting with card display area 130. The geographic area or location points displayed in map area 120 may be associated with the cards in the card display area 130 such that the geographic areas or locations associated with the cards in the card display area 130 may be depicted on a map displayed in the map area 120. For example, in FIG. 1A, the card 132 is associated with the destination "Cape Town" which is also displayed in the map displayed in map area 130.

Some embodiments of interface 100 may also have a static data entry area 140. This area 140 may allow a user to enter static data for an itinerary or may reflect data selected by a user (e.g., clicking on a particular destination card) that may include information such as dates or data ranges, number of travelers (e.g., adults or children) or a particular specified destination. The data provided by a user in the static data entry area 140 may be used in association with the interactions in the chat area 110 to drive content in the display area 112. Conversely, data displayed in the static display area 140 may be determined by the chat driven artificial intelligence system from interactions in the chat area 110. The static data entry area 140 may thus be populated by the chat driven artificial intelligence system based on these determinations.

It will be noted that the embodiments depicted in FIGS. 1A-1D are presented by way of example only. Other interfaces for other embodiments of chat driven artificial intelligent systems are possible and contemplated herein. For example, certain of these interfaces may present text or documents or a list of links of search results or other types of data based on interactions in the chat area or may display content differently. Additionally, such chat driven artificial intelligence interfaces may be presented through other channels, including through third party web pages or applications, even when such third party web pages or applications may have proprietary interfaces.

Figure 1E:
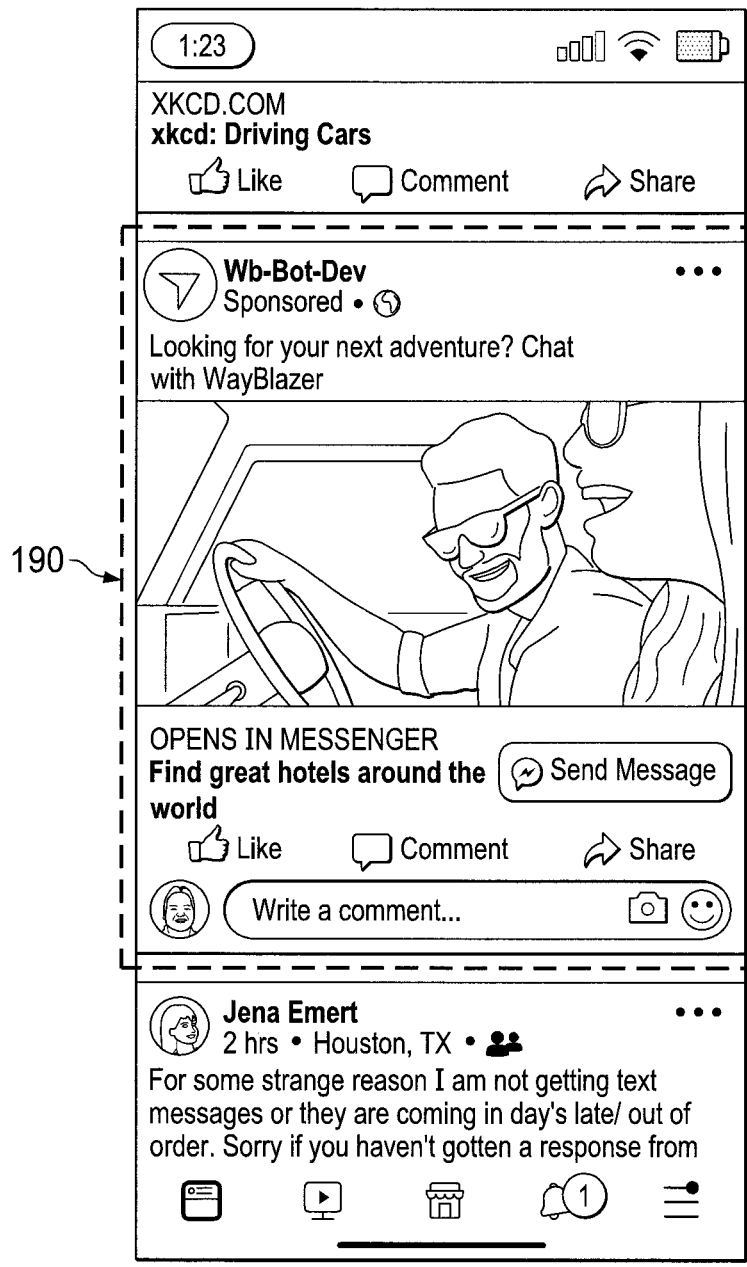

Turning then to FIGS. 1E-1H, embodiments of an interface for a travel related chat driven artificial intelligence system that may be presented through a third party web page, application or interface are depicted. Initially, a user may interact with an interface presented by the third party (e.g., a Facebook feed or news page) as depicted in FIG. 1E. A link 190 may be embedded in the third party interface, where the link may take the form of an advertisement or sponsored post by the operators of the chat driven artificial intelligence system. By accessing or interacting with the link the user may be taken to a proprietary interface, platform or application operated by the third party (e.g., Facebook Messenger or WhatsApp Messenger). A widget for the chat driven artificial intelligence platform (e.g., an application or a "bot" such as a Facebook Messenger bot) may execute within the context of the third party platform (e.g., in the example illustrated Facebook Messenger).

Figure 1F:
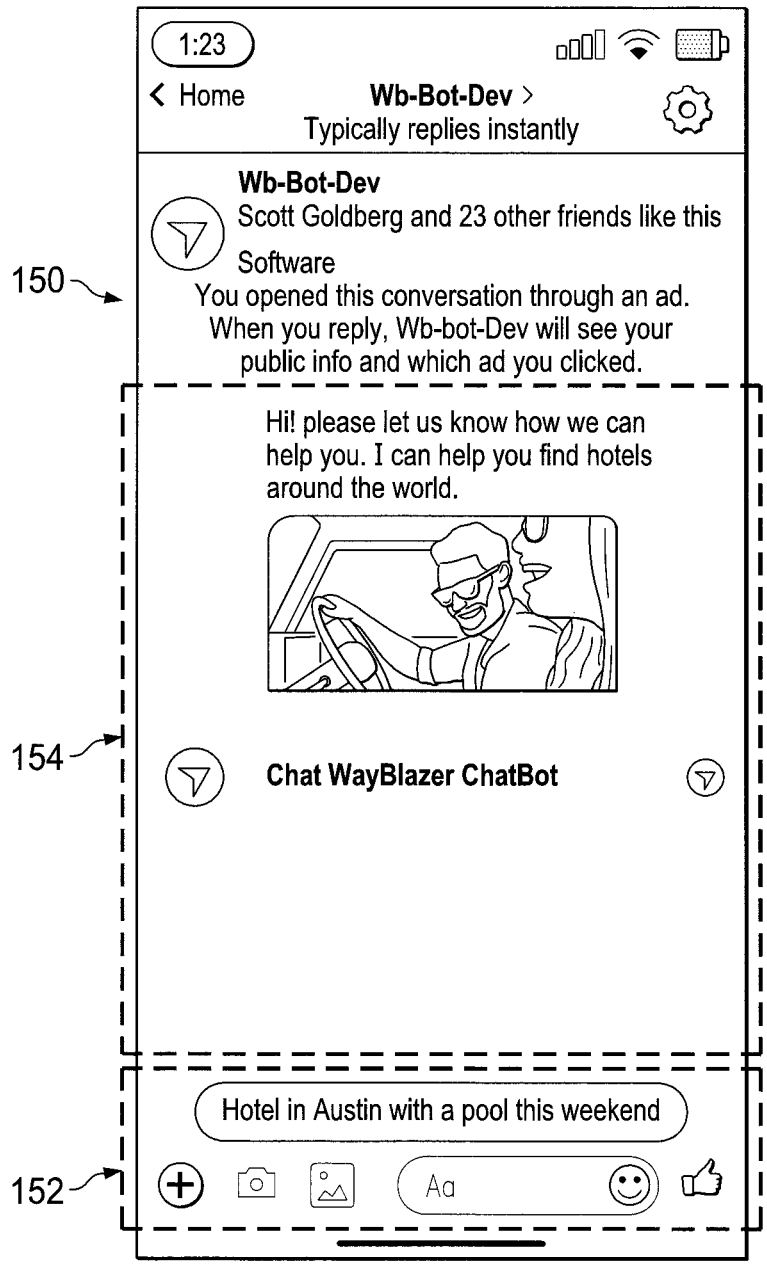
Figure 1G:
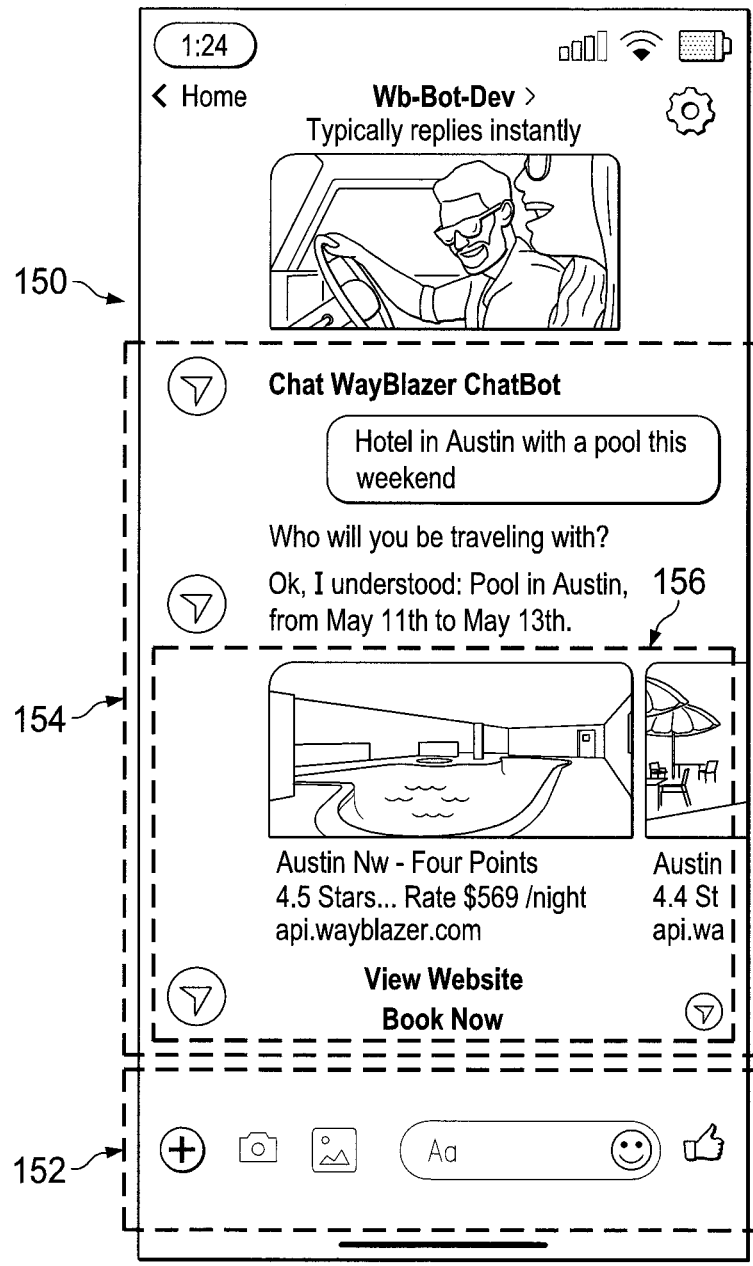

For example in FIG. 1F, interface 150 may include a chat portion or area 152 and a display area 154. The user interacts with the chat driven artificial intelligence system through the chat area 152. As shown in FIG. 1G, the user's interactions in the chat area 152 may appear in the display area 154, as is typical in messaging applications or the like. In particular, a human understandable natural language conversation may occur in the display area 154 based on interactions provided by the user in the chat portion 152 such that the user may iteratively provide an interaction and the chat driven artificial intelligence system may provide an interaction prompt or a response interaction in the display area 154. These interactions can be exchanged between the user and the chat driven artificial intelligence system using the chat area 152 and display area 154.

The interactions taking place in through the chat area 152 and display area 154 drive the display of content in display area 154 such that the display area 154 is maintained in synchronicity with the user's preferences as expressed (either explicitly or inherently) through the interactions entered in the chat area 152. In this embodiment, utilized with a travel related chat driven artificial intelligence system, the interactions presented through the display area 154 may include a card or carousel display area 156 associated with the user preferences expressed through interactions with the chat area 152 including a number of display objects (i.e., "cards"), where each of the cards presents content associated with a particular entity (e.g., destination, flight, hotel, travel packages, etc.) associated with the user preferences expressed though interactions with the chat area 152.

Figure 1H:
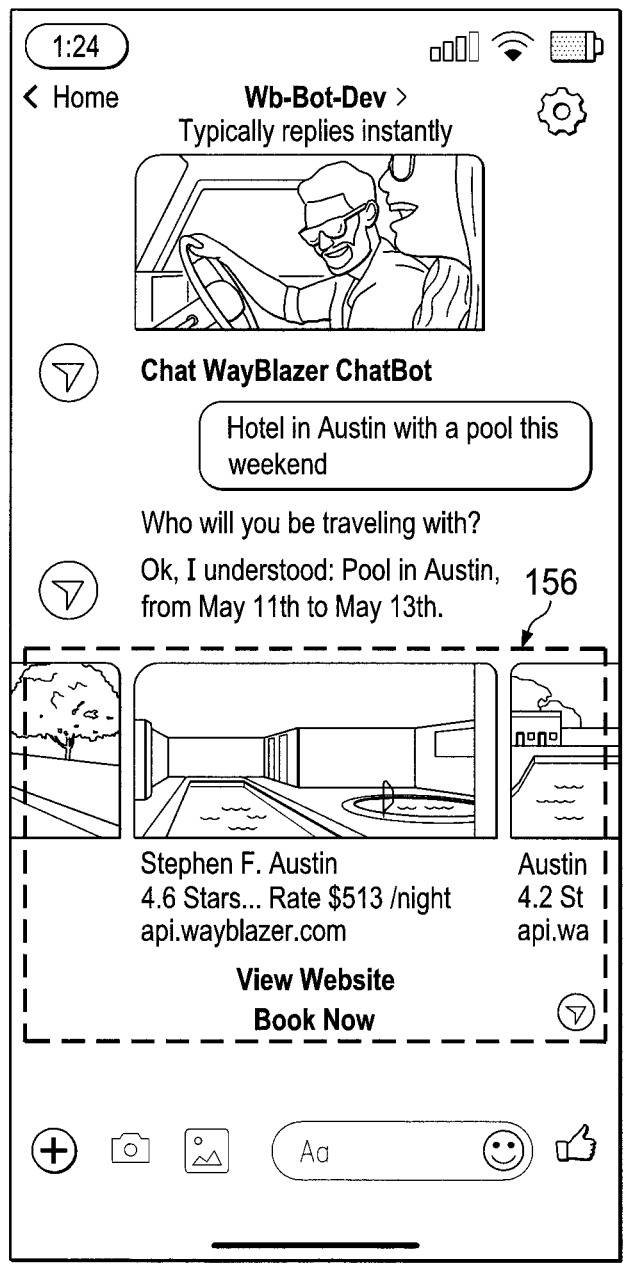

The card display area 156 may be a slider or carousel as is known in the art (in the case a card carousel as offered through the Facebook Messenger application) such that it may contain multiple cards, a subset of which may be displayed at a given point. The user may scroll or flip through the various cards by interacting with card display area 156 as shown in FIG. 1H.

Figure 1J:
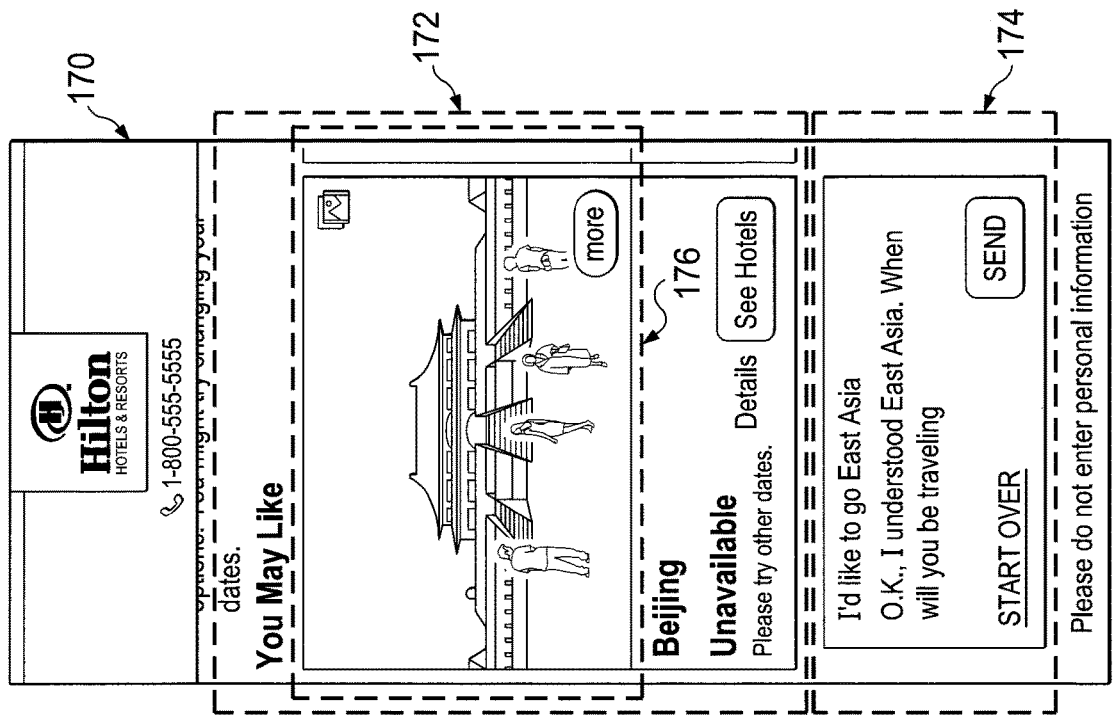
Figure 1I:
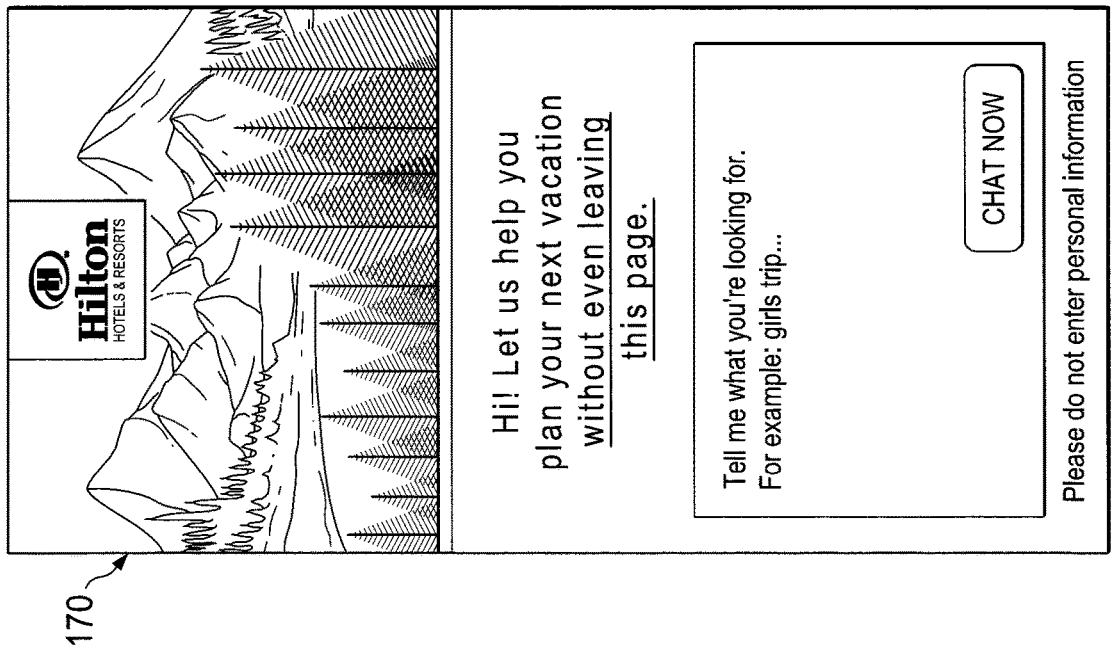

Now looking at FIGS. 1I and 1J, embodiments of an interface for a travel related chat driven artificial intelligence system that may be presented in a container (e.g., an ad container) on a third party web page are depicted. Here, interface 170 may be presented in a third party web page, for example, by using an advertisement network infrastructure or by referencing an endpoint or location that provides the interface 170. Initially, a user may interact with an interface presented in the third party web page as depicted in FIG. 1I. A widget for the chat driven artificial intelligence platform may execute within the context of the container on the third party web page.

For example in FIG. 1I, interface 170 may include a chat portion or area 172 and a display area 174. The user interacts with the chat driven artificial intelligence system through the chat area 172. As shown in FIG. 1J, the user may interact in the chat area 172. In particular, a human understandable natural language conversation may occur in the chat area 172 based on interactions provided by the user such that the user may iteratively provide an interaction and the chat driven artificial intelligence system may provide an interaction prompt or a response interaction in the chat area 172.

The interactions taking place in through the chat area 172 drive the display of content in display area 174 such that the display area 174 is maintained in synchronicity with the user's preferences as expressed (either explicitly or inherently) through the interactions entered in the chat area 172. In this embodiment, utilized with a travel related chat driven artificial intelligence system, the interactions presented through the display area 174 may include a card or carousel display area 176 associated with the user preferences expressed through interactions with the chat area 172 including a number of display objects (i.e., "cards"), where each of the cards presents content associated with a particular entity (e.g., destination, flight, hotel, travel packages, etc.) associated with the user preferences expressed though interactions with the chat area 172. The user may scroll or flip through the various cards by interacting with card display area 176.

With these embodiments of interfaces for a chat driven artificial intelligence system in mind, including interfaces for a travel related chat driven artificial intelligence system, embodiments of a chat driven artificial intelligence systems that utilize and present such interfaces may now be discussed. While such embodiments are presented in the context of travel related chat driven artificial intelligence systems, it will be understood that this context is given by way of example only, and other embodiments of such chat driven artificial intelligence systems may be utilized in other contexts, such as real-estate or the like.

Figure 2:
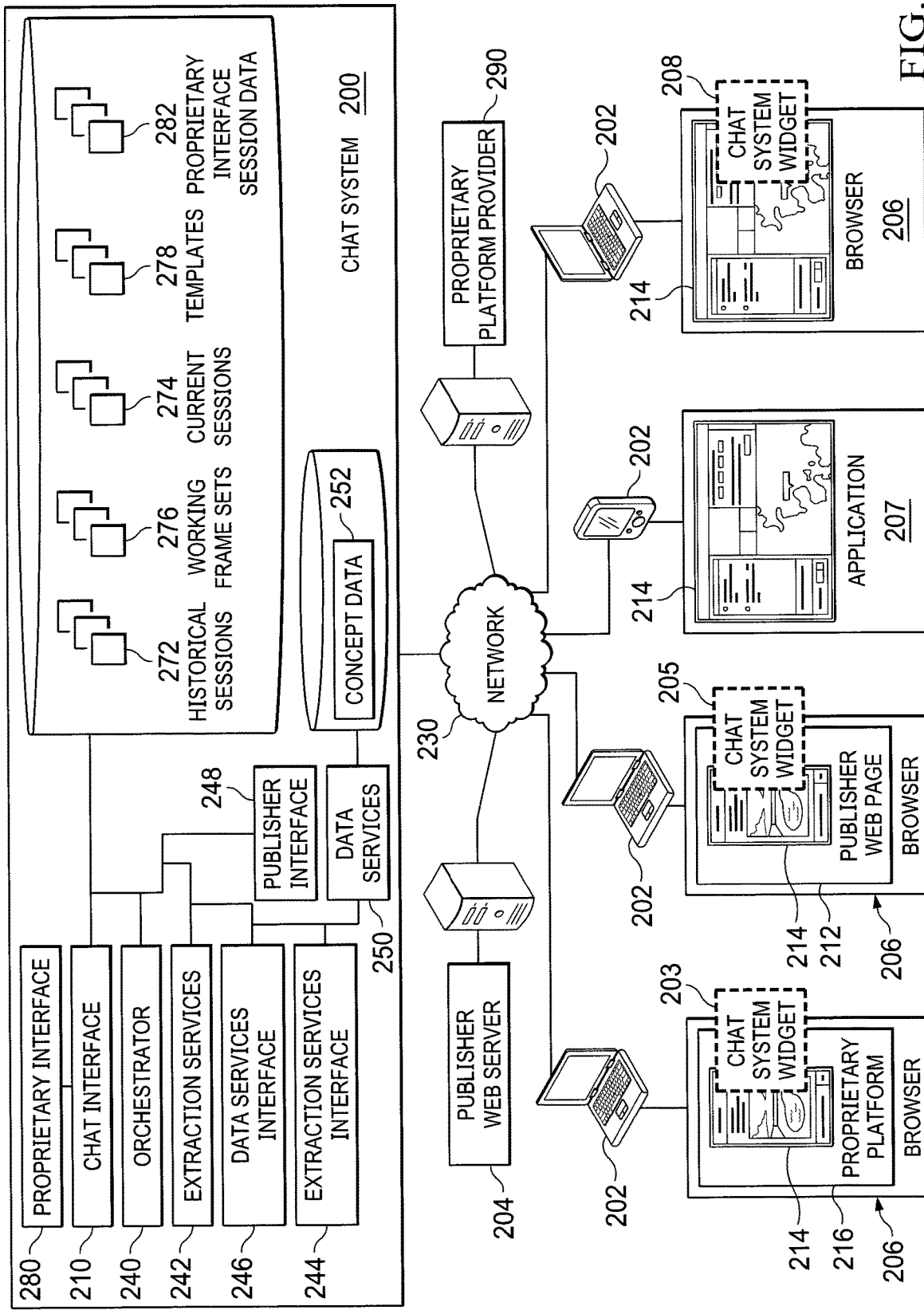
FIG. 2 is a block diagram of one embodiment of a computer network topology that includes an embodiment of a chat driven artificial intelligence system.

Moving then to FIG. 2, one embodiment of a computer network topology that includes an embodiment of such a chat driven artificial intelligence system (or "chat system") is depicted. Chat system 200 may be accessed over a network 230 such as the Internet, an intranet, a Local Area Network (LAN), a Wide Area Network (WAN), a wireless or cellular network, a wireline network or some combination of networks) by users through applications at computing devices 202. Chat system 200 may be implemented or deployed, for example, on a cloud based platform such as Amazon Web Services, Microsoft Azure, Google Cloud, etc.

To facilitate these accesses, a chat interface 210 of the chat system 200 may provide an interface through which requests may be received and responded to over network 230. This chat interface 210 may be an Application Programming Interface (API) such as a Web services API, including, for example, a REpresentational State Transfer (REST or RESTful) API. In one specific embodiment, the chat interface 210 may be implemented as a single endpoint RESTful API such that each request to the chat interface 210 may be a call to this single interface that includes one or more query parameters. In another embodiment, the chat interface 210 may be implemented as two endpoints where one of the endpoints corresponds to an initialization or "init" endpoint (e.g., "address"/init) to set up the chat system widget at the user's device 202 or to establish or restore a session, and a "chat" endpoint (e.g., "address"/chat) for all other requests to the chat interface 210.

Requests to chat interface 210 are thus issued from user devices 202 based on user's interactions with the chat driven interface 214 rendered at their device 202. These requests may be received by the chat interface 210 and a response determined by the chat system 200 and provided back to the requestor through the chat interface 210. In one embodiment, for example, the chat system 200 may provide a web site, where that web site may be a standalone web site provided by the chat system 200 (e.g., through chat interface 210) or may be hosted as a micro site within another web site, such as a web site provided by a publisher from a publisher web server 204. These publishers may, for example, be travel service providers such as airlines, hotel providers, etc. who wish to leverage the functionality of the chat system 200 to improve the ability of users of their site to determine or locate offerings provided in association with that travel service provider. Thus, a user may visit a web site provided from the publisher (e.g., through the publisher web server 204). By accessing a link or being otherwise (re) directed or routed the user may enter a micro site (e.g., that may have the look and feel of the publisher's web site) that is provided by chat system 200.

Such a web site may therefore be accessed by the user at their device 202 using a web browser 206 on their device. When the user access the web site provided by the chat system 200 (e.g., as part of a micro site accessed from the web site provided by the publisher or as a standalone web site), a request is sent to the chat interface 210 which responds with a web page (or portion thereof) that can be rendered in the user's browser 206. In particular, when the web site provided by the chat system 200 is accessed, a chat system widget 208 may be provided in association with an interface returned to the user's browser 206 in response to a request (e.g., utilizing a script or embed tag). The chat system widget 208 may be, for example, JavaScript or other code that may be executed by the user's browser 206 or by the user's device 202. As the user interacts with the chat driven interface 214 provided by the chat system 200 through the user's browser 206, the chat system widget 208 may send requests to the chat interface 210 based upon the user's interaction with the chat driven interface 214. The chat system 200 receives these requests through the chat interface 210 and responds through the chat interface 210. These responses may include one or more objects (e.g., such as JavaScript Object Notation (JSON) objects). The chat system widget 208 may receive these responses and process the included objects to render or update the chat driven interface 214 in the browser 206.

In addition to being travel service providers such as airlines or hotel providers, publishers may also be almost any other third party providing a web site such as magazine or newspaper web site providers (e.g., Conde Nast, Travel and Leisure, Modern Bride, Surfing, etc.), blogs, retailers, etc. Thus, in addition to being provided as a micro site for a publisher, a chat driven interface 214 may be provided directly in the web pages 212 provided by these publishers. Specifically, in certain embodiments, a chat driven interface 214 may be presented in a display container (or unit) on a publisher's web page 212 alongside the content provided by the publisher on the web page. The display container may be of the size typically used to display a web based advertisement such as a 600×300 size container (often referred to as an ad container or ad unit).

Here, when the user access the web site provided by the publisher web server 204 at their device 202 using a web browser 206 on their device the publisher's web page 212 may be provided by the publisher's web server 204. A chat system widget 205 may be provided in association with a display container (e.g., a container defined by a div or iframe tag) in the publisher's web page 212. For example, the chat system widget 205 may be incorporated into the publishers web page 212 or otherwise provided by publisher's web server 204, or may be requested from chat system 200 when the web page 212 is loaded by browser 206 (e.g., using a script tag or the like). This chat system widget 205 may be JavaScript or other code that may be executed by the user's browser 206 or by the user's device 202. In one embodiment, the chat system widget 205 may include, all of, or a subset of, the functionality of chat system widget 208.

When the chat system widget 205 is loaded, it may send an initial request to the chat system identifying the publisher, the publisher's web page 212 or other data. The chat system 200 receives this request through the chat interface 210. The chat system 200 utilizes the context of the publisher's web page 212 (e.g., concepts or destinations associated with web page 212) to select content (e.g., from an advertiser) and form a response with this content and an initial interaction to return to the chat system widget 205 through interface 210. These responses may include one or more objects (e.g., JSON objects) associated with the selected advertiser content. The chat system widget 205 may receive this response and process the included objects to render or update the chat driven interface 214 presented in the container on the publisher's web page 212. Thus, the initial state of the chat driven interface 214 presented on the publisher's web page 212 is related to the context of the content on the publisher's web page 212.

Subsequently, as the user interacts with the chat driven interface 214 provided by the chat system 200 on the publisher's web page 212 (e.g., has chat interactions with the chat portion of the interface), the widget 205 may send requests to the chat interface 210 based upon the user's interaction with the chat driven interface 214. The chat system 200 receives these requests through the chat interface 210 and responds through the chat interface 210. The chat system widget 205 may receive these responses and process the included objects to render or update the chat driven interface 214 in the publisher's web page 212.

The chat interface 210 may also be used to provide an interface for a standalone application 207 (or "app") that resides on a user's device 202. This application 207 may be a standalone application affiliated with the chat system 200 such that when the application 207 is started up or launched on the device 202 the application 207 is configured to render a chat driven interface 214 and contact the chat system 200 through chat interface 210. In this instance, the application 207 is configured to send requests to the chat interface 210 based upon the user's interaction with the chat driven interface 214 presented by the application 207. The chat system 200 receives these requests through the chat interface 210 and responds, where the response includes one or more objects (e.g., JSON objects). The application 207 may receive this response and process the included objects to render or update the chat driven interface 214 presented through the application 207.

In certain embodiments, the chat interface 210 may also be used to provide an interface through a proprietary third party interface (e.g., web page) or application that resides on a user's device 202. Specifically, in many instances certain proprietary web based platforms (including certain social media platforms like Facebook or WhatsApp) may provide proprietary applications that may be accessed through their platform. One example of such an application or platform is Facebook Messenger. Chat interface 210 may be used to provide chat driven interfaces 214 through such proprietary platforms 216. In one embodiment, then, a link or other access point to chat system widget 203 may be provided through the proprietary platform. For example, in the context of a Facebook a sponsored post may be presented through a user's feed where the sponsored post may have a link or access point for chat system widget 203. Here, in one embodiment, chat system widget 203 may be a Facebook Messenger bot that may operate in the Facebook Messenger environment.

Thus, the chat system widget 203 may render chat driven interface 214 in the proprietary platform 216 and may utilize functionality of proprietary platform 216 (e.g., messaging functionality or the like), in conjunction with, or as part of, the chat driven interface. It may be realized, that in many cases, operators or providers of proprietary platforms 290 do not allow direct communications to or from other entities in the environment of their proprietary platform. Thus, in many cases, all communications within such a proprietary platform may pass through proprietary platform provider 290. Thus, for example, in the context of Facebook Messenger, communications pertaining to interactions with or other activity of the user with respect to chat system widget 203 and chat driven interface 214 may be communicated from proprietary platform provider 290.

Moreover, all communications to chat system widget 203 and chat driven interface 214 may have to originate from proprietary platform provider 290 and be formatted for consumption or rendering by proprietary platform 216. In order to operate in such an environment then, chat system 200 may include proprietary interface 280. Chat system widget 203 is adapted to issue calls to proprietary platform provider 290 that identify an endpoint associated with proprietary interface and which may identify a user, a message (e.g., a chat interaction) or other payload data that may identify other interactions. In response to this call, proprietary platform provider 290 may issue a call to the identified endpoint at proprietary interface 280 that identifies the user and includes the message (e.g., chat input) that the user provided in the messenger based chat interface. Such a call can also include a custom payload identifying other interactions with the chat driven interface 214, such as a button press or the like. The call from the proprietary platform provider 290 may utilize a globally unique identifier (GUID) that is unique to the proprietary platform provider 290.

Proprietary interface 280 may be adapted to receive communications from proprietary platform provider 290 and store or access proprietary interface session data 282 that comprises data associated with calls from proprietary platform provider 290 keyed by the GUID provided by proprietary platform provider 290. Thus, proprietary interface session data 282 includes data provided by the proprietary platform provider 290 and data determined or returned by the chat system 200 associated with the GUID provided by proprietary platform provider 290. When the proprietary interface 280 receives a call from proprietary platform provider 290, the proprietary interface 280 can use the GUID of the call to access the proprietary interface session data 282. Using any located proprietary interface session data 282 and the data in the call received from the proprietary platform provider 290, the proprietary interface 280 may form a request to the chat interface 210 in the form, and with parameters, expected by the chat interface 210.

These requests are received through the chat interface 210 and the chat system 200 determines a response that is provided back to the proprietary interface 280, where the response includes one or more objects (e.g., JSON objects). The proprietary interface 280 is adapted to take the response from the chat interface 210 and translate or format the response into a format expected by the proprietary platform 216 (e.g., for example, according to the Facebook Messenger API). This response can then be provided back to proprietary platform provider 290 which, in turn, provides it to proprietary platform 216 where it can be used to render or update the chat driven interface 214.

Thus, requests may be received at the chat interface 210 from chat system widgets 205, 208, proprietary interface 280, or application 207 and be processed by the chat system 200 to determine a response to return to the requesting widget 205, 208, proprietary interface 280, or application 207. The chat system widget 205, 208, proprietary interface 280, or application 207 thus sends a request to the chat interface based on a user's interaction with the chat portion of the chat driven interface 210. This request may therefore include, the unstructured or natural language (NL) data submitted by the user through the chat portion of the chat interface (e.g., a statement or question that may, or not, be properly formed language). The request may also include parameters having static or structured data associated with the user's interaction, such as data provided by the user through a static portion of the chat driven interface 214, data on other events associated with the chat driven interface 214 such as what portions of the page the user interacted with or clicked on (e.g., tracking data). The request may also include an identifier, such as a globally unique identifier (GUID) for the user as used by the chat system 200. Such an identifier may be stored in cookie data on the device 202 as is known in the art.

Chat system 200 may store historical session data 272 associated with the user in addition to current session data 274 associated with the requesting user. Historical session data 272 may include data on sessions that occurred with the user in the past (e.g., outside of some time window), while the current session 274 for the user may include data associated with requests that have been received within a particular most recent time window or that have taken place without the lapse of a certain amount of time. Each of the historical sessions 272 or current session 274 may include a collection of frames associated with the user where the frames are associated with requests received from that user during the corresponding session.

Each frame of a session (e.g., a historical session 272 or the current session 274) corresponds to the data associated with responding to a particular request received through the chat interface 210 during the session. A frame may thus include, the received request itself, data determined from the requests such as the parameters of the request, including the user interaction(s) with the chat system interface that generated the request, data determined based on the request and data included in the response. A frame may also include one or more JSON objects that were included in, or used to determine, the JSON objects included in the response to the received request. These JSON objects may be nested or may include one or more arrays of values.

As discussed the chat interface 210 may be a single endpoint or may at least two endpoints, thus if the chat interface is a single endpoint the request may be initially received at the chat interface 210 and passed to orchestrator 240. If the chat interface 210 implements two or more endpoints, one of the endpoints may correspond to an initialization or "init" endpoint to set up the chat system widget at the user's device 202 or to establish or restore a session, and a query endpoint for all other requests to the chat interface 210. Thus, at this point, if the request is an initialization request (e.g., at the init endpoint) a template 278 may be returned in response to the request. The templates 278 may be identified and accessed based on the identity of the context of the web page on which the chat driven interface 214 is to appear. Such an identity may be determined based on a template or other identifier included in the request received at the endpoint. The template may contain initialization configuration for the chat driven interface 214 such as the style, branding, colors, initial context, initial prompt, seed phrase or data for the chat portion of an interface, or other configuration of the chat driven interface. Examples of such initialization templates are provided in the Appendix hereto.

In any event, when a request is received at chat interface 210 for an endpoint other than an init endpoint and passed to the orchestrator 240, the orchestrator 240 may obtain the user identifier from the received request and use the user identifier to obtain the historical session data 272 (if any) associated with the user identifier and the current session data 274 (if any) associated with the user identifier. In one embodiment, the historical session data 272 or current session data 274 may be stored in easily accessible database such as Redis such that the historical session data 272 or current session data 274 may be obtained as a value in the database associated with the key of the user identifier. If these is no current session data 274 associated with the user identifier, an entry in the data storage (e.g., Redis) associated with the user identifier received in the request may be created such that the data for the current session with the user may be stored.

The orchestrator 240 then processes the received request to generate a response to return. In one embodiment, the orchestrator 240 creates a working frame 276 associated with the user's request and populates the working frame 276 with the data as determined from the received request, including the user's interaction (e.g., natural language statement or chat interaction that caused the request to be generated), relevant data from previous frames in the current or historical sessions, the user identifier, etc. The orchestrator 240 can then process the user's chat interaction in the received request to extract the entities (including concepts or destinations) and intents associated with the user's interaction. This user interaction may be a natural language statement. Accordingly, the orchestrator 240 may employ one or more data extraction services to extract these entities and intents. Generally, these extraction services take as input a statement and apply natural language processing techniques to extract one or more entities or intents to return.

Specifically, in the embodiment depicted, extraction services 242 may include a set of services implemented on the chat system 200 to take as input a statement (e.g., a natural language statement), extract one or more entities (entity types) or intents from the statement and return the extracted entities or intents. These entities may include a set of concepts, including, for example, those related to geography or geographic regions, destinations, time, trip types, activities, amounts, units, names, colors, etc. In one embodiment, for example, entities may be travel related and include: Destination, AirportCodes, HotelAction, HotelBrands, HotelsCombinedLocations, HotelStarRating, LocationType, Lodging, TravelActivities, Traveler and Triptype. Examples of values for each of these entity types and other possibilities for entities are given in the Appendix attached hereto.

Intents may be classes that a statement (e.g., a natural language statement) falls into and that indicate how the chat system 200 should respond to a user interaction. These intents may include, find destination, find hotel, help, small talk, modify and replace or others. In particular, intents may be travel related and include Answering FollowUpQuestion, Book Hotel, ContactCallCenter, Default Fallback Intent, Default Welcome Intent, Email The User, EventViewingHotel, Find A Destination, Find A Hotel, Find a Package, FollowUpQuestion, Get Bots Name, Get Users Name, Greetings, Hotel Amenity Checker, Instructions, Modify (Add) Destination Search, Modify (Add) Hotel Search, Modify (Replace) Destination Search, Modify (Replace) Hotel Search and Out of Scope Add follow-up intent. Examples of intents are given in the Appendix attached hereto.

These extraction services 242 may be particular to entities or intents or even specific types of entities or intents and be configured to only extract that type of entity or intent from the received statement. For example, an extraction service 242 may be configured to extract only time. Such an extraction service may employ, for example, the Stanford Temporal Tagger (SuTime) or Duckling. Another extraction service 242 may be a trip type classifier that extracts a trip type from the user's natural langue statement (e.g., sole, group, couples, romantic, buddies trip, etc.). Yet another extraction service 242 may be configured to extract just concepts or just intents. Other extraction services 242 are possible and are fully contemplated herein.

Certain extraction services that chat system 200 utilizes may be implemented by third party providers. Extraction services interface 244 may allow such third party entity extraction services (not shown) to be queried. In particular, the orchestrator 240 can send a request containing a received user interaction (e.g., a natural language statement received through the chat portion of the interface) and any other desired data associated with the request to these third party extraction services through the extraction services interface 244. Any entities or intents (or other data such as a natural language response) extracted or determined by that third party entity extraction service can be received back through the extraction services interface 244 at orchestrator 240. In some embodiments, a third party extraction service may also return a natural language response to the user's interaction.

This natural language response may be associated with an intent determined for the user's interaction. Examples of such third party extraction interfaces include, for example API.ai, IBM Watson Conversation, Google's Dialogflow or Amazon's Lex.

The data returned from each of the entity extraction services (e.g., either entity extraction services 242 or third party entity extraction services) may be saved into the working frame 276 associated with the current request. Once the orchestrator 240 has the set of entities (including concepts) and intents associated with the user's interaction as determined from the initially received request, the orchestrator 240 may use the entities (e.g., concepts) or intents as determined from the user interaction by the entity extraction services to determine content to provide in response to the request. In particular, the orchestrator may provide extracted concepts or intents to one or more data services. These data services may provide one or more travel related items (e.g., destinations, regions, hotels, etc.) in response, along with content related to those travel related items. The content may include, for example, image data or links for the travel related item, location related data, a description or ratings and review data for the travel related item, pricing data for the travel related item, or other types of content. This content (or a subset thereof) can then be provided by the orchestrator 240 in response to the initially received request through chat interface 210.

Data services 250 may include a set of services implemented on the chat system 200 to take as input an entity (such as a concept) and access concept data 252 of the chat system 200 to determine related data. The concept data 252 may associate travel related items such as destinations, regions, hotels with concepts. The data services 250 may thus take the concepts as inputs and use the concept data 252 to rank a set of travel related items and return the content for the top ranked set of travel related items. Thus, for example, a hotel data service 250 may return particular hotels associated with a concept (e.g. the content for those hotels) or may return particular hotels associated with a set of concepts and a region, etc. As another example, a destination data service 250 may return particular destinations associated with a concept or may return particular destinations associated with a set of concepts and a region, etc.

As with the extractions services discussed above, one or more data services that it is desired to utilize may be implemented by third party providers. Data services interface 246 may allow such third party data services to be queried. In particular, the orchestrator 240 may send requests including concepts to these third party data services through the data services interface 246. Any travel related items extracted by that third party entity data service can be received back through the data services interface 246 at orchestrator 240. An, example of such data services may, for example, include a weather data service.

The data (e.g., the travel related items, including content associated with the travel related items) returned from each of the data services (e.g., either data services 244 or third party data services) may be saved into the working frame 276 associated with the current request. Again, the data associated with each travel related item returned from each data service may be stored in the working frame 276 as JSON objects that may be nested or may include one or more arrays of values.

The orchestrator 240 can then process or manipulate the working frame 276 to create a response to the request from the chat system widget 205, 208, proprietary interface 280, or application 207, where the response includes a return frame having a subset of the travel related items returned by the data services and a responsive interaction. In particular, the orchestrator 240 may select one or more travel related items (and associated content) from the working frame 276 for including in the return frame for the user. The selection may be based on the entities (including concepts) and intents expressed in the current working frame 276, the current session 274 associated with the user, historical sessions 272 associated with the user or data returned by a data service.

In one embodiment, a publisher interface 248 may include one or more interfaces through which a publisher provided service may be accessed where that service can determine one or more offerings of travel related items provided by the publisher (e.g., the publisher providing the publisher web site) or data (e.g., pricing data) associated with the publisher's offerings. These offerings may include, for example, flights or hotels. Thus, the orchestrator may utilize this interface 248 to determine if the publisher has travel related offerings corresponding to the travel related items as determined from the data services and stored in the working frame 276, or pricing related to travel related items stored in the working frame 276. The availability or pricing of travel related offerings from the publisher may be utilized to select the travel related items to include in the response frame for the user. For example, if the travel related items included in the working frame include multiple destinations, only those destination served by flights from the publisher may be selected for inclusion in the response frame. Similarly, if the travel related items included in the working frame include multiple hotels, only those hotels affiliated or provided by the publisher may be selected for inclusion in the response frame.

Once the travel items and responsive interaction are selected they may be formatted into the response frame (e.g., as one or more JSON objects and associated arrays) and included in a response returned to the user returned through chat interface 210 (or returned to the proprietary interface 280 as discussed). Additionally, the working frame 276 utilized by the orchestrator in the creation of this response may be saved into the current session data 274 associated with the user.

When the chat system widget 205, 208 or application 207 at the user's computing device 202 receives this response, it may render the response to update the chat driven interface 214 presented to the user. Alternatively, as discussed, the proprietary interface 280 may take the response from the chat interface 210 and translate or format the response into a format expected by the proprietary platform 216. This response can then be provided back to proprietary platform provider 290 which, in turn, provides it to proprietary platform 216 where it can be used to render or update the chat driven interface 214.

In particular, the chat system widget 205, 208, application 207 or chat system widget 203 in association with proprietary platform 216 may present the response interaction (e.g., a natural language or text statement included in the response) in the chat portion of the chat driven interface 214. Additionally, the chat system widget 205, 208, application 207 or chat system widget 203 in association with proprietary platform 216, may render each of the travel related items (e.g., each JSON object associated with a travel related item) as a card to present in a card display area of the chat driven interface 214. Each of these travel related items may also have map data (e.g., map data points such as coordinate data such as latitude or longitude, etc.). Chat system widget 205, 208 or application 207 may update a map presented in the map display area of the chat driven interface 214 to display these travel related items in the map. In one embodiment, the map display area of the chat drive interface 214 may be provided by a third party provider such a Google Maps or MapBox. In this case, chat system widget 205, 208 or application 207 may call the third party provider with the map data included in the response and render the data returned by the third party provider in the map display area of the chat driven interface 214.

As both the responsive interaction presented in the chat portion of the interface 214 and the content presented in the display area of the chat driven interface 214 are based on the context of the human understandable interactions in the chat potion of the interface 214, the content presented in the display portion of the interface 214 reflects the intents or concepts expressed in the chat portion of the interface 214 and the chat portion of the interface 214 and the display portion of the interface 214 are kept in synchronicity. Moreover, as the user continues to interact with the chat portion of the chat system interface 214 the content displayed in the interface 214 can also be refined or updated in an ongoing manner by the chat system 200 based on the concepts or intents expressed in a human understandable and comfortable manner through these user interactions.

Figure 3:
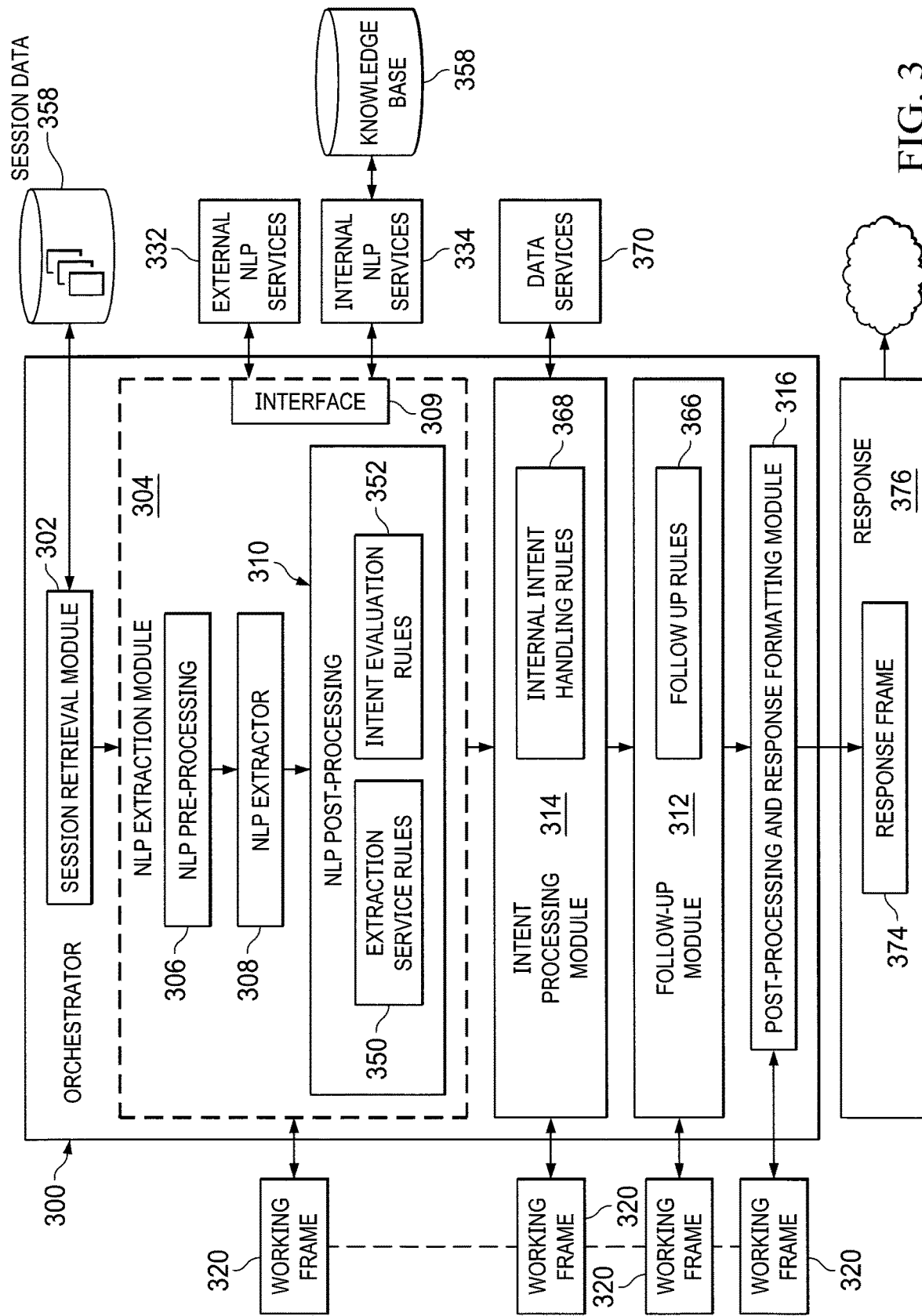
FIG. 3 is a block diagram of one embodiment of an orchestrator of a chat driven artificial intelligence system

Looking now at FIG. 3, a more detailed depiction of one embodiment of the architecture of an orchestrator for use with embodiments of a chat driven artificial intelligence system is presented. It will be recalled from the above discussion that requests to a chat interface of a chat system may be issued from a user device based on a user's interactions with a chat driven interface of the chat system rendered at their device, including the user's human understandable natural language interactions with a chat portion of the interface. In particular embodiments, a chat system widget is executing on the user's device or browser in association with the chat driven interface. As the user interacts with the chat portion of the chat driven interface at his device (e.g., by typing in a natural language query or statement), the chat system widget system sends a request (or call) to the chat interface of the chat system.

This request may include the unstructured or natural language query or statement (referred to generally as a statement) submitted by the user through the chat portion of the chat interface. The request may also include parameters having static or structured data associated with the user's interaction, such as data provided by the user through a static portion of the chat driven interface, data on other events associated with the chat driven interface such as what portions of the page the user interacted with or clicked on (e.g., tracking data). The request may also include an identifier, such as a GUID, for the user. As the chat interface may provide a single endpoint for requests (e.g., from chat system widgets, browsers, etc.), the data of the request may be included as query parameters of the request received at the chat interface.

When the request is received at the chat system through the chat system interface it may be provided to orchestrator 300. When the request is received at the orchestrator it may initially be provided to the session retrieval module 302. The session retrieval module 302 may obtain the user identifier (e.g., the GUID) from the received request and use the user identifier to obtain historical session data (if any) associated with the user identifier and current session data (if any) associated with the user identifier. In one embodiment, the historical session data or current session data may be stored in easily accessible database 358 such as Redis such that the historical session data or current session data may be obtained as a value in the database using the user identifier as a key. If these is no current session data associated with the user identifier, an entry in the data storage (e.g., Redis) associated with the user identifier received in the request may be created such that the data for the current session with the user may be stored.

In one embodiment, this session data (e.g., historical session data or current session data) may include one or more objects. These objects may include, for example, XML objects, JSON objects or other types of objects. In particular, one embodiment that session data includes JSON objects that may include other JSON objects, which each might include a set of arrays. These JSON objects for the session data may include previous working frames used in replying to a user's previous requests or other data associated the user or the user's sessions. Thus, the session data for the user may include the statements submitted by the user during previous interactions with the chat portion of the chat system interface, the entities (including concepts or destinations) and intents associated with those interactions, the responsive interactions (e.g., responsive statements determined or returned to the user), the travel related items determined for the user in processing those previous interactions, or other data associated with the user or responding to a user's previous interactions.

The received request, including the query parameters and the session data obtained for the user, can then be provided to the NLP extraction module 304. The NLP extraction module 304 includes an NLP pre-processing module 306 that initially receives the request and the session data. The NLP pre-processing module 306 creates a working frame 320, which may be a JSON object, extracts the user statement (e.g., the unstructured natural language statement the user provided through the chat portion of the chat system interface) and stores the user statement in the working frame 320. Any other parameters of the user request (e.g., structured data, tracking data, the user's GUID, etc.) may also be stored in the working frame 320.

The NLP pre-processing module 306 can then determine if the request includes valid data such that it can be processed. This may include evaluating the user statement for content (e.g., if the user's statement is empty it is not valid) or checking any supplied dates, destinations of price ranges for valid ranges (e.g., within the next year, etc.). If the request is not valid a default responsive chat interaction (e.g., "I'm sorry, I didn't understand that," "Can you tell me some more?", etc.) may be stored as the response interaction in the working frame 320. Alternatively, the follow up module 312 may be provided with the working frame 320 which may determine and include such a default responsive chat interaction in the working frame 320.

If the request is valid, the NLP extractor 308 may send requests to a set of extraction services to extract entities and intents from the user statement. Generally, these extraction services are NLP extraction services that take as input a statement and apply natural language processing techniques to extract one or more entities or intents to return. In particular, the extraction services may include a set of internal services 334 implemented on the chat system or a set of external services 332 implemented by third parties that can receive requests including the statement (e.g., the user's natural language statement), extract one or more entities or intents from the statement and return the extracted entities or intent.

In particular, the NLP extractor 308 can send a request containing the user statement and any other desired data associated with the request to these extraction services through an interface 309. As a default, the user statement may be sent to each of the NLP extraction services 332, 334, however, in other embodiments a subset of these NLP extraction services 332, 334 may be determined and utilized. For example, only the internal services 334 may be utilized or only the external services 332 may be utilized. Alternatively, a combination of internal services 334 and external services 332 may be used. For example, in one embodiment, external NLP services 332 may be utilized for processing any "small talk", while an internal NLP service 334 may be used for intents, concepts or entities.

The NLP extractor 308 may be configured to form a request to each extraction service according to a format utilized by that particular extraction service. For a particular extraction service, then, the NLP extractor 308 may populate the request with appropriate data from the working frame 320, including the user statement, the user GUID or other user session data if needed, or other data that may be used in a request to the extraction service 332, 334. The availability of certain data may determine whether a particular extraction service 332, 334 may be utilized. For example, if certain data needed to form a request to a particular extraction service 332, 334 is not available in the working frame 320 that particular extraction service 332, 334 may not be utilized.

In one embodiment, the NLP extractor 308 may have a different function for formulating API requests to each extraction service 332, 334. The NLP extractor 308 may utilize a set of extraction service rules to determine the extraction services to utilize and each of the functions for the determined extraction services 332, 334 may extract data from the working frame 320 to populate a request for the corresponding extraction service 332, 334. If a function cannot populate a corresponding request to the extraction service, that extraction service 332, 334 may not be utilized. Functions associated with certain extraction services 332, 334 that cannot be populate a corresponding request may trigger a response interaction requesting additional information in the follow up module 312 as will be discussed in more detail. Such a flag or response interaction may be placed in working frame 320.

Any entities or intents (or other data such as a natural language response to return) extracted or determined by an entity extraction service 332, 334 can be received back through the interface 309 at NLP extractor 308 and stored in the working frame 320 along with an identifier of the extraction service 332, 334 that returned that data. Additionally, the values returned by the extraction services 332, 334 may be normalized by NLP extractor 308 before they are stored in the working frame. For example, destinations or regions may be normalized for use by the chat system.

In particular, the return from an entity extraction service 332, 334 may include a JSON object with entities (e.g., values for specified entity types), intents or a responsive interaction. These returned JSON objects may be stored as nested JSON objects in the working frame 320. The entities may include a set of concepts, including, for example, those related to geography or geographic regions, destinations, time, trip types, activities, amounts, units, names, colors, etc. For example, travel related entity types may include: Destination, AirportCodes, HotelAction, HotelBrands, HotelsCombinedLocations, HotelStarRating, LocationType, Lodging, TravelActivities, Traveler and Triptype.

Intents may be classes that a statement (e.g., a natural language statement) falls into and that indicate how the chat system should respond to a user interaction. These intents may include, find destination, find hotel, help, small talk, modify and replace, FAQ, Email The User or others. Specifically, travel related intents may include Answering FollowUpQuestion, Book Hotel, ContactCallCenter, Default Fallback Intent, Default Welcome Intent, EventViewingHotel, Find A Destination, Find A Hotel, Find a Package, FollowUpQuestion, Get Bots Name, Get Users Name, Greetings, Hotel Amenity Checker, Instructions, Modify (Add) Destination Search, Modify (Add) Hotel Search, Modify (Replace) Destination Search, Modify (Replace) Hotel Search and Out of Scope Add follow-up intent. In another embodiment, intents may include Find A Destination, Find A Hotel, Small Talk, Terms of Service, FAQ, Hotel Amenities, Book a Hotel, and Ask For an Agent.

The extraction services 332, 334 may include a number of extraction services 332, 334 that may be general services for extracting entities (e.g., concepts) and intents from natural language statements or that may be specific services for extracting only entities or intents or specific types of entities or intents. In one embodiment, a conversation management or interface platform may be used as an extraction service. Examples of such conversation management or interface platforms include API.ai, IBM's Watson Conversation, Wit.ai., Converse.ai, etc.

In the main, these conversation management platforms function using machine learning trained on a set of intents or entities defined by the operators of the travel related chat system such that when a request including the user's natural language statement is submitted to the conversation platform the statement can be classified as having a particular intent and having values for a set of entities. These intents and entities may then be returned to the requestor by the conversation platform. The travel related chat system can thus use the conversation platform to extract intents and entities specified and defined by operators of the travel related chat system. Moreover, the conversation platform may be trained or otherwise configured to provide a responsive interaction associated with the intent into which the user's statement is classified. Thus, in addition to the intents and entities returned by such a conversation platform, a responsive interaction (e.g., a text statement to present to a user) may also be returned by a conversation management platform.

As but one example, in internal NLP extraction service 334 may be trained by providing a machine learning NLP tool with a set of training data annotated using the brat rapid annotation tool (BRAT). Examples of training data, associated labels, labels for the training data and associated intents for travel related contexts and real-estate related contexts are given in the Appendix hereto.

Other extraction services 332, 334 may include entity extraction services 332, 334 for extracting only entities or only concepts from natural language statements or an intent extraction service for extracting only intents from natural language statements. One extraction service may be configured to extract a TripType entity from a natural language statement. Another entity extraction service may be configured to extract and return a destination or geographic identifier (e.g., such as a region) from a natural language statements. To facilitate the extraction of geographic identifiers, an NLP extraction service 334 may employ a knowledge base 358 that correlates regions with points of interest or destinations. Thus, given points of interest, destinations, or regions, associated regions, points of interest or destinations may be determined. One example of a request to an internal extraction service 334 and a response is given in the Appendix hereto. Other extraction services, interfaces and formats thereof are possible and are fully contemplated herein.

In order to further improve performance by reducing bandwidth usage or time to respond to a user interaction through the chat system interface, a caching framework may be employed between the NLP extractor 308 and the extraction services 332, 334. This caching framework may serve to cache requests to external extraction services so responses can be accessed without submitting the request to the extraction service itself. This cache framework can be keyed based on request data in order that the same request retrieves the response originally returned from the extraction service in response to a previously identical request from the cache.

Once the response are received from the extraction services 332, 334 and stored in the working frame 320, NLP post processing module 310 may determine canonical values for any different values for entity types or intents returned by different extraction services. The values for an entity type or intent selected as canonical values may be identified in the working frame.

In particular, one embodiment, the NLP post processing module 310 may include a set of extraction service rules 350 defining a hierarchy of trust for the set of entity extraction services. More specifically, in one embodiment, the set of extraction service rules 350 may define a hierarchy of trust associated with each entity type, defining for each entity type an order of extraction services, such that if multiple extraction services return values for an entity type, the rule may be utilized to select as the canonical value for that entity type the value returned from the highest ranked extraction service associated with that entity type. An intent rule may define a hierarchy of trust associated with each extraction service such that an intent returned by a higher ordered extraction service may be selected as a canonical intent before an intent returned by a lower ordered extraction service.

NLP post processing module 310 may thus process working frame 320 to determine if any entity type has different values returned by different extraction services for the user statement or different extraction services returned different intents for the user statement and apply one or more extraction services rules 350 to select canonical values for the entity types or intents. Extraction service rules 350 may also specify that an intent or value for entity type from a particular extraction service is to be utilized as a canonical value (or not utilized at all even if no other values for the entity type have been returned) regardless of values returned by other extraction services. These extraction services rules 350 may, for example, be implemented as machine learning based rules that may be refined over time.

For example, one extraction service may return a value of "romantic" for the entity type TripType while another extraction service may return a value of "business trip" for the entity type TripType. If the extraction service rule 350 associated with the entity type TripType orders the first extraction service higher than the second extraction service, the value "romantic" may be selected as a canonical value for the entity TripType. Once the canonical values for each entity type or intent are selected for any duplicative entity types or different intents.

Once the entities and intents (or other data) returned by the extraction services 322, 324 are stored in the working frame 320 and any canonical values for entities or intents identified in the working frame 320, the NLP post processing module 310 may determine if any data any of the user's previous frames in the current session should be included in working frame 320. If there is no previous frame in the current session (i.e. the user statement is the first user statement of the session) no further action is taken. If, however, one or more previous frame exist for the user in the current session (e.g., the user has been interacting with the chat portion of the chat system interface and the chat system interface has been updated in response to the those user interactions), the intent as determined for the current request (as stored in working frame 320) may be used to determine whether, and how, to populate the working frame 320 with any data from any previous frames of the current session.

In particular, a set of intent evaluation rules 352 may be used to populate the working frame 320 with data from a previous frame (if needed). For example, the intent as returned by the extraction service 332, 334 may be compared with one or more intents stored in the working frame to determine an intent to utilize (e.g., a canonical intent for the working frame). As an example of other intent evaluation rules 352, one rule may specify that a canonical intent may be a HotelAmenityChecker or BookHotel intent if a user has previously been shown hotels, otherwise any intent expressed in a current interaction may be overridden and the intent HotelSearch determined as a canonical intent and stored in the working frame 332. As another example of a intent evaluation rule, if any points of interest are extracted any intent expressed in a current interaction may be overridden and the intent HotelSearch determined as a canonical intent and stored in the working frame 332. As yet another example of a rule, if any explicitly provided search frame data (e.g., destinations/stars/travelers/concepts) can be extracted, an intent for a previous type of search may be determined as a canonical intent and stored in the working frame 332, regardless of any other non-search intents that may be extracted from the current interaction.

As another example, if the intent as stored in the working frame 320 is a NewDestinationSearch the values for entities as extracted by the extraction services 332, 334 may remain in the working frame 320. If the intent as stored in the working frame 320 is a ModifyDestinationReplace the entities from the immediately previous frame of the session may be used to populate the working frame (e.g., they may be copied into the working frame) except for the entity type of destination. For that entity type (destination), the value as returned by the extraction services may be kept and utilized in the working frame 320. If the intent as stored in the working frame 320 is a ModifyDestinationAdditive, the entities from the immediately previous frame of the session may be used to populate the working frame 320 (e.g., they may be copied into the working frame) including the values for the entity type of destination. Additionally, the value as returned by the extraction services for the entity type destination may be added to the values for the destination entity copied from the previous frame(s). Similar rules may also be applied to entity types related to concept, date, price, duration, NumberOfTravelers, or others.

Other rules may be pertinent to the environment in which a chat driven interface is utilized. For example, if the chat driven interface is used in association with a particular partner (e.g., enterprise) utilizing the chat system, these rules may be specific to that partner. For example, certain rules may evaluate any returned airport to determine if it is an airport served by the partner. Another rule may evaluate any returned regions to determine if one or more, or all, of the regions are, or are not, served by the partner, while another rule may check the specified dates to determine if the user is utilized dates that are too near or far in time. If any of these e partner specific rules are violated, an exception flag may be set in the working frame 320.

It will be understood that these rules are provided by way of example, other rules will be possible and are fully contemplated herein. Additionally, other techniques for the population of the working frame 320 with data from one or more previous frames of the session may also be utilized. For example, a supervised or unsupervised machine learning model may be utilized to determine what data to include (or replace) in the working frame 320 from previous frames in the current session of the user.

At this point then, working frame 320 may include at least a set of entities (e.g., entry types and value) and intents returned from the extraction services 332, 334, an identification of canonical values for each entity type or intent returned by the extraction services 332, 334 and, in some embodiments, at least one responsive interaction (e.g., natural language response to the user' interaction) determined by an extraction service 332, 334. The identification of the canonical values may include an identification of one or more most recent intents located from the most recently received user interaction.

The orchestrator 300 may then apply intent processing module 314 to the working frame to determine content to provide in response to the request received from the user based on entities (e.g., concepts) or intents as determined from the user interaction by the entity extraction services and stored in working frame 320. The intent processing module 314 may determine the intent (e.g., the canonical intent) associated with the received request as stored in the working frame 320. Using intent handling rules 368 specifying an action associated with an intent, the intent processing module 314 may pass control to the post-processing and response formatting module 316, determine a responsive interaction to include in the working frame 320 or determine one or more data services to call and what data to provide to each of the data services.

For example, if the intent is ContactCallCenter an intent handling rule 368 may have an action to include the call center telephone number in a responsive interaction to the user and store the responsive interaction in the working frame 320. If, however, the intent is Find A Destination, Find A Hotel, Find a Package, Modify (Add) Destination Search, Modify (Add) Hotel Search, Modify (Replace) Destination Search, Modify (Replace) Hotel Search the intent handling rules 368 may specify which data service 370 to call and what data from the working frame 320 to provide in the request to the data service 370.

In particular, the orchestrator 300 may provide extracted entities (e.g., concepts) or intents from the working frame 320 to one or more of the data services 370. Specifically, the intent processing module 314 may determine one or more data services 370 to call based on a canonical intent expressed in the working frame 320 and may form a request to the data service 370 that includes a canonical entity (e.g., canonical concept) determined for the working frame 320. These data services 370 may provide one or more travel related items (e.g., destinations, regions, hotels, etc.) in response, along with content related to those travel related items. The content may include, for example, objects with image data or links for the travel related item, location related data, a description or ratings and review data for the travel related item, pricing data for the travel related item, or other types of content.

In certain embodiments, data services 370 may include a set of services (implemented on the chat system or by external third parties) to take as input an entity (such as a concept or destination) and access entity data related to the entity (e.g., concept or destination) to return content associated with the entity. The entity data may associate travel related items such as destinations, regions or hotels with concepts or destinations. The data service 370 can then respond to the request with content associated with content related to the input entity (e.g., concepts or destinations). Thus, for example, a hotel data service 370 may return particular hotels associated with a concept or may return particular hotels associated with a set of concepts and a region, etc.

Specifically, in one embodiment, a hotel service 370 may take an identifier of a publisher or partner (e.g., advertiser) with whom the chat system is being utilized (which may be included in the initially received request or working frame 320), a region or a set of concepts. The hotel service 370 may then determine the hotels to return (e.g., those hotels associated with the publisher or which the publisher serves, hotels associated with an advertiser, etc.) based on the publisher identifier, the region or the set of concepts. The hotel service 370 may return a set of hotel objects (e.g., JSON objects) with hotel name, images, concepts, scores, etc. Each of the hotel objects returned by the hotel service 370 may get stored in the working frame 320.

As another example, a destination data service 370 may return particular destinations associated with region, destinations associated with a concept or may return particular destinations associated with a set of concepts and a region, etc. In particular, in one embodiment, a destination service 370 may take an identifier of a publisher or partner (e.g., advertiser) with whom the chat system is being utilized (which may be included in the initially received request or working frame 320), a region or a set of concepts. The destination service 370 may then determine the destinations to return (e.g., those destinations associated with the publisher or which the publisher serves or destinations associated with an advertiser) based on the publisher identifier, the region or the set of concepts. The destination service 370 may return a set of destination objects (e.g., JSON objects) with destination name, images, concepts scores, etc. Each of the destination objects returned by the destination service 370 may get stored in the working frame 320.

After the intents have been processed by the intent processing module 314, the working frame 320 now has a set of objects (e.g., destination objects or content objects) that may be presented as content to the user along and in some cases may have a responsive interaction to present to the user (e.g., that was determined by an extractor service 332, 334 such as in the case of a Small Talk intent).

Follow up module 312 may then evaluate the entities and intents of the working frame to determine what responsive interaction, if any, should be returned as a responsive interaction to the user. This determination may include a determination whether more information is needed from the user or if a follow up question should be returned as a responsive interaction to the user. Such a follow up question may be desired to, for example, obtain additional information from the user to augment or conduct a search for content to return. For example, this type of information may be desired, if the working frame 320 does not include data on time or date ranges, possible amount to spend, possible regions or destinations, etc.

In particular, the follow up module 312 may include a set of follow up rules 366 for determining if a follow up question (e.g., a responsive interaction) to obtain more data from the user should be asked (e.g., returned to the user as a responsive interaction). These rules 366 may be rules for evaluating any frames of the current session data for the user to determine the entities and intents of the previous frames to determine if enough data is present or the responsive interactions and user interactions of these previous frames.

A rule 366 may, for example, have a trigger that looks for the absence of particular data (e.g., a value for a particular entity type) and an action that includes a follow up question to include as a responsive interaction if the particular data is not present in the working frame, or an action that populates a default value for the entity type or other data in the working frame 320. For example, certain default values may be: adults: 2, children: 0, departureAirport: airport_closest_to_ip||'JFK', cabin: 'Economy', const DEFAULT_DURATION_DAYS=14; DEFAULT_START_DATE=100;//(days from now) or the like.

The rules 366 may be prioritized such they are evaluated in an order so the most important or germane follow up question may be asked. The rule(s) 366 to apply may be determined based on the intent (e.g., the canonical intent) associated with the working frame 320. These rules 366 may also determine if default values for entities should be populated in the working frame 320 if they do not currently exist in the working frame 320. If the application of the rules 366 results in a determination that a follow up question should be asked to the user as a responsive interaction, a follow up question object (e.g., a JSON object with a responsive interaction that include the follow up question) may be generated and included in working frame 320. Such follow up questions may include: "Who will you be traveling with?", "How many adults and children will be traveling?", "When would you like to travel?", and "What is your budget for this trip?" Additionally, the determination of a responsive interaction may be based on any exception flags set in the working frame. For example, if working flags related to specified destinations not being served by a partner are set, a particular response interaction may be determined and added to the working frame 320.

The orchestrator 300 can now process or manipulate the working frame 320 using post-processing and response formatting module 316 to create a response to the request from the chat widget on the user's system, where the response 376 includes a response frame 374 including a set of content objects for presentation to the user through the display portion of the chat system interface and a responsive interaction 376 for presentation through the chat portion of the chat system interface.

Initially, post-processing and response formatting module 316 may save the working frame 320 to the session data 358 associated with the user corresponding to the initially received request. The post-processing and response formatting module 316 may then select one or more content objects from the working frame for including in the response frame 374 for the user. The selection may be based on the entities (including concepts) and intents expressed in the current working frame 320, the current session associated with the user, historical sessions associated with the user or data returned by a data service 370.

Once the content items and responsive interaction are selected they may be formatted into the response frame 374 (e.g., as one or more JSON objects and associated arrays) and included in a response 376 to be returned to the user. This response frame may thus include a JSON object corresponding to cards that are to be displayed in the display portion of the interface (e.g., card display area) and a chat object that includes data for rendering in the chat portion of the window. The cards or response frame 374 may also include map data for calling map service to render a map with certain geographical locations or regions in the display portion of the interface (e.g., a map display area). One example of a response frame (also referred to as an API response) is presented in the Appendix included herewith.

When the chat system widget at the user's computing device receives this response 376, it may render the response 376 to update the chat driven interface presented to the user. In particular, the widget may present the response interaction (e.g., a natural language or text statement included in the response) in the chat portion of the chat driven interface. Additionally, the chat system widget may render each of the travel related content objects (e.g., each JSON object associated with a travel related content item) as a card to present in a card display area of the chat driven interface. Each of these travel related items may also have map data (e.g., map data points such as coordinate data such as latitude or longitude, etc.). Chat system widget may update a map presented in the map display area of the chat driven interface to display these travel related items in the map.

As both the responsive interaction presented in the chat portion of the interface and the content presented in the display area of the chat driven interface are based on the context of the human understandable interactions in the chat potion of the interface, the content presented in the display portion of the interface reflects the intents or concepts expressed in the chat portion of the interface and the chat portion of the interface and the display portion of the interface are kept in synchronicity. Moreover, as the user continues to interact with the chat portion of the chat system interface the content displayed in the interface can also be refined or updated in an ongoing manner by the chat system based on the concepts or intents expressed in a human understandable and comfortable manner through these user interactions.

These chat driven artificial intelligence systems and associated interfaces may thus have a wide range of applicability and usefulness, especially in travel related contexts. As noted, the travel industry has grown immensely in the previous two decades or so, facilitated in no small part by the growth of the Internet. There are therefore a large number of web sites or other locations on the Internet that include travel related content. These sites may be directly travel related, such as web sites or travel related service providers (e.g., hotel or airline providers) or travel related publications (e.g., magazines such as Conde Nast or Travel and Leisure), while other web sites may be indirectly related to travel, such as web sites related to activities that may be particularly associated with certain destinations (e.g., publications related to scuba diving, sailing, skiing, food, etc.) or blogs or web sites related to the travels of individual travelers or certain groups.

Accordingly, as discussed above, in certain embodiments a chat driven artificial intelligence system may be utilized to provide a chat driven interface including a chat portion and a display portion within a web site provided by a third party publisher or partner (e.g., provided by a party different than operators of the chat system). In particular, such a chat driven interface may be presented in a display container (often referred to as an ad container or ad unit) on a publisher's page alongside travel related content provided by the publisher's web site. The display container may be of the size typically used to display a web based advertisement such as, for example a 600×300 size container, or the like (other sizes are imaginable and are fully contemplated herein). The chat driven artificial intelligence system may utilize the context of the publisher's web site, including for example, the entities (including concepts and destinations) expressed in the content of the publisher's web page to initialize and drive the chat driven interface, including the content presented in the display portion of the interface.

In particular, in certain embodiments, the content selected for presentation in the display portion of the chat driven interface may be an advertiser's content (e.g., where that advertiser may be unaffiliated with the providers of the publisher's web site). Specifically, the chat driven system may include an advertiser data store defining concepts, destinations or other entities associated with advertisers or the advertisers' content. An advertiser (or particular advertiser content) may be selected based on a matching of the concepts, destinations or other entities of the content on the publisher's web page and the concepts, destinations or other entities associated with the advertiser. Content for the selected advertiser may then be returned and presented in the display portion of the chat driven interface displayed in the ad container on the publisher's web page. The chat system may subsequently use the context of the interactions in the chat potion of the interface (e.g., the dialogue) displayed in the ad unit to drive presentation of that advertiser's content in the display portion of the interface presented in the ad unit of the publisher's web page such that the advertiser's content presented in the display portion of the interface reflects the intents or concepts expressed by the user in the chat portion of the interface.

Figure 4:
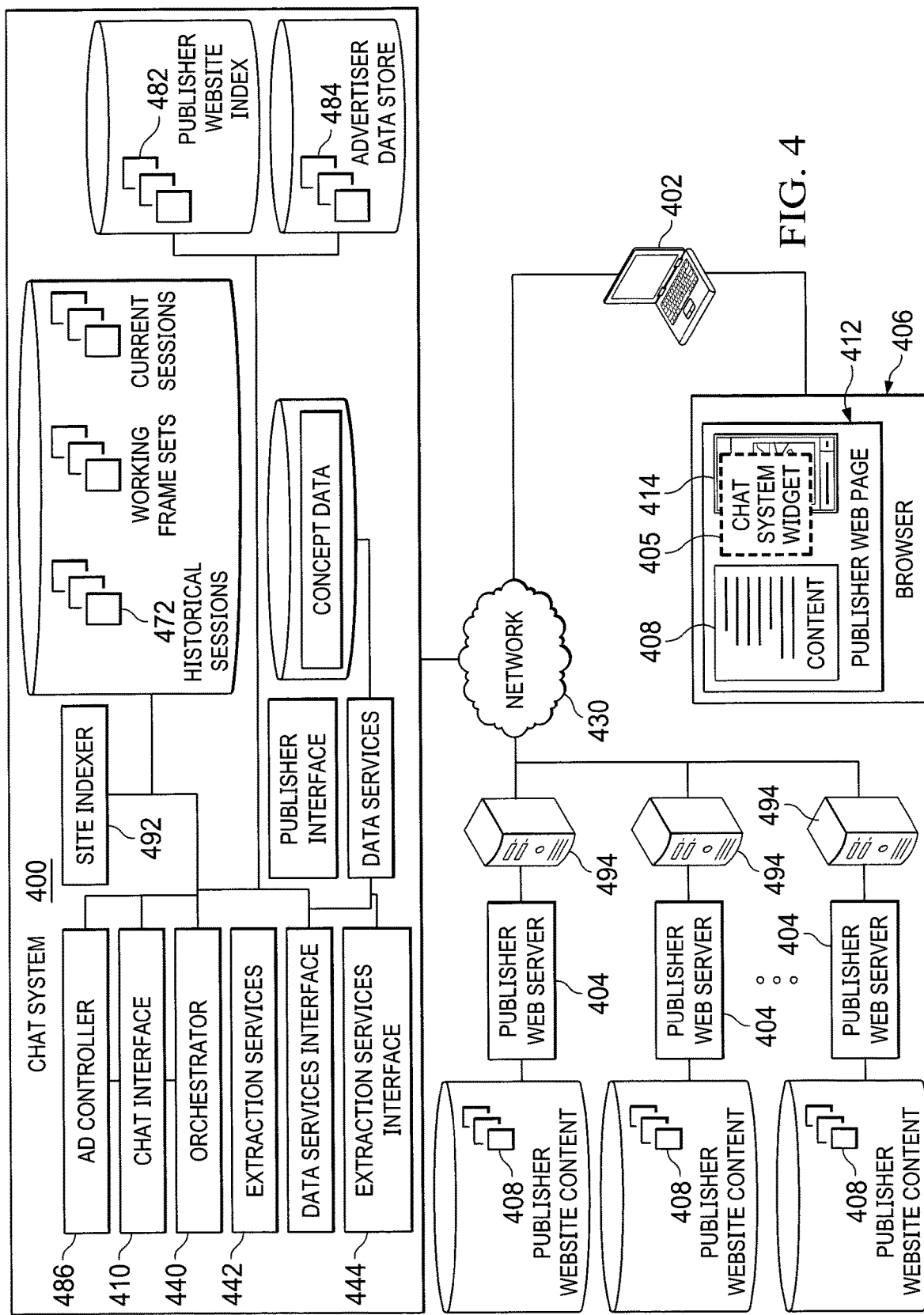
FIG. 4 is a block diagram of one embodiment of a computer network topology that includes an embodiment of a chat driven artificial intelligence system.

Referring now to FIG. 4, one embodiment of a computer network topology that includes an embodiment of a chat driven artificial intelligence system (or "chat system") for presenting a chat driven interface in a display container on a publisher's web page is depicted. Chat system 400 may be accessed over a network 430 such as the Internet, an intranet, a Local Area Network (LAN), a Wide Area Network (WAN), a wireless or cellular network, a wireline network or some combination of networks) by users or applications at computing devices 402 and be implemented or deployed, for example, on a cloud based platform. To facilitate these accesses, a chat interface 410 of the chat system 400 may provide an interface through which requests may be received and responded to over network 430.

These accesses may be requests from a chat system widget 405 associated with a publisher's web page 412. In particular, when a user access the web site provided by the publisher web server 404 at their device 402 using a web browser 406 on their device the publisher's web page 412 may be provided by the publisher's web server 404. A chat system widget 405 may be provided in association with a display container in the publisher's web page 412.

When the chat system widget 405 is loaded, it may send an initial request to the chat system 400 identifying the publisher, the publisher's web page 412 or other data. The chat system 400 receives this request through the chat interface 410 and initializes the chat driven interface 414 (including the chat portion and the display portion of the interface 414) displayed in the container on the publisher's web page 412 based on the context of the web page 412. The chat system widget 405 may subsequently send requests to the chat interface 410 based on a user's interaction with the chat portion of the chat driven interface 414. These requests may therefore include, the unstructured or natural language data submitted by the user through the chat portion of the chat interface. The chat system 400 receives these requests through the chat interface 410 and responds through the chat interface 410. The chat system widget 405 may receive these responses and process the included objects to render or update the chat driven interface 414 in the publisher's web page 412. As both the responsive interaction presented in the chat portion of the interface 414 and the content presented in the display area of the chat driven interface 414 are based on the context of the human understandable interactions in the chat potion of the interface 414, the content presented in the display portion of the interface 414 reflects the intents or concepts expressed in the chat portion of the interface 414 and the chat portion of the interface 414 and the display portion of the interface 414 presented in the context of the publisher's web page 412 are kept in synchronicity.

Specifically, in one embodiment, each publisher 494 where it is desired to display a chat driven interface from the chat system 400 in a display container on their web site may be assigned a publisher identifier by the operators of the chat system 400. The publisher web site index 482 may associated the identifier for the publisher with a set of URLs of the publisher's web site. Each of the URL's of the publisher's web site is, in turn, associated with entities (e.g., concepts or destinations, etc.) related to the content accessible at that URL (e.g., the publisher's web content 408 presented on the web page accessible at that URL).

To facilitate the collection of data on publishers' web sites, the chat system 400 may include site indexer 492. Each publisher's web site includes a set of URLs that may be accessed at that publisher's domain. The site indexer 492 may operate periodically (e.g., nightly, weekly, etc.) to index a publisher's web site by accessing the URLs associated with the publisher's web site and "scraping" or otherwise obtaining the publisher's web site content 408 that is presented on each of the publisher's web pages (e.g., the content accessed at a particular URL). When the content is obtained for a publisher's web page, as this content usually includes natural language, the site indexer 492 may extract entities (e.g., concepts or destinations, etc.) from the content 408 for the publisher's web page. The site indexer 492 can employ the data extractions services 442 or interfaces 444 to take as input the content scraped from the publisher's web page to extract one or more entities (entity types) from the content and return the extracted entities to the site indexer 492. These entities may include a set of concepts, including, for example, those related to geography or geographic regions, destinations, time, trip types, activities, amounts, units, names, colors, etc. The data returned from each of the entity extraction services may be saved into the publisher web site index 482 in association with the URL for that publisher's web page.

Advertiser data store 484 may include data associated with advertisers who desire to present content through a chat driven interface in a display unit on a publisher's web page (e.g., where the publisher may be completely unaffiliated with the advertiser). Each advertiser which it is desired to display a chat drive interface form the chat system 400 on their web site may be assigned an advertiser identifier by the operators of the chat system 400 and data associated with the advertiser stored in the advertiser data store 484. This advertiser data 484 may include an identification of the publishers' web sites on which the advertiser's content may be displayed (e.g., because either a publisher desires that the content of a particular advertiser not be displayed in association with their web site or an advertiser desires that their content not be displayed on a particular publisher's site, etc.). The advertiser data 484 may also include entities (e.g., concepts or destinations) associated with an advertiser, an identification of particular advertiser content and entities, or one or more rules associated with the advertiser, such as a rule defining a business relationship (e.g., a compensation or payment mechanism by which the advertiser pays or otherwise compensates the operators of the chat system 400 in association with the display of the advertisers content on a publisher's web site, etc.).

Accordingly, when a user at device 402 accesses a publisher's web page 412 through browser 406 executing on his device (e.g., by typing a URL associated with publisher's web site into the browser's address bar, clicking on a link in another web page, etc.), a request for the URL associated with a particular web page of the publisher's web site is sent to the publisher's web server 404 from the user's browser 406. The publisher's web server 404 constructs a page 412 to return to the user's browser using the publisher's website content 408. The constructed page may include a display container (e.g., defined by a div or iframe tag) associated with a chat system widget 405. The display container may be of the size typically used to display a web based advertisement such as, for example a 600×300 size container, or the like. The chat system widget 405 may be incorporated directly into the publisher's web page 412 being constructed (e.g., the script code for the chat system widget 405 may be include in the page 412 as returned from the web server 404) or a script tag referencing a URL from which the widget 405 may be requested may be included in the web page in association with the display container. The constructed web page 412 is returned from the publisher's web server 404 to the user's browser 406 where the page 412 is loaded in the user's browser and the associated chat system widget 405 is executed by the browser 406 or the user's device 402.

When the chat system widget 405 is initially executed (e.g., when the chat system widget is initially loaded by the browser 406 as defined by an "onload" attribute) it may send an initial request to the chat system interface 410 of the chat system 400. This request may include the URL of the publisher's web page or other data, including for example, an identifier for a user or device 402 (e.g. a GUID for the user or device), the user's location, IP address, or cookie data associated with the user or user's browser. This cookie data may include, for example, data from cookies associated with the publisher's web site or cookies stored and maintained by the chat system 400.

This initial request may be received by the chat interface 410 of the chat system 400. As discussed, the chat interface 410 may be a single endpoint or may have two or more endpoints (e.g., an inti endpoint and a chat endpoint), thus when the initial request is received at the chat interface 410 (e.g., an init endpoint), the chat interface may determine from the format of the request (e.g., the set of query parameters associated with the request) that the request is an initial request from a chat system widget 405 being used on a publisher's web page 412. If the chat interface 410 determines that the request is an initial request from the chat system widget 405 on a publisher's web page 412 it may provide that initial request to ad controller 486.

Ad controller 486 may receive this initial request (or the parameters of the initial request) including the URL of the publisher web page 412 or the identifier of the publisher. The ad controller 486 may utilize the URL of the publisher's web page 412 (or the publisher identifier) as an index into the publisher's web site index 482 to obtain the data associated with the URL of the publisher's web page 412, including the entities (e.g., concepts or destinations) associated with the publisher's web page 412. In one embodiment, the ad controller 486 may utilize a user (or device) identifier (if one is provided) to access any historical sessions 472 associated with the user. The ad controller 486 may determine one or more entities (e.g., concepts or destinations) associated with the user from these historical sessions 472 (e.g., the most recent destinations or concepts returned or associated with the user in the most recent historical session 472).

Using the entities (e.g., concepts or destinations) associated with the publisher's web page 412 (as obtained from the publisher web site index 482), the ad controller 486 may select an advertiser or associated advertiser content, to provide in response to the initial request so the selected advertiser's content can be presented to the user in the chat interface 414 in the display container on the publisher's web page 412. In particular, the ad controller 486 may include a set of ad selection rules to select the advertiser or advertiser content from the advertiser data store 484. These rules may first be applied to determine the set of advertisers that are allowed to be displayed on that publisher's web site (including the publisher's web page 412). This set of allowable advertisers can then be scored on relevance by comparing the entities associated with the publisher's web page 412 with the entities associated with the advertisers or the advertisers' content. This score may be a similarity score based on the similarity of the concepts, destinations or other entities stored for the publisher's web page 412 and for the advertisers or advertisers' content.

The allowable advertisers can then be ranked based on their relevance scores and, in one embodiment, the amount or percentage of compensation associated with the advertiser (e.g., the amount or percentage the advertiser will pay operators of the chat system 400 when their content is displayed on a publisher's web site). The top ranked advertiser can then be selected. In one embodiment, these ad selection rules may be implemented as a machine leaning algorithm that may select the advertiser or content based on, for example, the concepts or destinations associated with the publisher's web site, the advertiser content or that the user subsequently selects or interacts with, the depth of interaction with the chat based interface 414 after such advertiser content is presented, or other criteria.

Once the advertiser is selected, advertiser content and a chat interaction may be determined and returned to the user. In one embodiment, the advertiser content and chat interaction may be determined by ad controller 486 when determining the selected advertiser. In particular, the advertiser data store 484 may include content for travel related items (e.g., flights, hotels, packages, etc.) associated with the selected advertiser. These travel related items for the advertiser may also have associated entities (e.g., concepts and destinations). Thus, the travel related items for the selected advertiser may be (e.g., individually) scored based on the based on the similarity of the concepts, destinations or other entities stored for the publisher's web page 412 and for the selected advertiser's travel related items. The travel related items may then be ranked based on the determined score and one or more travel related items for the advertiser selected. The content for the selected travel related items may be used to form a response with this content to return to the chat system widget 405 through interface 410. This response may include one or more objects (e.g., JSON objects) associated with the selected advertiser content. Additionally, an initial interaction for presentation in the chat portion of the chat system interface may be determined and included in the response. This initial interaction may be associated with, for example, a destination, a travel related item, the selected advertiser, or may be a general greeting. Other interactions are possible and are fully contemplated herein.

In such an embodiment, in the event that adequate content for the determined advertiser cannot be determined default content and a default initial interaction may be determined. This default content and default interaction may, for example, be stored in the advertiser data store 484 in association with the advertiser identifier. The default content may, for example, be a logo or picture with a default interaction of "Ask me about [publisher's] destinations!" or the like.

The chat system widget 405 may receive the response from the ad controller 486 and process the included objects to render or update the chat driven interface 414 presented in the container on the publisher's web page 412 by presenting the content for the travel related items (or default content) in the display portion of the interface 414 and the initial (or default) interaction in the chat portion of the interface 414.

In another embodiment, ad controller 486 may return an advertiser identifier and a set of entities (e.g., concepts and destinations) to the chat system widget 405 in response to the initial request from the chat system widget 405. When the chat system widget 405 receives this response, the chat system widget 405 may initiate a subsequent request to the chat system interface 410 with the advertiser identifier and the set of entities returned from the ad controller 486. The chat system interface 410 may receive this subsequent request and determine that the request should be provided to the chat orchestrator 440. The chat orchestrator 440 may process this request substantially as detailed above to select content from the identified advertiser and form a response with this content and an interaction to return to the chat system widget 405 through interface 410. These responses may include one or more objects associated with the selected advertiser content. The chat system widget 405 may receive this response and process the included objects to render or update the chat driven interface 414 presented in the container on the publisher's web page 412 by presenting the content for the advertiser's travel related items in the display portion of the interface 414 and the interaction in the chat portion of the interface 414.

In the manner described above, embodiments may utilize the entities (e.g., concepts and destinations) of the publisher's web site content 408 to initialize a chat driven interface 414 presented in a display container included in that publisher's web page 412, including initialization with contextual advertiser content. Moreover, once the chat driven interface 414 presented in the display container on the publisher web page 412 is initialized (e.g., initial content or an initial interaction for the chat portion is presented in the interface 414) the chat system widget 405 may interact with the chat system 400 substantially as described above such that the chat orchestrator 440 may process these subsequent requests to return the selected advertisers content and responsive interactions to the user through the chat driven interface 414 presented in the display container.

As in many cases, there may be established and extensive networks for the distribution of content through ad containers on publisher's web pages, and publishers may already be extensively familiar and integrated with such ad distribution networks, in certain embodiments these ad distribution networks may be leveraged to present chat driven interfaces in display container's on a publisher's web page. In particular, such a chat driven interface may be presented in a display container (often referred to as an ad container or ad unit) on a publisher's page alongside travel related content provided by the publisher's web site. The display container may be of the size typically used to display a web based advertisement such as, for example a 600×300 size container, or the like (other sizes are imaginable and are fully contemplated herein). The chat driven artificial intelligence system may utilize the context of the publisher's web site, including for example, the entities (including concepts and destinations) expressed in the content of the publisher's web page to initialize and drive the chat driven interface, including the content presented in the display portion of the interface.

Figure 5:
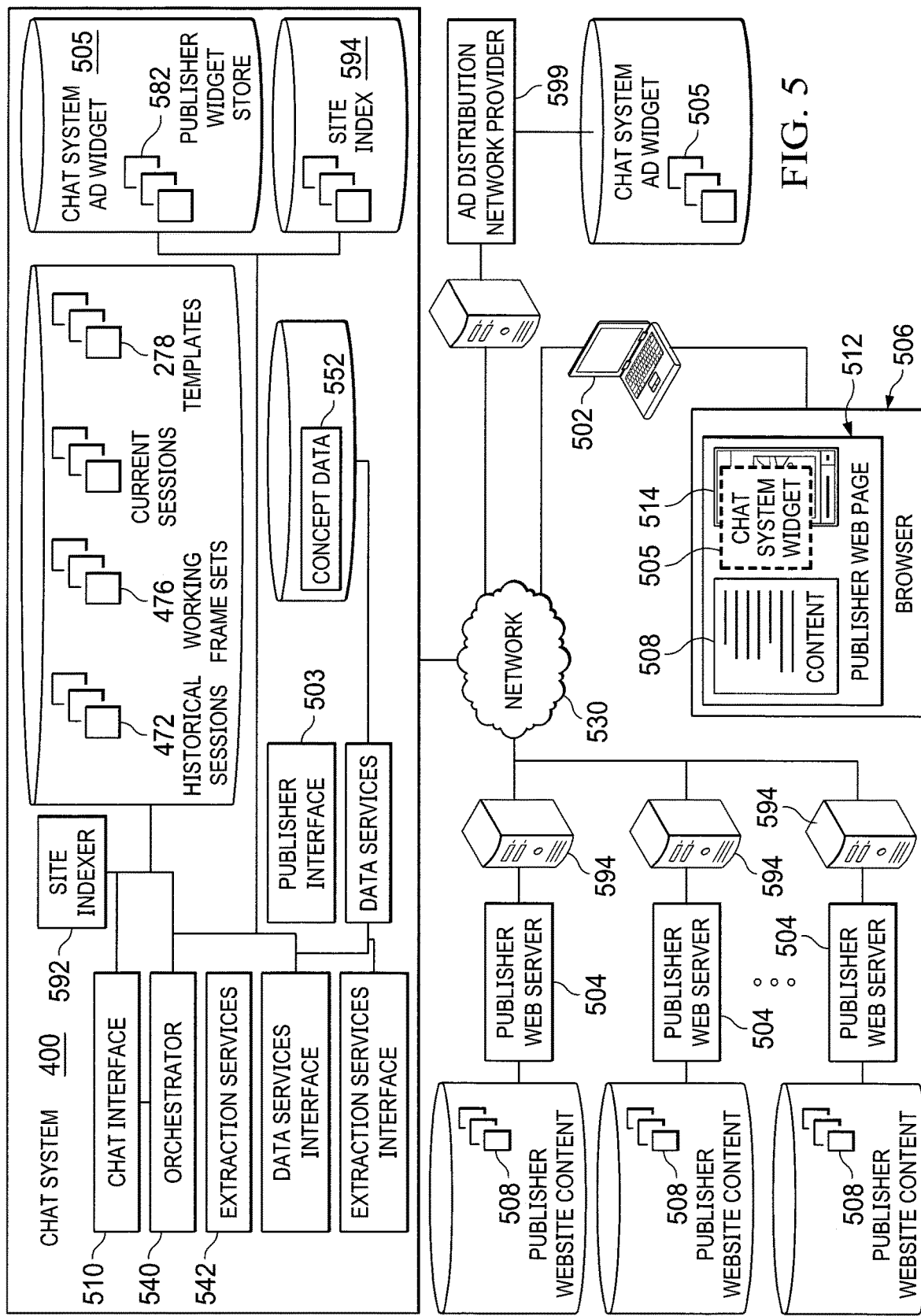
FIG. 5 is a block diagram of one embodiment of a computer network topology that includes an embodiment of a chat driven artificial intelligence system.

Moving then to FIG. 5, one embodiment of a computer network topology that includes an embodiment of a chat system for presenting a chat driven interface in a display container on a publisher's web page using an ad distribution network is depicted. Again, chat system 500 may be accessed over a network 530 such as the by users or applications at computing devices 502 where this access is facilitated through chat interface 510. Here, chat system 500 may provide a publisher interface 503 that offers a set of interface where a publisher 594 or user associated therewith may define the "look and feel" or associated content or initialization of the chat driven interface that will appear in the publisher's web page 512. In this manner, a publisher 594 may define multiple different chat driven interfaces for different purposes or "campaigns". Additionally, in one embodiment, a publisher 594 may utilize the publisher interface 503 to specify one or more concepts or entities for use with a particular chat driven interface.

Based on the publisher's definition for the chat driven interface a template for each particular definition can be stored as templates 578 associated with the publisher 594, an identifier for the publisher 594, or the identifier for that particular configuration for the chat driven interface. Moreover, a corresponding chat system widget 505 for the publisher's definition may be created. This chat system widget 505 may be configured according to the definition by configuring the chat system widget 505 to make a call (e.g., a request to the /init endpoint of the chat interface 510) for the template 578 associated with that definition. Such a configuration may be, for example, including a tag or other code in the widget 505 that references the associated template 578 (e.g., includes an identifier for the associated template) and will cause a call to be made that includes the reference to the template. In cases where the publisher's definition includes concepts or entities, the associated chat system widget 505 may also be configured according to those concepts or entities by including these concepts or entities in the a tag or other code in the widget 505 that will cause a call to be made. Thus, such a call to the chat interface 510 may also include such concepts or entities. These chat system widgets 505 may then be stored in publisher widget store 582.

At some point then, these chat system widgets 505 may be deployed within an ad distribution network provided by an ad distribution network provider 599 such as DoubleClick by Google or the like. Thus, the chat system widgets 505 may be deployed at the ad distribution network provider 599 and may be served to a user's web browser 506 when a user access a publisher's web page 512. For example, a publisher's web page 512 may include a display container that may reference the ad distribution network provider 599 and a particular campaign or chat system widget 505 (e.g., may include an identifier associated with the campaign or widget 505).

Accordingly, when a user access the web site provided by the publisher web server 504 at their device 502 using the web browser 506 on their device the publisher's web page 512 may be provided by the publisher's web server 504. As the display container of the publisher's page 512 references the ad distribution network provider 599, a request may be sent to the ad distribution network provider 599. The request may include reference the publisher's campaign of chat system widget 505. In response to this call, the ad distribution network provider 599 may provide the referenced chat system widget 505 to the requesting browser 506 where it is loaded in the display container of the publisher's web page 516.

As has been discussed the chat system widget 505 is configured to when the chat system widget 505 is loaded in the display container (e.g., an executed by the browser 506), it may send an initial request to the chat system 500 identifying the URL of the publisher's web page and a template 578 associated with the chat system widget 505. If the chat system widget 505 was configured with concepts or entities these may also be provided in association with the request. Additionally, the request may include one or more tags or other metadata provided by the ad distribution network provider 599 in association with the publisher's web page 512.

To illustrate in more detail, in many cases ad distribution network providers 599 or publishers' 594 may provide metadata in association with the web page 512 or display container (e.g., frame) on the publisher's page 512 in which the content is to be presented. This metadata may, for example, define the web context or other data regarding the web page 512 in which the display container exists. This may allow, for example, tracking or analytics to be performed in association with the publisher's web page 512 or advertisements presented within that display container in association with the publisher's web page 512. Examples of such tags include Urchin Tracking Module (UTM) parameters or the like.

In one embodiment, chat system widget 505 when composing an initial request to the chat system 500, may access such metadata if it is present or available with respect to the publisher's web page and include such metadata as parameters to this initial request. For example, the chat system widget 505 may access any utm_term parameters included in association with the publisher's web page 512 and include these terms as parameters to the request.

The chat system 500 may utilize the identifier of the template 578 to access the template 578 associated with the chat system widget and return the template 578 along with a response frame including content to display in the display portion of the chat driven interface 514 or a chat interaction to present in the chat portion of the interface 514. In particular, the chat system 500 may receive the request and determine any concepts or entities associated with the request. These concepts and entities may be determined from the request and may have originated, for example, from the configuration of the chat system widget 505 or may have been included in the request based on metadata as determined from the publisher's web page 512 or display container included therein.

In one embodiment, concepts or entities for the publisher's web page 512 may be determined in real-time at the point an initial request is received from the chat system widget 505. Specifically, such a request may include the URL of the publisher's web page or web site. When the request is received at the chat interface 510, the URL of the publisher's web page 512 or web site may be provided to site indexer 592. The site indexer 592 may operate in real-time to index a publisher's web site by accessing the URL associated with the publisher's web site and "scraping" or otherwise obtaining the publisher's web site content that is presented on the publisher's web page 512 (e.g., the content accessed at the URL). When the content is obtained for a publisher's web page the site indexer 592 may extract entities (e.g., concepts or entities, etc.) from the content for the publisher's web page 512. These concepts or entities may be returned by site indexer 592 to the chat interface 510 for inclusion in the request to the chat orchestrator 540.

Additionally, in one embodiment, a site index 594 may be created by the site indexer 592 which maps URLs of publisher web pages 512 to associated extracted concepts or entities. Accordingly, when the request is received at the chat interface 510, the URL of the publisher's web page 512 or web site may be provided to site indexer 592. Here, the site indexer 592 may access site index 594 to determine if the web page 512 associated with the URL has already been indexed. If so, the concepts or entities may be determined from the site index 594 based on the URL and returned to the chat interface 510 for inclusion in the request to the chat orchestrator 540. If the web page 512 associated with the URL for the web page 512 has not been indexed, it may be indexed in real-time as discussed.

Alternatively, in one embodiment, the site indexer 592 may return an error or an indication that no concepts or entities have been found to the chat interface 510. The site indexer 592 can then access the web page 512 associated with the URL can then be indexed asynchronously to the received request at a later point and added to the site index 592 such that subsequent requests for that URL can be satisfied utilizing the site index 594.

The request received from the chat widget 505 at the chat interface 510, including any included or determined concepts and entities may be passed to orchestrator 510. The chat orchestrator 540 may process this request substantially as detailed above to select content and form a response with the template 578, the selected content and an interaction to return to the chat system widget 505 through interface 510. These responses may include one or more objects associated with the selected content. As may be noted, this may be content particular to an advertiser as discussed above, may be content associated with a data service of the chat system 500 or may be some combination. The chat system widget 505 may receive this response and process the included objects to render or update the chat driven interface 514 presented in the container on the publisher's web page 512 by presenting the content in the display portion of the interface 414 and the interaction in the chat portion of the interface 514.

In the manner described above, embodiments may utilize the entities (e.g., concepts and destinations) as determined from the publisher's configuration or from metadata associated with the web page by the publisher 594 or ad distribution network provider 599 to initialize a chat driven interface 514 presented in a display container included in that publisher's web page 512, including initialization with contextual content. Moreover, once the chat driven interface 514 presented in the display container on the publisher web page 512 is initialized (e.g., initial content or an initial interaction for the chat portion is presented in the interface 514) the chat system widget 505 may interact with the chat system 500 substantially as described above such that the chat orchestrator 540 may process these subsequent requests to return the selected content and responsive interactions to the user through the chat driven interface 514 presented in the display container.

As the goal of embodiments of chat driven artificial intelligence systems is to select and provide accurate content reflective of the concepts or destinations expressed by the user it may therefore be desirable in many instances to premise the search for items and related content on a knowledge base that includes concepts (referred to herein as a concept network). This is the case at least because the concepts that may be used to search for items and related content are not necessarily expressly provided by the user. Instead, in many cases the concepts used for this searching may be derived from the natural language statements of the user (e.g., as provided in a chat interface) or other sources.

Accordingly, embodiments of the data services of the chat driven artificial intelligence system may create, maintain or utilize concept networks. These concept networks may include a graph comprised of nodes and edges, where the nodes may include concept nodes and the edges may include relationships between these concepts nodes (e.g., concepts) and other nodes, including other concept nodes or nodes associated with various items. In a travel related context, for example, these nodes may represent items such as hotels, destinations, flights, attractions, activities, etc. The relationships indicated by the edges of the concept network may be assigned weights or scores indicating a degree of affinity between the nodes related by a relationship, including, for example, the degree of affinity between a concept represented by a concept node and an item node to which that concept node is related. Additionally, the relationships may be directional, such that they may be traversed only in a single direction, or have different weightings depending on the direction in which the relationship is traversed or the nodes related.

Embodiments of such a concept network can thus be searched (or navigated) to determine items (and related content) associated with one or more concepts. Moreover, the degree of affinity between the concepts and items may be determined using the weights of the relationships in the concept network. In particular, concept networks including nodes representing travel related items such as hotels or destinations may be used in travel related systems to search for and provide these travel related items (and related content) associated with one or more concepts. In this manner, the travel related content related to the concepts expressed by, or determined from, a user may be utilized to provide insightful items and content to the user. It should be noted here that while concept networks and the creation, updating and use of such concept networks are particularly germane to the context of travel related artificial intelligence systems and that is the context in which embodiments are illustrated, after a review of this disclosure those of ordinary skill will understand that embodiments of concept networks and their use may be applicable to, and utilized in, a wide variety of other context, all of which are fully contemplated herein.

Specifically, a concept network may be thought of as a graph comprising a number of interrelated nodes. These nodes may include nodes that may have labels defining the type of the node (e.g., the type of "thing" or entity that the node represents) and properties that define the attributes or data of that node. In a travel related context then, such a concept network may associate nodes representing travel related items with concepts. Moreover, the travel related items may also be associated with content for those travel related items. The content can be stored as a property of the node representing a travel related item or as part of a distinct node related to the node representing the travel related item. For example, the labels of the nodes of a concept network may include CONCEPT, IMAGE, USER, HOTEL, FLIGHT, DESCRIPTION, EVIDENCE, IMAGE, DESTINATION, ATTRACTION, or the like. Properties of a node may include, NAME:[NAME], SOURCE:[SOURCE], SYNONYMS:[LIST OF SYNONYMS], or the like.

Thus, the concepts represented in a concept network may include almost any concepts desired. These concepts have concept nodes (e.g., a node with the label "CONCEPT") with one or more properties defining the concept (e.g., names such as "pool", "spa", "kid", "brisket", "$", "$$, etc.). In certain embodiments, the names for concepts may be uni-grams, bi-grams or tri-grams (e.g., concepts that may be expressed in one, two or three word or symbol groups).

The nodes of the concept network may be interrelated using relationships that form the edges of the graph. A relationship may connect two nodes in a directional manner. These relationships may also have a label that defines the type of relationship and properties that define the attributes or data of that relationship. These properties may include an identification of the nodes related by the relationship, an identification of the directionality of the relationship or a weight or degree of affinity for the relationship between the two nodes. For example, the labels of the relationships of a concept network may include "isRelatedto" (e.g., for relationships between concept nodes), "hasConcept", "hasDescription", "hasEvidence", "hasAttraction", or the like.

Figure 6A:
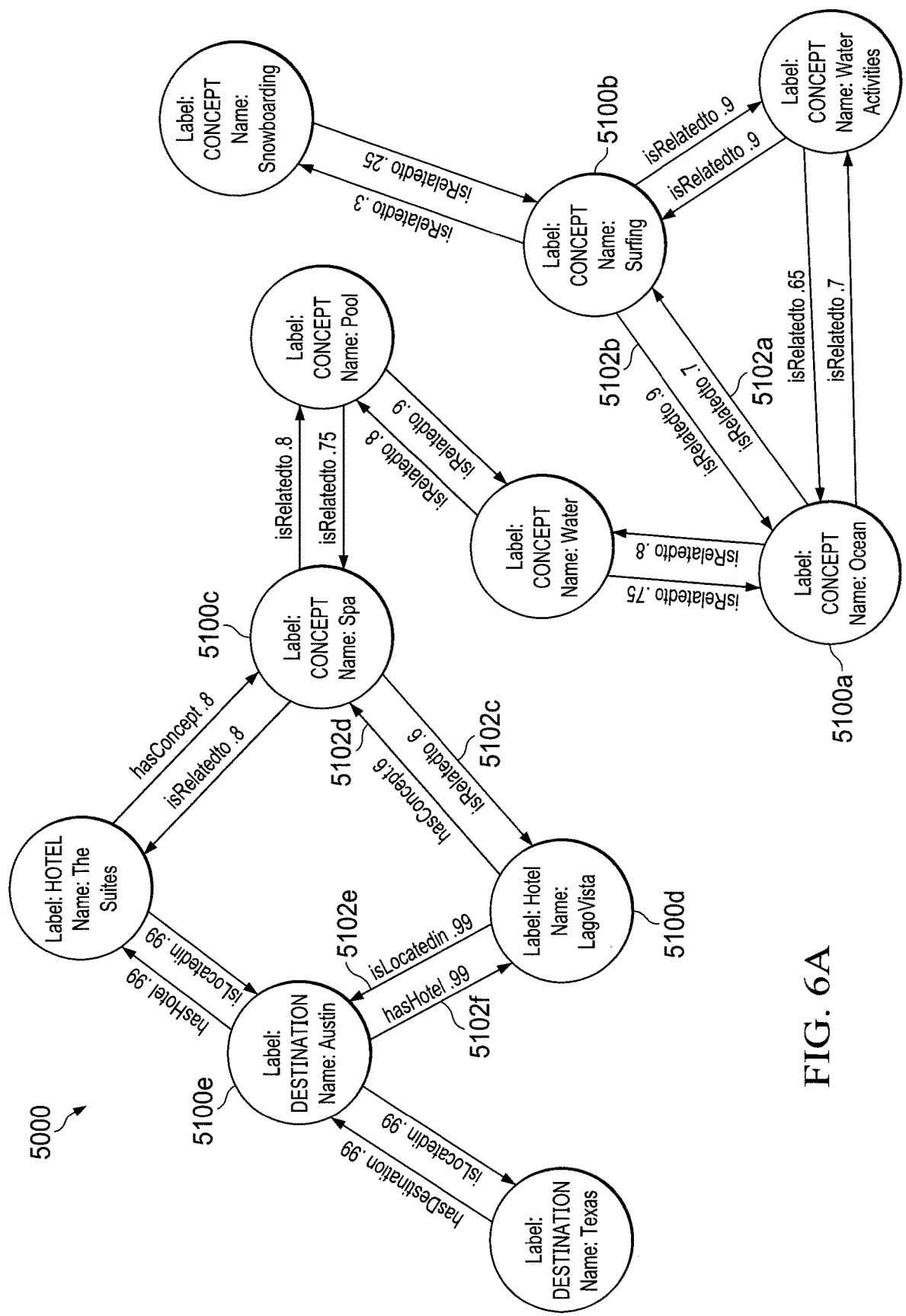
FIGS. 6A and 6B are depictions of a concept network.

It may be useful here to an understanding of concept networks to illustrate an example of such a concept network. Referring then to FIG. 6A, a graphical depiction of a portion of an example concept network 5000 is depicted. Here, nodes are represented by circles and relationships are represented by the directional arrows between the nodes. Such a concept network 5000 may represent concepts, their association and the degree of affinity between entities represented by the nodes. Thus, for example, the concept node 5100*a* has a label "CONCEPT" indicating it is a concept node and a name "Ocean" indicating the concept node represents the concept of an ocean. Similarly, concept node 5100*b* has a label "CONCEPT" indicating it is a concept node and a name "Surfing" indicating the concept node represents the concept of surfing. These nodes of the graph are joined by edges formed by directed relationships 5102*a*, 5102*b* representing that the concept of Ocean (represented by node 5100*a*) is related to (represented by the labeled "isRelatedto" relationship 5102*a*) the concept of Surfing (represented by node 5100*b*), and the concept of Surfing (represented by node 5100*b*) is related to (represented by the labeled "isRelatedto" relationship 5102*b*) the concept of Ocean (represented by node 5100*a*).

Note that each relationship 5102 may have a different weight (even in the case where the relationship 5102 is the same type of relationship between the same nodes). The ability to assign different weights to directional relationships (even the relationships of the same type between the same two nodes) may allow a concept network to reflect, for example, that there is a hierarchy to some concepts. For example, in the instant example, the concept of surfing may be strongly tied to the concept of ocean, but the concept of ocean may be much broader than the concept of surfing. It will also be noted that in certain embodiments, these weights may be negative indicating, for example, a strong degree of dissimilarity.

These concept networks not only represent that concepts are related to one another, but additionally may also represent that entities (including real-world entities such as hotels, destinations, flights, etc.) are associated with certain concepts and the degree of affinity between these concepts and entities. As an example in concept network 5000, the concept node 5100*c* has a label "CONCEPT" indicating it is a concept node and a name "Spa" indicating the concept node represents the concept of a spa. Similarly, node 5100*d* has a label "HOTEL" indicating it is a hotel node and a name "LagoVista" indicating the hotel node represents the Lago-Vista hotel. These nodes of the graph are joined by edges formed by directed relationships 5102*c*, 5102*d* representing that the concept of Spa (represented by node 5100c) is related to (represented by the labeled "isRelatedto" relationship 5102c) the LagoVista hotel (represented by node 5100d), and the LagoVista hotel (represented by node 5100d) is related to (represented by the labeled "hasConcept" relationship 5102d) the concept of spa (represented by node 5100c).

A concept network may also represent relations between entities. In concept network 5000 for example, node 5100e has a label "Destination" indicating it is a destination node and a name "Austin" indicating the destination node represents the destination Austin. The Austin destination node 5100e is joined to the LagoVista hotel node 5100d by edges formed by directed relationships 5102e, 5102f representing that the LagoVista hotel (represented by node 5100d) is related to (represented by the labeled "isLocatedin" relationship 5102e) the destination of Austin (represented by node 5100e), and the destination of Austin (represented by node 5100e) is related to (represented by the labeled "hasHotel" relationship 5102f) the LagoVista hotel (represented by node 5100d).

As can be seen from the example illustrated, a concept network can represent a wide variety of entities and concepts, and the relationships between them, in a graph like manner. The consanguinity (if any) of any two nodes in the concept network can thus be determined according to a path between the two nodes and the degrees of affinity associated with the relationships of that path. It will be noted that these concept networks may be stored in any suitable format and according to any suitable storage, including, for example, a graph store such as Neo4j or OrientDB, a triple store, a relational database such as Postgres, etc. Access and queries to such a concept network may thus be accomplished using an associated access or query language (e.g., such as Cypher in the case where the Neo4j graph store is utilized or Elasticsearch or Postgresql in the case of Postgres, etc.).

Now with an idea of concept networks in mind, attention is directed to artificial intelligence systems and associated data services that may employ these concept networks in the context of travel. Specifically, in certain embodiments, searching data services utilizing a concept network may be provided whereby one or more concepts may be provided to the searching data service through an interface. These searching data services may construct a search for a particular type of travel related item (e.g., a hotel) based on the concepts received and return an ordered list of items (and related content) based on the degree of affinity between the received concepts and the items as represented in the concept network.

Utilizing embodiments of a concept network, such searches may accurately return real-world travel related items and related content associated with concepts to a user. Moreover, these concept networks may be automatically created or updated without user involvement based on a wide variety of criteria to continually improve the accuracy or performance of the data services performing such searches. Additionally, embodiments may employ certain types of relationships, types of concept networks, storage of the concept network, or divisions of the concept network, to achieve greater speed or reduce the processing or memory required in the storage, searching or other processing accomplished in association with such creating, updating, searching or storing concept networks.

Figure 7:
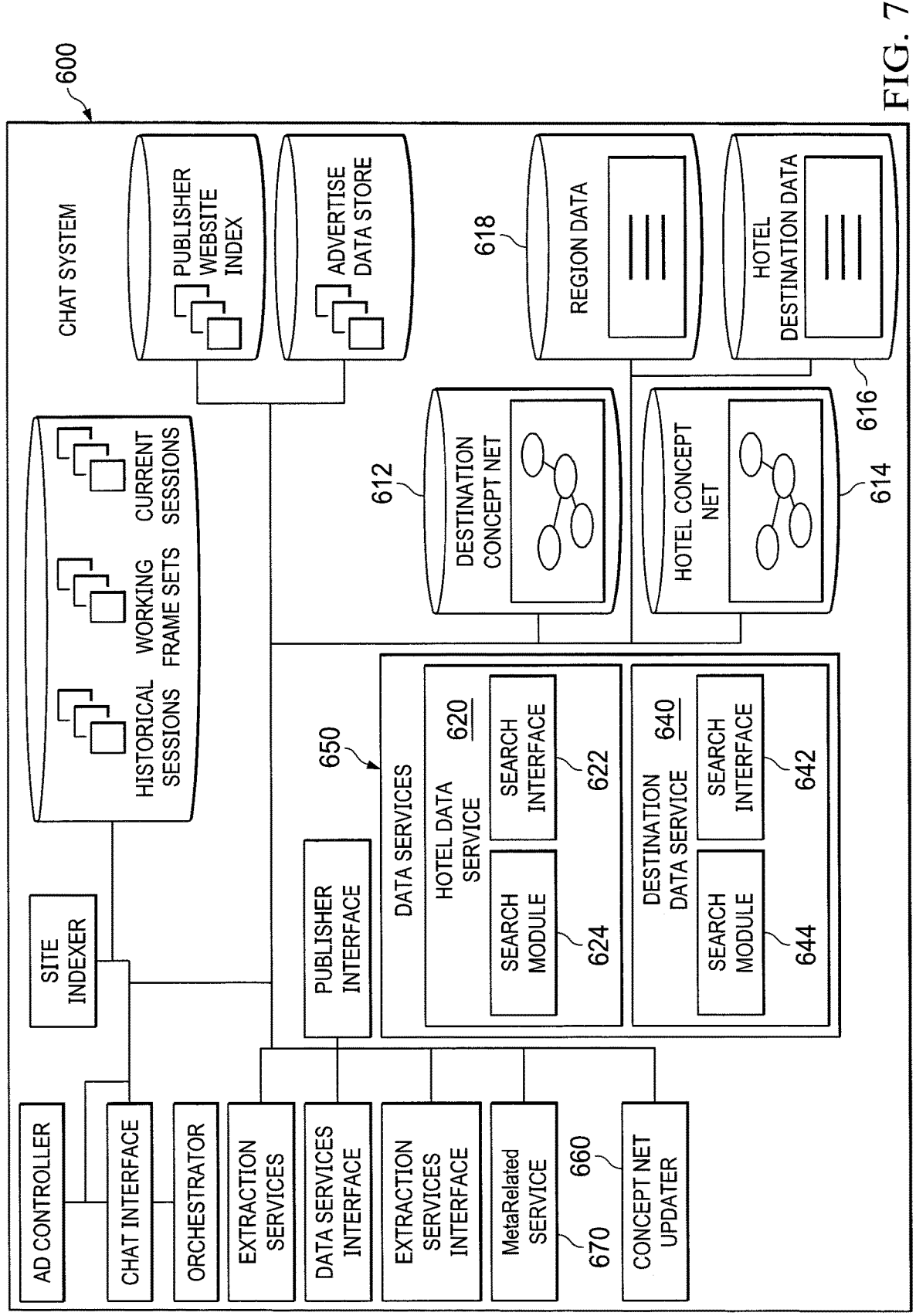
FIG. 7 is a block diagram of one embodiment of a chat driven artificial intelligence system.

FIG. 7 depicts one embodiment of a travel related artificial intelligence system 600 employing concept networks in association with a data service that may be utilized to search these concept networks. Certain depicted components operate substantially similarly to those discussed above and will not be discussed in association with FIG. 7. In this embodiment, different concept networks for different entities may be created or stored separately in order to, for example, increase the performance of the searching or other interactions with the concept networks. These concept networks may be used in association with other data by the data services 650 to return travel related items and associated content in response to requests received at those data services 650.

In particular, a destination concept network 612 may be a concept network that includes nodes representing destinations, other entities related to those destinations and concepts related to those destinations and entities. Such a destination concept network 612 may be stored, for example, in a relational database such as Postgres. In certain embodiments, this destination concept network 612 may not include nodes representing certain entities such as hotels or other accommodations (collectively referred to herein as hotels).

Hotel concept network 614 may be a concept network that includes nodes representing hotels and other entities related to those hotels and concepts related to those hotels and entities. Such a hotel concept network 614 may be stored in a graph database such as Neo4j. In certain embodiments, this hotel concept network 614 may not include nodes representing certain entities such as destinations. Hotel destination data 616 may be an association of hotels with their locations. This association may comprise, for example, an association between a hotel and one or more GeoJSON objects for that hotel (or may be a JSON object for the hotel including such a GeoJSON). Hotel destination data 616 may, for example, be stored in a relational database such as Postgres. Region data 618 may include data on various geographical regions. Specifically, region data 618 may include one or more GeoJSON objects that define or bound an associated region. Thus, region data 618 may be accessed to determine the metes or bounds of a particular region. This region data 618 may be stored in a relational database such as Postgres.

As discussed above, a data service 650 in the context of a chat driven artificial intelligence system may receive a request comprising one or more concepts and return one or content for one or more entities related to the concepts. One data service 650 may be a hotel data service 620. This hotel data service 620 includes an interface 622 for receiving and responding to requests and a search module 624. The hotel data service 620 receives requests through the interface 622 and utilizes the search module 624 in association with hotel concept network 612 to determine hotels responsive to the concepts of the received request and return content associated with those hotels through the interface 622. The request may include one or more concepts and optionally one or more regions. The response to this request may include one or more ordered JSON objects, the JSON objects including content for a set of ordered or ranked hotels.

In one embodiment, if a region is included in the request to the hotel data service 620 the search module 624 may first access the region data 618 to determine the metes and bounds of the regions. The search module 624 may query the region data 618 with the region specified in the request and obtain the GeoJSON associated with the region. Using the specifications for the region (e.g., the boundaries as specified in the GeoJSON for the region) the search module 624 may then query the hotel destination data 616 to determine all the hotels located within that region.

Once the set of hotels within the region are determined, each of those hotels can be scored and ranked based on the hotel concept network 614. The determination of a score between the concepts of the request and a hotel can be based on both the number of "hops" or nodes along the path traversed between the node representing the concept and the node representing the hotel, along with the degree of affinity (weight) of each relationship in the path.

Specifically, to score a hotel each of the concepts of the request is evaluated to determine the shortest path from the node representing the hotel to the node representing that concept. Each of the paths that is shortest (e.g., the fewest number of "hops" or relationships between the two nodes) may be scored by multiplying the weights of each relationship in that path. The shortest path with the highest score may be selected as the score for that concept with respect to that hotel. In one embodiment, there may be a maximum "depth" or number of hops that a path may have (e.g., 2, 3 or 4 hops), such that if a path includes more than this maximum number of hops it will not be considered as a possible shortest path or will otherwise not be utilized. If there is no shortest path between the concept (node) and the hotel (node), either because there is no path at all or because there is no path with less than a maximum depth, the score for that concept and that hotel may be assigned a zero value. Once a score for each concept is determined for the hotel, the total score for that hotel may be determined based each of the individual scores for each of the concepts of the request. This hotel score may be determined for example by summing the scores for each of the individual concepts, multiplying the scores (e.g., excluding any zero scores), averaging the scores for the concepts or otherwise. In this manner, scores for each of the hotels in the region may be determined using the hotel concept network 614 and the concepts, relationships and hotels represented therein.

A number of hotels with the highest score (e.g., the top 5, top 10, etc.) may then be selected and the content for these hotels determined. As discussed, this content for a hotel may be included in the node of the hotel concept network 614 representing that hotel or may be included in other nodes related to the node for the hotel. The content for the hotel may be included in an object for that hotel (e.g., a JSON object or the like) and the objects for each of the top ranked hotels may be returned by the hotel data service 620 in response to the initially received request.

Another data service that may be utilized by embodiments of a travel related artificial intelligence system may be a destination data service 640. This destination data service 640 includes an interface 642 for receiving and responding to requests and a search module 644. The destination data service 640 receives requests through the interface 642 and utilizes the search module 644 in association with destination concept network 612 to determine destinations responsive to the concepts of the received request and return content associated with those destinations through the interface 642. The determination of a degree of affinity between the concepts of the request and a destination can be based on both the number of "hops" or intervening nodes along the path traversed between the node representing the concept and the node representing the destination, along with the weights of each relationship in the path.

Specifically, each of the destinations of the destination concept network 612 may be scored. To score a destination each of the concepts of the request is evaluated to determine the shortest path from the node representing the destination to the node representing that concept. Each of the paths that is shortest (e.g., the fewest number of "hops" or relationships between the two nodes) may be scored by multiplying the weights of each relationship in that path. The shortest path with the highest score may be selected as the score for that concept with respect to that destination. In one embodiment, there may be a maximum "depth" or number of hops that a path may have (e.g., 2, 3 or 4 hops), such that if a path includes more than this maximum number of hops it will not be considered as a possible shortest path or will otherwise not be utilized. If there is no shortest path between the concept (node) and the destination (node), either because there is no path at all or because there is no path with less than a maximum depth, the score for that concept and that destination may be assigned a zero value. Once a score for each concept is determined for the destination, the total score for that destination may be determined based each of the individual scores for each of the concepts. This destination score may be determined for example by summing the scores for each of the individual concepts, multiplying the scores (e.g., excluding any zero scores), averaging the scores for the concepts or otherwise. In this manner, scores for each of the destinations may be determined using the destination concept network 612 and the concepts, relationships and destinations represented therein.

A number of destinations with the highest score (e.g., the top 5, top 10, etc.) may then be selected and the content for these destinations determined. As discussed, this content for a destination may be included in the node of the destination concept network 612 representing that destination or may be included in other nodes related to the node for the destination. The content for the destination may be included in an object for that destination (e.g., a JSON object or the like) and the objects for each of the top ranked destination may be returned by the destination data service 640 in response to the initially received request.

As may be imagined, the complexity of various concept networks as discussed herein may be immense, with tens or hundreds of thousands (or more) of different nodes in each. The traversal of these concept networks to determine the shortest path(s) when determining a set of top ranked hotels or destinations may therefore be computationally expensive (e.g., from a processor or memory perspective) and relatively time consuming. It may thus be desired to configure the various concept networks such that the navigation of these concept networks may be improved, reducing the use of computational resources need to accomplish such navigation and speeding the navigation of these concept networks (and thus commensurately speeding the search and reducing response times for systems and processes that must navigate these concept networks).

Accordingly, in one embodiment, concept networks 612, 614 may include "metaRelated" relationships between two or more nodes. A metaRelated relationship indicates that there is a path comprising multiple relationships (e.g., longer than a single hop) between the two nodes related by the metaRelated relationship. Moreover, the metaRelationship may have an associated weight reflective of the weights of the relationships in the path between the two nodes represented by the metaRelated relationship.

Figure 6B:
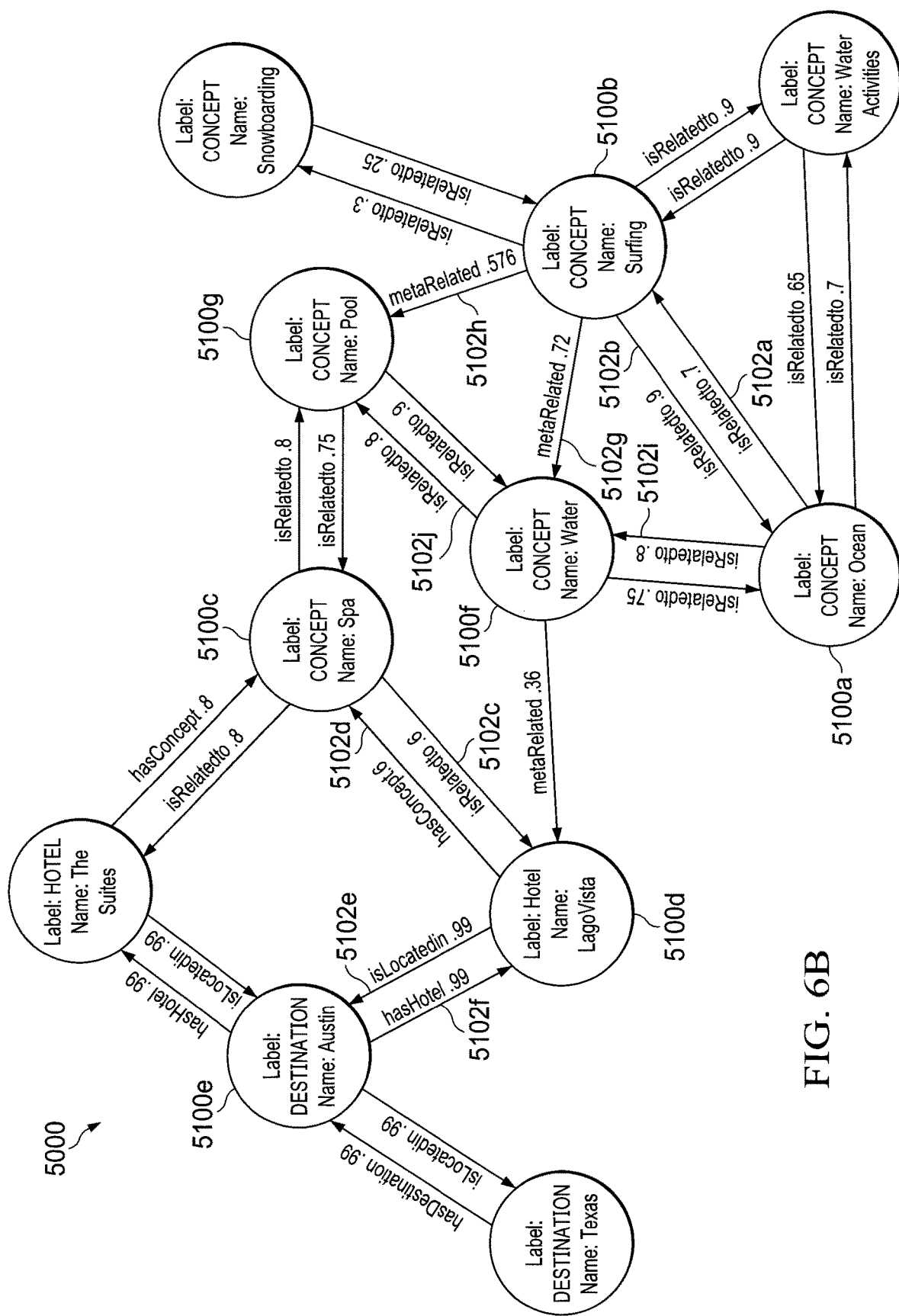

It may be useful to briefly illustrate the use of metaRelated relationships with the reference to the previously provided example of a concept network. Referring then to FIG. 6B, the example concept network 5000 is depicted along with metaRelationships that have been added. As discussed, concept node 5100b has a label "CONCEPT" indicating it is a concept node and a name "Surfing" indicating the concept node represents the concept of surfing, concept node 5100a has a label "CONCEPT" indicating it is a concept node and a name "Ocean" indicating the concept node represents the concept of an ocean and concept node 5100f has a label "CONCEPT" indicating it is a concept node and a name "Water" indicating the concept node represents the concept of water.

These nodes of the graph are joined by edges formed by directed relationships 5102b, 5102i representing that the concept of Surfing (represented by node 5100b) is related to (represented by the labeled "isRelatedto" relationship 5102b) the concept of Ocean (represented by node 5100a) with a weight of 0.9, and the concept of Ocean (represented by node 5100a) is related to (represented by the labeled "isRelatedto" relationship 5102i) the concept of Water (represented by node 5100f) with a weight of 0.8. The metaRelationship relationship 5102g represents this shortest path from the Surfing concept node 5100b to the Water concept node 5100f along the path defined by relationship 5102b, Ocean node 5100a and relationship 5102i. Additionally, metaRelationship relationship 5102g may be assigned a weight of 0.72 reflecting the weights of the relationships 5102b, 5102i in that shortest path (e.g., the product of the 0.9 weight of relationship 5102b and the 0.8 weight of relationship 5102i).

Similarly, the metaRelationship relationship 5102h represents the shortest path from the Surfing concept node 5100b to the Pool concept node 5100g along the path defined by relationship 5102b, Ocean node 5100a, relationship 5102i, Water node 5100f and relationship 5102j. Additionally, metaRelationship relationship 5102h may be assigned a weight of 0.575 reflecting the weights of the relationships 5102b, 5102i and 5102j in that shortest path between the Surfing node 5100b and the Pool node 5100g (e.g., the product of the 0.9 weight of relationship 5102b, the 0.8 weight of relationship 5102i and the 0.8 weight of relationship 5102j).

Thus, as will be recalled from above, to score a travel related item (e.g., destination or hotel) with respect to a concept the search modules 624, 644 may determine the shortest path from the node representing the item (e.g., destination or hotel) to the node representing that concept and a score associated with that shortest path. In some embodiments then, to determine such a shortest path and related weight it can be determined if there is a metaRelated relationship between the concept node and the node representing the travel related item, and the score associated with such a metaRelated relationship. In some embodiments as there may be a maximum "depth" or number of hops that a shortest path may have (e.g., 2, 3 or 4 hops) a metaRelated relationship between two nodes will only be established between two nodes if the shortest path between the two nodes contains an equal or lesser number of hops than this maximum depth.

In this manner, the determination of every path between the concept node and the node for the travel related item to determine the shortest path between them may be avoided when a request is received at a data service, along with the avoidance of the calculation of the degree of affinity of the shortest path. Consequently, the number of processor cycles and amount of memory utilized to make such determinations may be severely reduced. Moreover, the speed with which the determination of travel related items and associated content responsive to a request received at a data service are made may be markedly increased.

As the concept networks 612, 614 may be updated or otherwise change at a fairly rapid pace, in one embodiment, metarelated service 670 may operate to update the concept networks 612, 614 with these metaRelated relationships.

The metarelated service 670 may operate asynchronously at some time interval (e.g., daily, weekly, etc.) to determine the shortest path with the highest score between each concept (or other type of) node and each other node (if a path exists). The metarelated service 670 may then determine if the shortest path is less or equal to a maximum number of hops. If the shortest path contains a number of hops less than or equal to a maximum depth the metarelated service may update the concept network 612, 614 with a metaRelationship between the nodes and assign the highest score to this metaRelationship. This update may include creating a new metaRelationship, updating a previously established metaRelationship between the nodes or removing a previously established metaRelationship between the nodes.

As has been discussed, it is desired to provide accurate and responsive travel related items to a user of embodiments of a chat artificial intelligence systems disclosed herein. Accordingly the accuracy of the concept networks used in such artificial intelligence systems is important, as the accuracy of the travel related items and associated content returned to the user is heavily premised on such concept networks. It is therefore desirable to continually refine the nodes and relationships (and weights) of the concept networks utilized based on available data. As there may be many users interacting with the travel related artificial intelligence systems and the searches, activities and interaction with the travel related chat artificial intelligence systems and its interfaces may be tracked it may be desirable to utilize such data in the refinement of the concepts network used by such artificial intelligence systems.

In one embodiment, then, the destination concept network 612 or hotel concept network 614 may be automatically updated by concept network updater 660. The concept network updater 660 may apply a set of rules, including a machine learning algorithm. These rules can take into account queries for particular concepts received through the search interfaces 624, 644 of the data services 650, the number of times particular paths through the concept network are traversed when searching the concept networks 612, 614, or user interactions with content that is presented to the user (e.g., as ascertained from web tracking data associated with interfaces presented from the artificial intelligence system to the user). These rules can serve to add new concept nodes to the concept networks 612, 614, establish new edges (relationships) or weights between concept nodes and other nodes, or adjust the weights on existing relationships.

Examples of such rules may be:
- If a user likes "ThumbsUp" content related to a search result apply a boost (e.g., increase the weight of a relationship) between all concepts associated with a user interaction on and the travel item (e.g., hotel, destination, etc.) in the result that they liked.
- If a user dislikes "ThumbsDown" content related to a search result apply a decrement (e.g., decrease the weight of a relationship) between all concepts associated with a user interaction on and the travel item (e.g., hotel, destination, etc.) in the result that they disliked.
- If a user clicks a search result, apply a boost (e.g., increase the weight of a relationship) between all concepts associated with a user interaction searched on and the travel item (e.g., hotel, destination, etc.) in the result
- If a user never clicks on a search result in the result set, then apply a decrement (e.g., decrease the weight of a relationship) between all concepts associated with a user interaction and the search results.

As mentioned above, embodiments may utilize or create an API microservice capable of receiving concepts and returning destinations or receiving a destination and responding with concepts. Generally, a system extracts concepts from a chat system and uses AI systems (such as those described above in paragraphs 9 and 36, for example) to recommend one or more destinations based on the extracted information. For example, assume that an extraction service extracts several concepts from the chat system. The systems use the extracted concepts to determine relevant destinations and points of interest based on the extracted concepts. Other factors besides the concepts can also be used, such as geo shapes, weather information, dates, etc. For example, with respect to the concept "skiing", the system may also use weather and travel date information to automatically recommend destinations. For example, if a user wants to go skiing during month A, it would not be desirable to recommend a destination that is too warm for skiing during month A, even though that destination may score high during other months. In another example, if the concept "honeymoon" is extracted, destination recommendations may include destinations that score high in related concepts such as "romantic getaway", "anniversary", etc., or other concepts mapped to the concept of "honeymoon". The destinations that are recommended by the system can be ranked based on a scoring system, as described above in detail.

With respect to scoring potential destinations, in some embodiments, the scoring process can be thought of as a matrix of trie concepts versus regions. For the purposes of this description, a trie can be thought of as a search tree data structure used to store a dynamic set or associative array of concepts, as described above. Following is Table 1, which illustrates a partial view of a simplified matrix. In this example, each row of the matrix represents a region—in this example, the cities City1, City2, and City3. In this example, each column of the matrix represents a trie concept—in this example, hiking, beach, and bars. For the purposes of this discussion, hypothetical scores are entered for each concept and city. Note that the scores can be determined by any desired method. For example, scores from third parties (e.g., Triposo—www.triposo.com) can be used and normalized.

In the example of Table 1, assume that a chat system extracts the concepts "Hiking" (column 1) and "Beach" (column 2) from interactions with a user. In this example, City3 would score the highest, since City 3 has high scores for both concepts. City2 or City1 would score second, depending on the scoring logic used. In one example, the average concept scores are used. In this example, City2 would rank second to City3 based on the average concept scores. As discussed above with respect to FIGS. 5A and 5B, the scores can be calculated in any desired way. Also note that this is a very simple example. In other examples, multiple matrices may be used and more complicated scoring logic may be used. Note that different concepts can also be weighted to get desired results. For example, perhaps "Hiking" is considered more important than "Beach". In that example, "Hiking" can be weighted more than "Beach" to get the desired results (i.e., a weighted sum). Therefore, a score for an unimportant concept will not greatly affect the overall score for a destination.

TABLE 1

|       | Hiking | Beach | Bars |
|-------|--------|-------|------|
| City1 | 0.7    | 0.1   | 0.9  |
| City2 | 0.3    | 0.7   | 0.9  |
| City3 | 0.9    | 0.9   | 0.5  |

Following is a more detailed example of some embodiments of an AI system capable of returning recommendations of destinations based on concepts extracted from the chat system described above.

Figure 8:
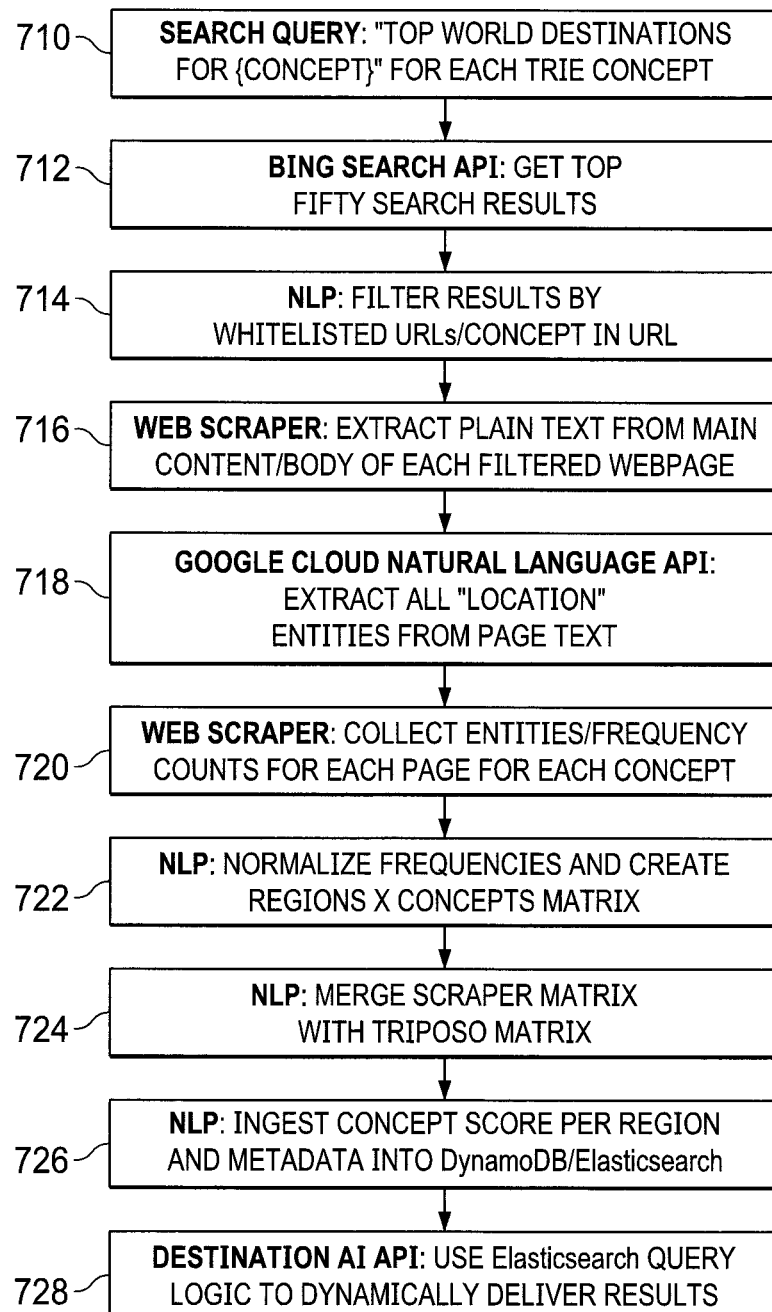
FIG. 8 is a flowchart illustrating an exemplary process for recommending destinations.

FIG. 8 is a flowchart illustrating an exemplary process for recommending destinations. The process begins at 710 where a search query is created for each concept. For example, the search query may be "top world destinations for {concept}", for each respective trie concept. In one example, this can be accomplished using the Bing Web Search API to get the top 50 search results, in the form of 50 URLs (712). Details of the Bing Web Search API can be found at [https://.microsoft.com/en-us/services/cognitive-services/bing-web-search-api/], which is incorporated by reference herein. The Bing Web Search API enables the retrieval of web documents indexed by Bing with results narrowed down by result type, freshness, and more. The search results are filtered (e.g., using whitelisted URLs/concepts) to validate the results (714). Various validation/filtering techniques may be used. For example, some URLs may be considered valid and whitelisted (e.g., www.travel.com). In another example, if the text of a respective concept is present in the URL, that may be an indication that this result is valid. For example, with respect to the concept "skiing", if a URL has the work "ski" or "skiing" in it, that may be an indication that the source is valid.

For each filtered website, plain text of the website is extracted from the main content/body of the website using a web scraper (716). Any desired web scraping tool(s) may be used. Exemplary web scraping tools include BeautifulSoup, Readability, etc. At this point, the plain text for each of the filtered web sites is available to the system. From this plain text, all "location" entities are extracted from the page text of each respective web page (718). In one example, this is done using the Google Cloud Natural Language API, which can return a list of unique location identifiers for any geographic entity referenced in the text, such as cities, states, countries, etc. In some embodiments, for each website, the system collects all of the entities found, and keeps track of the frequency count, to help determine a score for the respective entity (720).

From all of this data, frequencies can be normalized and utilized to initialize a matrix (722). In some embodiments, this matrix may include one row for each region and one column for each concept, similar to Table 1 above. Note that in some embodiments, various matrices can be derived from data sources, such as the Internet (i.e., a scraper matrix), third party data providers such as Triposo (i.e., a Triposo matrix) or Wikivoyage (i.e., a Wikivoyage matrix), etc. Such matrices may each be, like those described above, a concept by region matrix using a related methodology based on frequency counts. In some embodiments, the scraper matrix is merged with the Triposo matrix (724) (and/or any other matrices, such as the Wikivoyage matrix, etc.). Note that the matrices are not merged at query time, but beforehand, offline. The end result is a unified matrix with scores for each concept/destination based on all of the various matrices.

Note also that different matrices for different clients may have different weights, based on specifics of a client's business.

At this point, the system has a unified matrix, and the system needs to be able to search concepts. Next, tables are created in a database (e.g., DynamoDB). A separate process moves the data from the database (e.g., DynamoDB) tables into Elasticsearch. The data is then merged with data from other sources stored in a number of different databases (e.g., weather data from a Postgres database) (726). Next, this other data and the data from the unified table are put together in Elasticsearch to create a searchable database that can be indexed by concept, region, name, etc. Finally, as shown in FIG. 8, the Destination AI API is uses Elasticsearch query logic to dynamically deliver results (728).

Note that in Elasticsearch, searches can be filtered based on weather, geometry, coordinates, etc. For example, if a user only wants to go to the United States, the system can filter out results outside of the United States. Similarly, if a user wants to go somewhere warm in January, regions that are not warm in January can be filtered out. Results can also be filtered using client filters. For example, if the web publisher (client) is an airline, destinations that are not in regions where they fly can be filtered out.

Following is a brief overview of how the Destination AI querying logic works in some embodiments. In some embodiments, a search is based on the unified concept score matrix described above. As described above, in some examples, the scores in the unified matrix are derived from Triposo scores (and/or other third party sources) and the web scraper. In some examples, for a single incoming concept, the system simply finds the city that has the highest score for the input concept. For multiple concepts, an example input query could look like the following URL (specifying concepts "hiking" and "wine"):
https://dest-api.test.wayblazer.systems/destinations?x-api-key=e8824b30-1a48-11e7-bf11-81cbd96aa5d3&concept=Hiking&concept=Wine In some embodiments, at search time, the system finds the destination that has the highest weighted sum of all concept scores and their corresponding concept weights. Following is the relevant part of an exemplary search query for the example above:

```
"sort": {
  "_script": {
    "order": "desc",
    "script": {
      "inline": "(doc['concepts.Hiking'].value +
      doc['concepts.Wine'].value) / 2",
      "lang": "painless"
    },
    "type": "number"
  }
}
```

This exemplary approach is simple and works fairly well, but there are scenarios and embodiments where more sophisticated logic may be desired. For example, if one destination has a really high score for hiking but not for wine, it might still outrank a different destination with medium scores for both.

For example, look at two hypothetical destinations (destination_1 and destination_2) and their respective scores:
destination_1: Hiking is 10, Wine is 0, average is 5
destination_2: Hiking is 4, Wine is 4, average is 4

In this case, looking only at the average scores of the two concepts, the system would recommend destination_1 over destination_2, even though destination_2 might actually be the better result. Therefore, the system can be configured to recommend destinations using more sophisticated logic, as desired.

These, and other, aspects of the disclosure and various features and advantageous details thereof are explained more fully with reference to the exemplary, and therefore non-limiting, embodiments illustrated and detailed. It should be understood, however, that the detailed description and the specific examples, while indicating the some embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive subject matter will become apparent to those skilled in the art from this disclosure.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Appendix

[0222] API RESPONSE EXAMPLE

[0223] USER QUERY:

"Best foodie experience"

[0224] API REQUEST:

{username: "You", concepts: [], departure: "DFW", cabin: "Economy", query: "Best foodie experience"} cabin:"Economy"

concepts:[]

departure:"DFW"

query:"Best foodie experience"

username:"You"

[0225] API RESPONSE:

```
{
  "frame": {
    "rooms": 1,
    "adults": 1,
    "children": 0,
    "departure": "JFK",
    "type": "destination",
    "startDate": "2017-05-21",
    "endDate": "2017-05-31",
    "ipAirportCode": "DFW",
    "concepts": [
      "Food Culture"
    ]
```

```
        },
        "query": "Best foodie experience",
        "nlpData": {
            "wbNlp": {
                "PricePreference": {
                    "TripBudgetMed": null,
                    "TripBudgetMin": null,
                    "DailyMed": null,
                    "DailyMax": null,
                    "TripBudgetMax": null,
                    "DailyMin": null,
                    "CostRelative": [],
                    "HotelStarRating": null
                },
                "AccommodationType": [],
                "AccommodationConcepts": [],
                "DestinationConcepts": [
                    "Food Culture"
                ],
                "Travelers": {
                    "Adults": 0,
                    "Kids": 0,
                    "RoomCount": null
                },
                "TripDuration": {
                    "Days": 0
```

```
        },
        "HotelBrands": [],
        "HotelName": [],
        "Destinations": [],
        "POI": [],
        "_Summary": {
          "Duration": 0.0015990734100341797
        }
      },
      "apiAiResponseText": "Here are some of my recommendations",
      "overrideDestination": false,
      "intentName": "destination",
      "intentType": "destination",
      "frame": {
        "concepts": [
          "Food Culture"
        ]
      }
    },
    "content": [
      {
        "type": "text",
        "text": "Ok, I understood: Food Culture"
      },
      {
        "type": "text",
```

```
    "text": "Here are some of my recommendations"
  },
  {
    "type": "destination",
    "destination": [
      {
        "name": "Bangkok",
        "lat": 13.7510079327057,
        "long": 100.51235624379784,
        "wikiId": "Bangkok",
        "description": "Thailand's largest city by a large margin, a sprawling megapolis of wealth, squalor, culture, and sin.",
        "conceptScores": {
          "Food Culture": 0.3570120742
        },
        "images": {
          "primary": "/pic/Bangkok.jpg",
          "secondary": [
            "/pic/Bangkok__c2c38856fcf4.jpg",
            "/pic/Bangkok__6a79e826af6b.jpg",
            "/pic/Bangkok__2de525f1c5ac.jpg",
            "/pic/Bangkok__c827a16269a8.jpg",
            "/pic/Bangkok__580e6abd2c1c.jpg",
            "/pic/Bangkok__a6e32ed6732c.jpg",
            "/pic/Bangkok__7817adf5486e.jpg",
            "/pic/Bangkok__3dc57092bc19.jpg",
```

```
         "/pic/Bangkok__f92a9cc43ac4.jpg"
       ]
     },
     "links": {
       "availability":
"https://api.wayblazer.com/chat/availability/destinations/Bangkok?junkField=1492789084696"
     },
     "countryWikiId": "Thailand"
   },
   {
     "name": "Singapore",
     "lat": 1.294766026979946,
     "long": 103.84903853552281,
     "wikiId": "Singapore",
     "description": "Modern, wealthy city-state with a mixture of Chinese, Indian, Malay and British influences, among others.",
     "conceptScores": {
       "Food Culture": 0.3570120742
     },
     "images": {
       "primary": "/pic/Singapore.jpg",
       "secondary": [
         "/pic/Singapore__770d57f5b6df.jpg",
         "/pic/Singapore__36e15aa08ece.jpg",
         "/pic/Singapore__8ade7fabe0fc.jpg",
```

```
    "/pic/Singapore__105ee54845dd.jpg",

"/pic/Singapore__6ad7bba5ba41.jpg",

"/pic/Singapore__250e6a8a2174.jpg",

"/pic/Singapore__3193bacad5f6.jpg",

"/pic/Singapore__58107de9d52b.jpg",

"/pic/Singapore__d991f2e674fd.jpg"

]

},

"links": {

"availability":
"https://api.wayblazer.com/chat/availability/destinations/Singapore?junkField=1492789084696"

},

"countryWikiId": "Singapore"

},

{

"name": "Florence",

"lat": 43.7698729,

"long": 11.2556971,

"wikiId": "Florence",

"description": "The Renaissance city known for art and architecture that exerted influence throughout the world.", "conceptScores": {

"Food Culture": 0.1816517309

},

"images": {
```

```
      "primary": "/pic/Florence.jpg",
      "secondary": [
        "/pic/Florence__4f7dc71a10c9.jpg",
        "/pic/Florence__6aab14ce7f20.jpg",
        "/pic/Florence__4e60ff1d89e8.jpg",
        "/pic/Florence__494757df7a55.jpg",
        "/pic/Florence__c6fdf77e947c.jpg",
        "/pic/Florence__1c294b6510b7.jpg",
        "/pic/Florence__5e2fd415c00b.jpg",
        "/pic/Florence__b6b74d5b9db4.jpg",
        "/pic/Florence__19346c8e7fd9.jpg"
      ]
    },
    "links": {
      "availability": "https://api.wayblazer.com/chat/availability/destinations/Florence?junkField=1492789084696"
    }
  },
  {
    "name": "Franschhoek",
    "lat": -33.91047110092853,
    "long": 19.1201586,
    "wikiId": "Franschhoek",
    "description": "Franschhoek was founded by French Huguenots who fled the inquisition in Europe and were looking for refuge on the opposite side of the world.",
```

```
"conceptScores": {

"Food Culture": 0.1816517309

},

"images": {

"primary": "/pic/Franschhoek.jpg",

"secondary": [

"/pic/Franschhoek__869bdc828f6d.jpg",

"/pic/Franschhoek__f809facd4afc.jpg",

"/pic/Franschhoek__8dff0fbc2835.jpg",

"/pic/Franschhoek__c2c106e183a5.jpg",

"/pic/Franschhoek__c924cfe11cdd.jpg"

]

},

"links": {

"availability": "https://api.wayblazer.com/chat/availability/destinations/Franschhoek?junkField=1492789084696"

}

},

{

"name": "Mumbai",

"lat": 18.95659698554284,

"long": 72.8318738025196,

"wikiId": "Mumbai",

"description": "Diverse, busy and cosmopolitan city in India, known for its nightlife and home of the Indian entertainment industry.",
```

```
"conceptScores": {

"Food Culture": 0.1816517309

},

"images": {

"primary": "/pic/Mumbai.jpg",

"secondary": [

"/pic/Mumbai__8cf3c23e5566.jpg",

"/pic/Mumbai__784db6fe7b60.jpg",

"/pic/Mumbai__89500b3e6cde.jpg",

"/pic/Mumbai__a4a44980a28b.jpg",

"/pic/Mumbai__6737df6063d6.jpg",

"/pic/Mumbai__73b6fbbbc363.jpg",

"/pic/Mumbai__17aa092552b8.jpg",

"/pic/Mumbai__339aafc8ca20.jpg",

"/pic/Mumbai__2ab13131adc7.jpg"

]

},

"links": {

"availability": "https://api.wayblazer.com/chat/availability/destinations/Mumbai?junkField=1492789084696"

}

},

{

"name": "Naples",

"lat": 40.8454812,
```

```
"long": 14.2518173,

"wikiId": "Naples",

"description": "One of the oldest cities of the Western world, including a central district that is a UNESCO World Heritage Site.", "conceptScores": {

"Food Culture": 0.1816517309

},

"images": {

"primary": "/pic/Naples.jpg",

"secondary": [

"/pic/Naples__a570eeff6251.jpg",

"/pic/Naples__3224bd3b0d0d.jpg",

"/pic/Naples__d5e1d1c8c7df.jpg",

"/pic/Naples__92a6f389032e.jpg",

"/pic/Naples__d11465043266.jpg",

"/pic/Naples__45e6010f2dd9.jpg",

"/pic/Naples__15aee5703b72.jpg",

"/pic/Naples__f0ac25009e51.jpg",

"/pic/Naples__d97b10dacef3.jpg"

]

},

"links": {

"availability": "https://api.wayblazer.com/chat/availability/destinations/Naples?junkField=1492789084696"

},
```

```
"countryWikiId": "Italy"

},

{

"name": "Galle",

"lat": 6.026635549934522,

"long": 80.21921654340649,

"wikiId": "Galle",

"description": "Famous Dutch fort. Host of the Galle Literary Festival and a UNESCO World Heritage Site.", "conceptScores": {

"Food Culture": 0.1816517309

},

"images": {

"primary": "/pic/Galle.jpg",

"secondary": [

"/pic/Galle__845d417c54f9.jpg",

"/pic/Galle__9386174a1646.jpg",

"/pic/Galle__1fee0a785740.jpg",

"/pic/Galle__7252fbc8b61b.jpg",

"/pic/Galle__e0cd13a2cce1.jpg",

"/pic/Galle__183e8c78e1a1.jpg",

"/pic/Galle__fac9f634aab9.jpg",

"/pic/Galle__ef19796b6c0b.jpg",

"/pic/Galle__21cd3b72282c.jpg"

]

},
```

```
"links": {

"availability": "https://api.wayblazer.com/chat/availability/destinations/Galle?junkField=1492789084696"

}

},

{

"name": "Bologna",

"lat": 44.49407539999999,

"long": 11.344310877521124,

"wikiId": "Bologna",

"description": "One of the world's great university cities. History, culture, technology and food abound.", "conceptScores": {

"Food Culture": 0.1816517309

},

"images": {

"primary": "/pic/Bologna.jpg",

"secondary": [

"/pic/Bologna__4013c8e47c7e.jpg",

"/pic/Bologna__cd489ba5b76a.jpg",

"/pic/Bologna__a87c05615825.jpg",

"/pic/Bologna__774b2c353a44.jpg",

"/pic/Bologna__e7803928ce93.jpg",

"/pic/Bologna__fd46a764c153.jpg",

"/pic/Bologna__9dc3b73a0b46.jpg",
```

```
      "/pic/Bologna__6c22fb76f012.jpg",

"/pic/Bologna__6ac9be13811d.jpg"

]

},

"links": {

"availability":
"https://api.wayblazer.com/chat/availability/destinations/Bologna?junkField=1492789084696"

}

},

{

"name": "Wadi Musa",

"lat": 30.32324198046103,

"long": 35.47210156917572,

"wikiId": "Wadi_Musa",

"description": "It is the administrative center of the Petra Department. In close proximity to the archaeological site of Petra.", "conceptScores": {

"Food Culture": 0.1816517309

},

"images": {

"primary": "/pic/Wadi_Musa.jpg",

"secondary": [

"/pic/Wadi_Musa__7d1ae4290514.jpg",

"/pic/Wadi_Musa__2c585dd6883b.jpg",

"/pic/Wadi_Musa__7d1ae4290514.jpg",
```

```
      "/pic/Wadi_Musa__2c585dd6883b.jpg"
    ]
  },
  "links": {
    "availability": "https://api.wayblazer.com/chat/availability/destinations/Wadi_Musa?junkField=1492789084696"
  }
},
{
  "name": "Pisa",
  "lat": 43.717948630580985,
  "long": 10.400107702572392,
  "wikiId": "Pisa",
  "description": "One the medieval maritime republics.  Home to the unmistakable Leaning Tower of Pisa.",
  "conceptScores": {
    "Food Culture": 0.1816517309
  },
  "images": {
    "primary": "/pic/Pisa.jpg",
    "secondary": [
      "/pic/Pisa__3e06427a3577.jpg",
      "/pic/Pisa__8d5260b4de3e.jpg",
      "/pic/Pisa__7ee0721e3c3a.jpg",
      "/pic/Pisa__c0ed74758c25.jpg",
```

```
        "/pic/Pisa__dd41407730ca.jpg",
        "/pic/Pisa__1f4c6fdd373c.jpg",
        "/pic/Pisa__ca60049dc233.jpg",
        "/pic/Pisa__7e82926886f2.jpg",
        "/pic/Pisa__69a45c54e7b3.jpg"
      ]
    },
    "links": {
      "availability":
"https://api.wayblazer.com/chat/availability/destinations/Pisa?junkField=1492789084696"
    }
  },
  {
    "name": "Civitavecchia",
    "lat": 42.091494096303464,
    "long": 11.7939166,
    "wikiId": "Civitavecchia",
    "description": "Civitavecchia is a town and comune of the Metropolitan City of Rome in the central Italian region of Lazio. Close by attractions include La Cattedrale, Fort Michelangelo, Museo Archeologico Nazionale - Civitavecchia.",
    "conceptScores": {
      "Food Culture": 0.1816517309
    },
    "images": {
      "primary": "/pic/Civitavecchia.jpg",
      "secondary": [
```

```
      "/pic/Civitavecchia__46f0aa5e21ef.jpg",

"/pic/Civitavecchia__e4f1afbd0312.jpg",

"/pic/Civitavecchia__e0f5ec15ac66.jpg"

]

},

"links": {

"availability": "https://api.wayblazer.com/chat/availability/destinations/Civitavecchia?junkField=1492789084696"

}

},

{

"name": "Dubai",

"lat": 25.23545824008946,

"long": 55.29684320000001,

"wikiId": "Dubai",

"description": "A common entry point for travelers.  The largest city of the UAE, Dubai functions as a transport and commerce center.", "conceptScores": {

"Food Culture": 0.1816517309

},

"images": {

"primary": "/pic/Dubai.jpg",

"secondary": [

"/pic/Dubai__187268f8729c.jpg",

"/pic/Dubai__339308b13163.jpg",
```

```
      "/pic/Dubai__9725a80a3f3b.jpg",
      "/pic/Dubai__152e35bde4b7.jpg",
      "/pic/Dubai__5dd92935f229.jpg",
      "/pic/Dubai__66fc5874b6b2.jpg",
      "/pic/Dubai__f75252f64899.jpg",
      "/pic/Dubai__2454f562d7c2.jpg",
      "/pic/Dubai__e433d341122a.jpg"
    ]
  },
  "links": {
    "availability": "https://api.wayblazer.com/chat/availability/destinations/Dubai?junkField=1492789084696"
  }
},
{
  "name": "San Marino",
  "lat": 43.93617070000001,
  "long": 12.4484983,
  "wikiId": "San_Marino",
  "description": "San Marino is the world's oldest republic and Europe's third smallest state. Nearby attractions include De La Fratta, Palazzo Pubblico, Montale.",
  "conceptScores": {
    "Food Culture": 0.1816517309
  },
  "images": {
```

"primary": "/pic/San_Marino.jpg",

"secondary": [

"/pic/San_Marino__cb6e2bb369e9.jpg",

"/pic/San_Marino__f4e68ef65842.jpg",

"/pic/San_Marino__de33aaa22db4.jpg",

"/pic/San_Marino__681afb68f001.jpg",

"/pic/San_Marino__35fe5e147e12.jpg",

"/pic/San_Marino__21d7c9e13ca6.jpg",

"/pic/San_Marino__13568379d5d5.jpg",

"/pic/San_Marino__ffa6043d8626.jpg",

"/pic/San_Marino__94076b8e795a.jpg"

]

},

"links": {

"availability": "https://api.wayblazer.com/chat/availability/destinations/San_Marino?junkField=1492789084696"

}

},

{

"name": "Rome",

"lat": 41.8963869,

"long": 12.483867888930455,

"wikiId": "Rome",

"description": "The eternal city. Home to seven hills and over two thousand five hundred years of history.",

```
"conceptScores": {

"Food Culture": 0.1816517309

},

"images": {

"primary": "/pic/Rome.jpg",

"secondary": [

"/pic/Rome__4f99e06cb786.jpg",

"/pic/Rome__195d61fe4798.jpg",

"/pic/Rome__ce8f4cb1507a.jpg",

"/pic/Rome__5227b4d22a13.jpg",

"/pic/Rome__506d7fb8d299.jpg",

"/pic/Rome__1881858dbdd0.jpg",

"/pic/Rome__17d5afd06da6.jpg",

"/pic/Rome__4279517d39a8.jpg",

"/pic/Rome__b5991cff34c4.jpg"

]

},

"links": {

"availability": "https://api.wayblazer.com/chat/availability/destinations/Rome?junkField=1492789084696"

}

},

{

"name": "Padua",

"lat": 45.406736488775465,
```

```
"long": 11.8765237,

"wikiId": "Padua",

"description": "Home to the renowned University of Padua, which is almost 800 years old and famous for having had Galileo Galilei among its lecturers.", "conceptScores":

"Food Culture": 0.1816517309

},

"images": {

"primary": "/pic/Padua.jpg",

"secondary": [

"/pic/Padua__4c0bb38f7a24.jpg",

"/pic/Padua__186ceb5ed1b9.jpg",

"/pic/Padua__4ff044b9bc81.jpg",

"/pic/Padua__ee2d2779454c.jpg",

"/pic/Padua__a2f6b3946cc7.jpg",

"/pic/Padua__e99b5cbaf6c1.jpg",

"/pic/Padua__c8e7fa55ae57.jpg",

"/pic/Padua__a6c89d9d4e8d.jpg",

"/pic/Padua__69aa424bfab3.jpg"

]

},

"links": {

"availability": "https://api.wayblazer.com/chat/availability/destinations/Padua?junkField=1492789084696"

}
```

```
    },
    {
      "name": "Krabi Province",
      "lat": 8.0316839,
      "long": 98.925308,
      "wikiId": "Krabi_Province",
      "description": "Scattered islands with white sandy beaches and crystal clear water harbouring coral reefs, caves and waterfalls.",
      "conceptScores": {
        "Food Culture": 0.1816517309
      },
      "images": {
        "primary": "/pic/wv__Krabi_Province.jpg",
        "secondary": []
      },
      "links": {
        "availability": "https://api.wayblazer.com/chat/availability/destinations/Krabi_Province?junkField=1492789084696"
      }
    },
    {
      "name": "Alappuzha",
      "lat": 9.498975748396546,
      "long": 76.3421225,
      "wikiId": "Alappuzha",
```

```
"description": "Alappuzha has a rich history and owes its modern existence to the efforts of Diwan Raja Kesavadas in the second half of the 18th century.", "conceptScores": {

"Food Culture": 0.1816517309

},

"images": {

"primary": "/pic/Alappuzha.jpg",

"secondary": [

"/pic/Alappuzha__81148680502d.jpg",

"/pic/Alappuzha__2c6378818405.jpg",

"/pic/Alappuzha__f27d7e5f1e4f.jpg",

"/pic/Alappuzha__9c6cc9969bce.jpg",

"/pic/Alappuzha__d3462decb739.jpg",

"/pic/Alappuzha__c4830797a108.jpg",

"/pic/Alappuzha__6a244d6af882.jpg",

"/pic/Alappuzha__f601aca2b65d.jpg",

"/pic/Alappuzha__54ad1a23c61b.jpg"

]

},

"links": {

"availability": "https://api.wayblazer.com/chat/availability/destinations/Alappuzha?junkField=1492789084696"

}

},

{
```

"name": "Nafplio",

"lat": 37.56607495168636,

"long": 22.7987979,

"wikiId": "Nafplio",

"description": "An historical city due to its Byzantine, Venetian and Ottoman heritage. Nearby attractions include Tiryns, Palamidi and the Archaeological Museum of Nafplion.", "conceptScores": {

"Food Culture": 0.1816517309

},

"images": {

"primary": "/pic/Nafplio.jpg",

"secondary": [

"/pic/Nafplio__5be1e2132eb2.jpg",

"/pic/Nafplio__a011b98f6606.jpg",

"/pic/Nafplio__8523bb143e46.jpg",

"/pic/Nafplio__f055fc3a9d60.jpg",

"/pic/Nafplio__7afd63367ece.jpg",

"/pic/Nafplio__300f79f1e79c.jpg",

"/pic/Nafplio__cb197f043713.jpg",

"/pic/Nafplio__467f5a7b7a84.jpg",

"/pic/Nafplio__1a159bffadff.jpg"

]

},

"links": {

```
    "availability":
"https://api.wayblazer.com/chat/availability/destinations/Nafplio?junkField=1492789084696"
   }
  },
  {
   "name": "Castelfranco Emilia",
   "lat": 44.595011970479895,
   "long": 11.057118501155374,
   "wikiId": "Castelfranco_Emilia",
   "description": "In 1861 it was joined with the former comune of Piumazzo. Famous for inventing tortellini. Close by attractions include Chiesa di Santa Maria Assunta, Chiesa di Recovato, Parco Ca' Ranuzza.",
   "conceptScores": {
     "Food Culture": 0.1816517309
   },
   "images": {
     "primary": "/pic/Castelfranco_Emilia.jpg",
     "secondary": []
   },
   "links": {
     "availability":
"https://api.wayblazer.com/chat/availability/destinations/Castelfranco_Emilia?junkField=1492789084696"
   }
  }
 ]
```

```
    },
    {
      "type": "text",
      "text": "Who will you be traveling with?"
    }
  ]
}
```

[0226] ENTITY EXAMPLES

Destination Entity Examples

-------------

Europe

Africa

Asia

Southeast Asia

East Asia

...

Far East

Middle East

Tropics

Austria

Faeroe Islands

Finland

France

Georgia

...

Virgin Islands

Virginia

Washington

West Virginia

Wisconsin

Wyoming

[0227] INITIALIZATION TEMPLATE EXAMPLES

```
{
    "chat": {
        "botName": "Emma",
        "phone": "1-855-789-9070"
    },
    "conversion": {
        "name": "Vacation Holidays",
        "domain": "client-A.wayblazer.systems",
        "archive": false,
        "graph": "client-A",
        "hotelProvider": "client-A",
        "imageProvider": "client-A"
    }
}

{
 "chat" : {
  "botName" : "Ruby",
  "phone": "888.843.9999",
  "budgetMin": 25,
  "budgetMax": 500,
  "rateType" : "roomRate",
  "followUpQuestions": ["WHO_DETAIL", "WHO", "WHEN", "FOLLOW_UP"],
  "followUpFinishedText": "If you'd like assistance planning your trip, call 555.555.5555.",
```

```
      "referenceCodeUI": false,

"forceHotelSearchWithDestination": true,

"faqLink": "https://www.client-A.com/guest-faq",

"termsLink": "https://www.client-A.com/term-of-use",

"durationDays": 1,

"adults": 1,

"includeEvidence": false,

"destAiThreshold": 0.001

},

"conversion" : {

"hotelProvider" : "client-A",

"imageProvider" : "client-A",

"graph" : "client-A",

"name" : "client-A",

"domain" : "client-A.wayblazer.systems",

"archive" : false

}

}
```

[0228] AD REQUEST:

Default search params: {

"destination": "Miami",

"type": "hotel",

"action": "list",

"adults": 1,

"children": 0,

"concepts": [

"beach"

]

}

Default text:

[{

"type": "text",

"text": "These are some of my favorite beach hotels in Miami."

}]

[0229] EXAMPLE OF REQUEST FROM FACEBOOK

{

"object": "page",

"entry": [

{

"id": "178764829449348",

"time": 1526320281101,

"messaging": [

{

```
      "sender": {

"id": "1991454167592369"

},

"recipient": {

"id": "178764829449348"

},

"timestamp": 1526320280997,

"message": {

"mid": "mid.$cAACile7WjvRpkQx9pVjX8c1ck5pj",

"seq": 4866,

"text": "hotel in Austin"

}

}

]

}

]

}
```

[0230] EXAMPLE OF RESPONSE TO FACEBOOK

```
{
  "messaging_type": "RESPONSE",
  "recipient": {
   "id": "1991454167592369"
  },
  "message": {
   "attachment": {
    "type": "template",
    "payload": {
     "template_type": "generic",
     "elements": [
      {
       "title": "Austin Sw - Sunset Valley",
       "image_url": "https://client-B.com/imageRepo/2/0/72/116/602/AUSSV_4109524890_P.jpg",
       "subtitle": "Sunset Valley,TX\n\n1 night from $120",
       "default_action": {
        "type": "web_url",
        "url": "https://www.client-B.com/redirect?path=hd&hotelCode=AUSSV&regionCode=1&localeCode=en&checkInMonthYear=042018&checkInDate=29&checkOutDate=30&checkOutMonthYear=042018&numberOfAdults=1&numberOfRooms=1&numberOfChildren=0&cm_mmc=mdpr-fbwayblazer_-ex_ausmr&_PMID=99634625&glat=MEDI&brandCode=HI",
        "messenger_extensions": false,
        "webview_height_ratio": "tall"
       },
```

```
"buttons": [
  {
    "type": "web_url",
    "url": "https://www.client-B.com/redirect?path=hd&hotelCode=AUSSV&regionCode=1&localeCode=en&checkInMonthYear=042018&checkInDate=29&checkOutDate=30&checkOutMonthYear=042018&numberOfAdults=1&numberOfRooms=1&numberOfChildren=0&cm_mmc=mdpr-fbwayblazer_-ex_ausmr&_PMID=99634625&glat=MEDI&brandCode=HI",
    "title": "See Booking Details"
  }
]
},
{
  "title": "Austin Nw - Four Points",
  "image_url": "https://client-B.com/imageRepo/3/0/79/42/165/AUSWS_4786433448_P.jpg",
  "subtitle": "Austin,TX\n\n1 night from $109",
  "default_action": {
    "type": "web_url",
    "url": "https://www.client-B.com/redirect?path=hd&hotelCode=AUSWS&regionCode=1&localeCode=en&checkInMonthYear=042018&checkInDate=29&checkOutDate=30&checkOutMonthYear=042018&numberOfAdults=1&numberOfRooms=1&numberOfChildren=0&cm_mmc=mdpr-fbwayblazer_-ex_ausmr&_PMID=99634625&glat=MEDI&brandCode=HI",
    "messenger_extensions": false,
    "webview_height_ratio": "tall"
  },
  "buttons": [
```

```
{
  "type": "web_url",
  "url": "https://www.client-B.com/redirect?path=hd&hotelCode=AUSWS&regionCode=1&localeCode=en&checkInMonthYear=042018&checkInDate=29&checkOutDate=30&checkOutMonthYear=042018&numberOfAdults=1&numberOfRooms=1&numberOfChildren=0&cm_mmc=mdpr-fbwayblazer_-ex_ausmr&_PMID=99634625&glat=MEDI&brandCode=HI",
  "title": "See Booking Details"
}
      ]
    },
    {
      "title": "Austin Downtown - University",
      "image_url": "https://client-B.com/imageRepo/3/0/73/910/192/AUSNS_4435764102_P.jpg",
      "subtitle": "Austin,TX\n\n1 night from $101",
      "default_action": {
        "type": "web_url",
        "url": "https://www.client-B.com/redirect?path=hd&hotelCode=AUSNS&regionCode=1&localeCode=en&checkInMonthYear=042018&checkInDate=29&checkOutDate=30&checkOutMonthYear=042018&numberOfAdults=1&numberOfRooms=1&numberOfChildren=0&cm_mmc=mdpr-fbwayblazer_-ex_ausmr&_PMID=99634625&glat=MEDI&brandCode=HI",
        "messenger_extensions": false,
        "webview_height_ratio": "tall"
      },
      "buttons": [
        {
```

```
            "type": "web_url",

"url": "https://www.client-
B.com/redirect?path=hd&hotelCode=AUSNS&regionCode=1&localeCode=en&checkInM
onthYear=042018&checkInDate=29&checkOutDate=30&checkOutMonthYear=042018&
numberOfAdults=1&numberOfRooms=1&numberOfChildren=0&cm_mmc=mdpr-
fbwayblazer_-ex_ausmr&_PMID=99634625&glat=MEDI&brandCode=HI", "title": "See Booking Details"

}
        ]
      },
      {

"title": "Austin Downtown - University ",

"image_url": "https://client-
B.com/imageRepo/3/0/75/465/471/AUSIT_4527192044_P.jpg", "subtitle": "Austin,TX\n\n1 night from $139", "default_action": {

"type": "web_url",

"url": "https://www.client-
B.com/redirect?path=hd&hotelCode=AUSIT&regionCode=1&localeCode=en&checkInMo
nthYear=042018&checkInDate=29&checkOutDate=30&checkOutMonthYear=042018&n
umberOfAdults=1&numberOfRooms=1&numberOfChildren=0&cm_mmc=mdpr-
fbwayblazer_-ex_ausmr&_PMID=99634625&glat=MEDI&brandCode=IN", "messenger_extensions": false, "webview_height_ratio": "tall"

},

"buttons": [

{

"type": "web_url",
```

```
"url": "https://www.client-
B.com/redirect?path=hd&hotelCode=AUSIT&regionCode=1&localeCode=en&checkInMo
nthYear=042018&checkInDate=29&checkOutDate=30&checkOutMonthYear=042018&n
umberOfAdults=1&numberOfRooms=1&numberOfChildren=0&cm_mmc=mdpr-
fbwayblazer_-ex_ausmr&_PMID=99634625&glat=MEDI&brandCode=IN", "title": "See Booking Details"

}
 ]
},
{
  "title": "Austin South Interstate Hwy 35",

"image_url": "https://client-
B.com/imageRepo/4/0/82/398/680/AUSYH_5027834612_P.jpg", "subtitle": "Austin,TX\n\n1 night from $120", "default_action": {

"type": "web_url",

"url": "https://www.client-
B.com/redirect?path=hd&hotelCode=AUSYH&regionCode=1&localeCode=en&checkInM
onthYear=042018&checkInDate=29&checkOutDate=30&checkOutMonthYear=042018&
numberOfAdults=1&numberOfRooms=1&numberOfChildren=0&cm_mmc=mdpr-
fbwayblazer_-ex_ausmr&_PMID=99634625&glat=MEDI&brandCode=SB", "messenger_extensions": false, "webview_height_ratio": "tall"

},

"buttons": [

{

"type": "web_url",
```

```
        "url": "https://www.client-
B.com/redirect?path=hd&hotelCode=AUSYH&regionCode=1&localeCode=en&checkInM
onthYear=042018&checkInDate=29&checkOutDate=30&checkOutMonthYear=042018&
numberOfAdults=1&numberOfRooms=1&numberOfChildren=0&cm_mmc=mdpr-
fbwayblazer_-ex_ausmr&_PMID=99634625&glat=MEDI&brandCode=SB", "title": "See Booking Details"

}

]

},

{

"title": "Stephen F. Austin",

"image_url": "https://client-
B.com/imageRepo/2/0/71/967/267/AUSHA_4090971646_P.jpg", "subtitle": "Austin,TX\n\n1 night from $169", "default_action": {

"type": "web_url",

"url": "https://www.client-
B.com/redirect?path=hd&hotelCode=AUSHA&regionCode=1&localeCode=en&checkInM
onthYear=042018&checkInDate=29&checkOutDate=30&checkOutMonthYear=042018&
numberOfAdults=1&numberOfRooms=1&numberOfChildren=0&cm_mmc=mdpr-
fbwayblazer_-ex_ausmr&_PMID=99634625&glat=MEDI&brandCode=IC", "messenger_extensions": false, "webview_height_ratio": "tall"

},

"buttons": [

{

"type": "web_url",
```

```
              "url": "https://www.client-
B.com/redirect?path=hd&hotelCode=AUSHA&regionCode=1&localeCode=en&checkInM
onthYear=042018&checkInDate=29&checkOutDate=30&checkOutMonthYear=042018&
numberOfAdults=1&numberOfRooms=1&numberOfChildren=0&cm_mmc=mdpr-
fbwayblazer_-ex_ausmr&_PMID=99634625&glat=MEDI&brandCode=IC", "title": "See Booking Details"

}

]

},

{

"title": "Austin",

"image_url": "https://client-
B.com/imageRepo/4/0/80/140/690/AUSGZ_966808014_P.jpg", "subtitle": "Austin,TX\n", "default_action": {

"type": "web_url",

"url": "https://www.client-
B.com/redirect?path=hd&hotelCode=AUSGZ&regionCode=1&localeCode=en&checkInM
onthYear=042018&checkInDate=29&checkOutDate=30&checkOutMonthYear=042018&
numberOfAdults=1&numberOfRooms=1&numberOfChildren=0&cm_mmc=mdpr-
fbwayblazer_-ex_ausmr&_PMID=99634625&glat=MEDI&brandCode=CP", "messenger_extensions": false, "webview_height_ratio": "tall"

},

"buttons": [

{

"type": "web_url",
```

"url": "https://www.client-B.com/redirect?path=hd&hotelCode=AUSGZ&regionCode=1&localeCode=en&checkInMonthYear=042018&checkInDate=29&checkOutDate=30&checkOutMonthYear=042018&numberOfAdults=1&numberOfRooms=1&numberOfChildren=0&cm_mmc=mdpr-fbwayblazer_-ex_ausmr&_PMID=99634625&glat=MEDI&brandCode=CP", "title": "See Booking Details"

}

]

},

{

"title": "Austin-South",

"image_url": "https://client-B.com/imageRepo/2/0/72/862/553/AUSAT_3469973300_P.jpg", "subtitle": "Austin,TX\n1 night from $80", "default_action": {

"type": "web_url",

"url": "https://www.client-B.com/redirect?path=hd&hotelCode=AUSAT&regionCode=1&localeCode=en&checkInMonthYear=042018&checkInDate=29&checkOutDate=30&checkOutMonthYear=042018&numberOfAdults=1&numberOfRooms=1&numberOfChildren=0&cm_mmc=mdpr-fbwayblazer_-ex_ausmr&_PMID=99634625&glat=MEDI&brandCode=CW", "messenger_extensions": false, "webview_height_ratio": "tall"

},

"buttons": [

{

"type": "web_url",

```
    "url": "https://www.client-
B.com/redirect?path=hd&hotelCode=AUSAT&regionCode=1&localeCode=en&checkInM
onthYear=042018&checkInDate=29&checkOutDate=30&checkOutMonthYear=042018&
numberOfAdults=1&numberOfRooms=1&numberOfChildren=0&cm_mmc=mdpr-
fbwayblazer_-ex_ausmr&_PMID=99634625&glat=MEDI&brandCode=CW", "title": "See Booking Details"

}

]

},

{

"title": "Austin Airport",

"image_url": "https://client-
B.com/imageRepo/2/0/71/527/88/AUSBW_4277431632_P.jpg", "subtitle": "Austin,TX\n\n1 night from $98", "default_action": {

"type": "web_url",

"url": "https://www.client-
B.com/redirect?path=hd&hotelCode=AUSBW&regionCode=1&localeCode=en&checkIn
MonthYear=042018&checkInDate=29&checkOutDate=30&checkOutMonthYear=042018
&numberOfAdults=1&numberOfRooms=1&numberOfChildren=0&cm_mmc=mdpr-
fbwayblazer_-ex_ausmr&_PMID=99634625&glat=MEDI&brandCode=HI", "messenger_extensions": false, "webview_height_ratio": "tall"

},

"buttons": [

{

"type": "web_url",
```

```
      "url": "https://www.client-
B.com/redirect?path=hd&hotelCode=AUSBW&regionCode=1&localeCode=en&checkIn
MonthYear=042018&checkInDate=29&checkOutDate=30&checkOutMonthYear=042018
&numberOfAdults=1&numberOfRooms=1&numberOfChildren=0&cm_mmc=mdpr-
fbwayblazer_-ex_ausmr&_PMID=99634625&glat=MEDI&brandCode=HI",
      "title": "See Booking Details"
      }
     ]
    }
   ]
  }
 }
}
}
```

[0231] EXAMPLE 1 REQUEST TO EXTRACTION SERVICE

```
{
  "mode": "text",
  "recipient": [
    "client:steve"
  ],
  "body": "I need a 2 bd/2bath. I have a cat.",
  "dateSent": "2017-03-15T16:13:15.124Z",
  "conversationId": "abc",
  "property": {
    "name": "Alamos Garden Apartments",
    "propertyId": "401",
    "accountId": "1"
```

}

}

[0232] EXAMPLE RESPONSE TO REQUEST 1 TO EXTRACTION SERVICE

```
{
    "FloorPlan": {
        "Bathrooms": 2,
        "BedroomsMax": 2,
        "BedroomsMin": 2
    },
    "Pets": {
        "Amount": 1,
        "Type": "Cat"
    }
}
```

[0233] EXAMPLE REQUEST TO NLP EXTRACTION SERVICE

GET www.nlpextracthost.com/extract?query?=Hotel in New York near Times Square Sept 1-5 for under $300

[0234] EXAMPLE RESPONSE FROM NLP EXTRACTION SERVICE

```
{
    "PricePreference": {
        "TripBudgetMax": {
            "Amount": 300,
            "Currency": "USD"
        },
        "TripBudgetMin": null,
        "TripBudgetMed": null,
```

```
        "PerPerson": null,

"PerDay": null,

"CostRelative": [],

"HotelStarRatingMin": null,

"HotelStarRatingAbs": null,

"HotelStarRatingMax": null,

"FlightClassType": []

},

"Travelers": {

"Kids": null,

"Adults": null,

"Triptype": "Other",

"RoomCount": null

},

"AccommodationType": [

"Hotel"

],

"AccommodationConcepts": [],

"DestinationConcepts": [],

"WeatherConcepts": [],

"TripTime": {

"EndDate": "2018-09-05",

"MaxDuration": 0,

"MinDuration": 0,

"StartDate": "2018-09-01",

"AbsDuration": 0
```

```
},
"HotelBrands": [],
"HotelName": [],
"Destinations": {
    "AirportName": [],
    "RegionWikiId": [
        {
            "Id": "New_York_City",
            "Positive": true
        }
    ]
},
"POI": [
    {
        "wiki_id": "Times_Square",
        "long": -73.9856,
        "popularity": 8.04477038997786,
        "lat": 40.758,
        "ent_type": [],
        "city": [
            "New_York_City"
        ],
        "name": "Times Square"
    }
],
"Origins": {
```

```
        "AirportName": [],
        "RegionWikiId": []
    },
    "intent_context": "hotel_search",
    "intent": "Find A Hotel",
    "_Summary": {
        "Duration": 0.27611231803894043
    }
}
```

Example Brat Training Data for Real Estate

Hello Brittney! Thanks for chatting with us! How may I help you today?

Hello, I am looking for a townhouse style unit to move in during March.

Let me see what we have for you. What home size do you need?

2 bedroom

Thank you. Do you have any pets coming with you?

a small dog

Great! What's the breed?

he is a pug mix

Thank you! Have you already seen a floor plan you are interested in?

I saw the trivoli i think it was called

Tivoli sorry

Okay, gotcha, thank you!

This unit is going to be available by January 17th, and there's no availability yet by March 1st. the good news is that the availability can change anytime. I can set up a visit for you so that the onsite team can discuss with you your options, and at the same time, you can tour the community as well. Are you available tomorrow at 9 AM?

Are you still there?

Yes

The messages went away.

Oh okay. I was saying, This unit is going to be available by January 17th, and there's no availability yet by March 1st. the good news is that the availability can change anytime. I can set up a visit for you so that the onsite team can discuss with you your options, and at the same time, you can tour the community as well. Are you available tomorrow at 9 AM?

My first day available would be Wednesday

Great! What time works best for you?

How about 1 pm

That's perfect! Let me save this timeslot for you, what's your best callback number?

3214824555

I have your visit set for Jan. 10, 2018 at 1:00 PM. We have a wonderful staff onsite that will assist you further. When you come out for your visit please bring a photo ID. Do you need directions to our property?

Yes please that would be helpful.

Thank you so much!

Directions: via I-4 E: Take I-4 E to FL-436 E/E Altamonte Dr. Take exit 92 from I-4 E. Head north on I-4 E. Use the right lane to take exit 92 for FL-436 toward Altamonte Springs/Apopka. Continue on FL-436 E/E Altamonte Dr. Take Haines St to Altamonte Bay Club Cir. Turn right onto FL-436 E/E Altamonte Dr (signs for Casselberry). Turn right onto Hattaway Dr. Turn left onto Haines St. Turn right onto Essex Ave. Turn left onto Orange Dr. Turn right onto Altamonte Bay Club Cir. Turn right toward Altamonte Bay Club Cir. Continue onto Altamonte Bay Club Cir. Destination will be on the left.

Address: 270 ALTAMONTE BAY CLUB CIRAltamonte Springs Fla., 32701 thank you!

I will let the onsite team know about your interest in leasing in our community and we are definitely looking forward to having you as one of our valued residents! Is there anything else I can assist you with?

That will be all for now and I look forward to the visit!

It has been a pleasure talking to you today! Thank you so much for your interest in our community, and for chatting with me today. At the end of this chat you will have the opportunity to participate in a brief survey by clicking on the CLOSE button on your chat window. We appreciate your feedback. Have a wonderful day!

Example Associated Labels for Real Estate Brat Example

| T1 | Desired_HomeSize 204 213 | 2 bedroom |
| T2 | Pets 263 274 | a small dog |
| T3 | Pets 306 315 | a pug mix |
| T4 | Primary_Phone 1391 1401 | 3214824555 |
| T5 | MoveIn_Date 129 141 | during March |

Example Labels for Travel

| | | |
| --- | --- | --- |
| sys_date-period | trip.date-period | trip.period |
| Abs_TripDuration | abs.duration | abs.dur |
| Max_TripDuration | max.duration | max.dur |
| Min_TripDuration | min.duration | min.dur |
| TripBudgetMax_AmountOfMoney | rate.trip_budget_max | rt.trip_max |
| TripBudgetMin_AmountOfMoney | rate.trip_budget_min | rt.trip_min |
| TripBudgetMed_AmountOfMoney | rate.trip_budget_median | rt.trip_med |
| CostRelative | rate.cost_relative | rt.cst_rel |
| DailyMax_AmountOfMoney | rate.daily_max | rt.day_max |
| DailyMin_AmountOfMoney | rate.daily_min | rt.day_min |
| DailyMed_AmountOfMoney | rate.daily_med | rt.day_med |
| Min_HotelStarRating | star.min | star.min |
| Max_HotelStarRating | star.max | star.max |
| Abs_HotelStarRating | star.abs | star.abs |
| HotelBrands | hotel.brand | htl.brand |
| HotelName | hotel.name | htl_name |
| To_Destinations | to_destination.region | to_ds.reg |
| From_Destinations | from_destination.region | from_ds.reg |
| FlightConcept | flight_concept | fl.cnpt |
| From_ClassType | from.class_type | fr.cls_tp |
| To_ClassType | to.class_type | to.cls_tp |
| AirlineBrand | airline_brand | fl.airline |
| From_AirportName | from.airport_name | fr.air |
| To_AirportName | to.airport_name | to.air |
| AccommodationType | accommodation.type | acc.tp |
| AccommodationConcept | accommodation.concept | acc.cnpt |
| HotelRoomType | hotel_room_type | htl_tp |
| DestinationConcept | destination.concept | ds.cnpt |
| DestinationModifier | destination.modifier | ds.mod |
| POI | destination.POI | ds.poi |
| Abs_RoomCount | room.count | rm.cnt |
| Add_RoomCount | add.room.count | add.rm.cnt |
| Minus_RoomCount | minus.room.count | minus.rm.cnt |
| Abs_Traveler | traveler | traveler |
| Add_Traveler | add.traveler | add.traveler |
| Minus_Traveler | minus.traveler | minus.traveler |
| Negator | Negator | neg |
| DestinationZipcode | destination.zipcode | ds.zip |
| WeatherConcepts | weather.concepts | wea.cnpt |
| PerPerson | per.person | per.pers |
| PerDay | per.day | per.day |
| Total | total | total |
| Comparisons | comparisons | cmpr |

Example Brat Training Data for Real Estate

We want a luxury vacation rental in Cancun with golf, spa and surfing this fall

Need an affordable place in SF tonight

Looking for hotel near convention center Mon-Thu i want a hotel in paris near the eiffel tower with an infinity, views of the city, a balcony and 24 hour room service Where are the best hotel under 50 Euro per night in Barcelona for my honeymoon in September?

find me hotels with more than 4 stars for the trip to NYC with easy access to penn station I'm looking for a hotel which has a swimming pool in Jeju island for my family trip show me a luxury hotel in sydney with a view of the opera house and an indoor pool best hotels in italy lucca first week in july?
Best hotels with pools on the Amalfi Coast for a stay at the end of August
I'm looking for a hotel which has a swimming pool in Okinawa for my family trip
The Beach Club at Charleston Harbor Resort and Marina, Mt. Pleasant, S.C., USA
Where are the best budget hotel in Barcelona for my honeymoon in September?
Best hotels with pools on the Amalfi Coast Calif. for a stay at the end of August?
I'm looking for a hotel which has a swimming pool in Cheju for my family trip
I'm looking for a hotel which has a swimming pool in Je ju for my family trip
I'm looking for a hotel which has a swimming pool in seoul for my family trip
Best hotels with pools on the Amalfi Coast for a stay in the middle of june?
i want to stay at a hotel in the business district in buenos aires argentina
I'm looking for a hotel which has a swimming pool in Jeju for my family trip
I'm looking for a hotel which has a swimming pool in seoul for my family trip
Best hotels with pools on the Amalfi Coast for a stay at the end of August?
Best hotels with pools on the Amalfi Coast for a stay at the end of August
I want a romantic beach vacation with a non-stop flight from san francisco
i want to stay at a great hotel in venice but away from the hustle & bustle
want to spend weekend in sea side within 5 hours drive from kolkata, India
Are there dog friendly hotels with great night clubs in Zurich and Basel?
i want to book an hotel near Bordeaux in France near a golf and mountain
Romantic and quiet hotel with spa in a beautiful location outside london
where are the best hotels for a weekend stay in chicago, it this weekend
Where are the best hotels in Barcelona for my honeymoon in September?
i am looking for a boutique design, stylish and gourmet hotel in lisbon
i want to book a nice hotel near Bordeaux in France with a swimming pool
We want to have an quiet and beautiful stay in the area of Washington DC
i want to stay hotels between Arc de Triomphe and Palais des Tuileries
I'd like to stay at a hotel between Louvre museum and Arc de Triomphe
Romantic and quiet hotel with spa in a beautiful location near london
Romantic and quiet hotel with spa in a beautiful location Oxfordshire
where should i stay to celebrate my girlfriend's birthday in Shanghai
I am looking for a waterfront, design and gourmet hotel in Barcelona
what is the best small hotel near the old city in Dubrovnik Croatia?
Where are the best hotel in Prague for my honeymoon in September?
where are the best hotels for a weekend stay in chicago this weekend
i want to book an hotel near Bordeaux in France with a swimming pool
want to spend weekend in sea side within 5 hours drive from kolkata
I want a hotel in Barcelona that is waterfront, gourmet and design
I want to stay in the hotel is located near by the Arc de Triomphe
I want a cheap hotel in midtown Manhattan that doesn't allow pets
I want a hotel in London, less than 200 GBP for 23 June to 28 June
I want a hotel in London, less than 300 GBP for 23 June to 28 June
i want to stay hotels between Arc de Triomphe and Parc de Monceau
I want a hotel in Barcelona for a long stay weekend in September
Family friendly hotel with great pool in port Douglas Australia
which hotels located at the central of LA and suit for student?
I want a hotel near the email innovations conference las vegas
where is the best hotel to stay in Tuscany with my girlfriend?
I want a hotel with swimming pools inside a city in Barcelona
I want to visit to one of the most famous monuments in Paris.
show me hotels with wedding hall and close to Arc de Triomphe
Where are the best hotels in Mecklenburg Vorpommern to relax?
I want to stay in the closest hotel to the Arc de Triomphe.
Where should I stay that one of the famous monument of paris.
where the best hotel to have a bachelorette party in chicago
best hotel in the french riviera on a hilltop with sea views
i want to book an hotel near Bordeaux in France near a golf
My wife and I are looking for a romantic hotel in Cleveland
pet-friendly vacation within driving distance of Austin, Tex.
Barcelona hotel in the city trendy area 2 adults low price
best hotel on isle of capri private and quiet for 2 adults
best hotels with amazing views in the amalfi coast for july
I want a hotel in London, best rate for 23 June to 28 June
i want stay hotels near by Arc de Triomphe and have a pool
I want a hotel in London, cheapest for 23 June to 28 June
show me hotels near by the most famous monuments in Paris
Where should I stay that has a tennis court in Lanzarote?
Barcelona room in the city trendy area 2 adults low cost
I am looking for a hotel in Paris with a pool for August
I want a hotel in Manhattan near activities for children
what are the best hotels in Mexico City during Late May?
Canyon Ranch Wellness Resort Kaplankaya—Mugla, Turkey
I am looking for a hotel in Paris with a pool this July
show me hotels with the spa near by the Arc de Triomphe
Weekend beach & Spa hotel with 2 hrs flight from london where are the best hotels for a weekend stay in chicago
Best hotels to stay in St. Peter Ording end of August?
Praha family small hotel in summer, historical center
show me all hotels in Prague with good recommendations
show me hotels near by the most famous museum in Paris
tuscany villa in a country side at the heart of region
where to stay on a 4 day trip from Barcelona to monaco
best place to stay in dallas for bbq and cowboys game
chicago summer vacation with two daughters and cheaper
Family friendly hotel with great pool in port Douglas
i want to stay at a 5 star hotel on sunny isles beach
i want to try a kid friendly hotel in jacksonhole, Wyo.
show me hotels near by Palais des Tuileries in france
show me hotels near by the most famous tower in Paris
show me hotels near by the most famous tower in tokyo
Show me hotels with 24 hour room service in barcelona
Tell me a hotel within walking distance of the Louvre
Example Associated Labels for Travel Brat Example

| Tag | Label | Value |
|---|---|---|
| T252 | Abs_Traveler 0 2 | We |
| T5 | CostRelative 10 16 | luxury |
| T4 | AccommodationType 17 32 | vacation rental |
| T2 | To_Destinations 36 42 | Cancun |
| T6 | DestinationConcept 48 52 | golf |
| T7 | DestinationConcept 54 57 | spa |
| T8 | DestinationConcept 62 69 | surfing |
| T12 | sys_date-period 70 79 | this fall |
| T10 | CostRelative 88 98 | affordable |
| T11 | To_Destinations 108 110 | SF |
| T9 | sys_date-period 111 118 | tonight |
| T15 | AccommodationType 131 136 | hotel |
| T16 | DestinationConcept 142 159 | convention center |
| T14 | sys_date-period 160 169 | Mon-Thu |
| T26 | Abs_Traveler 170 171 | i |
| T20 | AccommodationType 179 184 | hotel |
| T18 | To_Destinations 188 193 | paris |
| T27 | POI 203 215 | eiffel tower |
| T21 | AccommodationConcept 224 232 | infinity |
| T25 | AccommodationConcept 234 239 | views |
| T23 | AccommodationConcept 255 262 | balcony |
| T24 | AccommodationConcept 267 287 | 24 hour room service |
| T33 | AccommodationType 307 312 | hotel |
| T30 | DailyMax_AmountOfMoney 319 326 | 50 Euro |
| T31 | To_Destinations 340 349 | Barcelona |
| T35 | Abs_Traveler 357 366 | honeymoon |
| T28 | sys_date-period 370 379 | September |
| T3 | Abs_Traveler 386 388 | me |
| T37 | AccommodationType 389 395 | hotels |
| T1 | Min_HotelStarRating 411 418 | 4 stars |
| T36 | To_Destinations 435 438 | NYC |
| T39 | POI 459 471 | penn station |
| T17 | Abs_Traveler 472 473 | I |
| T42 | AccommodationType 490 495 | hotel |
| T43 | AccommodationConcept 508 521 | swimming pool |
| T41 | To_Destinations 525 537 | Je ju island |
| T74 | Abs_Traveler 545 556 | family trip |
| T34 | Abs_Traveler 562 564 | me |
| T48 | CostRelative 567 573 | luxury |
| T47 | AccommodationType 574 579 | hotel |
| T45 | To_Destinations 583 589 | sydney |
| T51 | AccommodationConcept 597 601 | view |
| T49 | DestinationConcept 609 620 | opera house |
| T50 | AccommodationConcept 628 639 | indoor pool |
| T57 | AccommodationType 645 651 | hotels |
| T55 | To_Destinations 655 666 | italy lucca |
| T53 | sys_date-period 667 685 | first week in july |
| T62 | AccommodationType 692 698 | hotels |
| T64 | AccommodationConcept 704 709 | pools |
| T61 | To_Destinations 717 729 | Amalfi Coast |
| T59 | sys_date-period 748 761 | end of August |
| T13 | Abs_Traveler 762 763 | I |
| T66 | AccommodationType 780 785 | hotel |
| T67 | AccommodationConcept 798 811 | swimming pool |
| T65 | To_Destinations 815 822 | Okinawa |
| T68 | Abs_Traveler 830 841 | family trip |
| T69 | HotelName 842 895 | The Beach Club at Charleston Harbor Resort and Marina |
| T70 | To_Destinations 899 920 | Mt. Pleasant, SC, USA |
| T75 | CostRelative 940 946 | budget |
| T78 | AccommodationType 947 952 | hotel |
| T76 | To_Destinations 956 965 | Barcelona |
| T80 | Abs_Traveler 973 982 | honeymoon |
| T73 | sys_date-period 986 995 | September |
| T84 | AccommodationType 1002 1008 | hotels |
| T79 | AccommodationConcept 1014 1019 | pools |
| T253 | To_Destinations 1027 1042 | Amalfi Coast CA |
| T99 | sys_date-period 1061 1074 | end of August |
| T38 | Abs_Traveler 1076 1077 | I |
| T87 | AccommodationType 1094 1099 | hotel |
| T88 | AccommodationConcept 1112 1125 | swimming pool |
| T86 | To_Destinations 1129 1134 | Cheju |
| T89 | Abs_Traveler 1142 1153 | family trip |
| T56 | Abs_Traveler 1154 1155 | I |
| T91 | AccommodationType 1172 1177 | hotel |
| T92 | AccommodationConcept 1190 1203 | swimming pool |
| T90 | To_Destinations 1207 1212 | Je ju |
| T93 | Abs_Traveler 1220 1231 | family trip |
| T58 | Abs_Traveler 1232 1233 | I |
| T96 | AccommodationType 1250 1255 | hotel |
| T97 | AccommodationConcept 1268 1281 | swimming pool |
| T94 | To_Destinations 1285 1290 | seoul |
| T98 | Abs_Traveler 1298 1309 | family trip |
| T102 | AccommodationType 1315 1321 | hotels |
| T104 | AccommodationConcept 1327 1332 | pools |
| T101 | To_Destinations 1340 1352 | Amalfi Coast |
| T81 | sys_date-period 1371 1385 | middle of june |
| T71 | Abs_Traveler 1387 1388 | i |
| T108 | AccommodationType 1407 1412 | hotel |
| T109 | DestinationConcept 1420 1437 | business district |
| T63 | To_Destinations 1441 1463 | buenos aires argentina |
| T72 | Abs_Traveler 1464 1465 | I |
| T113 | AccommodationType 1482 1487 | hotel |
| T114 | AccommodationConcept 1500 1513 | swimming pool |
| T112 | To_Destinations 1517 1521 | Jeju |
| T115 | Abs_Traveler 1529 1540 | family trip |
| T85 | Abs_Traveler 1541 1542 | I |
| T118 | AccommodationType 1559 1564 | hotel |
| T119 | AccommodationConcept 1577 1590 | swimming pool |
| T116 | To_Destinations 1594 1599 | seoul |
| T120 | Abs_Traveler 1607 1618 | family trip |
| T124 | AccommodationType 1624 1630 | hotels |
| T126 | AccommodationConcept 1636 1641 | pools |
| T123 | To_Destinations 1649 1661 | Amalfi Coast |
| T121 | sys_date-period 1680 1693 | end of August |
| T130 | AccommodationType 1700 1706 | hotels |
| T132 | AccommodationConcept 1712 1717 | pools |
| T129 | To_Destinations 1725 1737 | Amalfi Coast |
| T127 | sys_date-period 1756 1769 | end of August |
| T32 | Abs_Traveler 1770 1771 | I |
| T135 | Abs_Traveler 1779 1787 | romantic |
| T136 | DestinationConcept 1788 1793 | beach |
| T134 | FlightConcept 1810 1825 | non-stop flight |
| T133 | From_Destinations 1831 1844 | san francisco |
| T77 | Abs_Traveler 1845 1846 | i |
| T139 | AccommodationType 1871 1876 | hotel |
| T137 | To_Destinations 1880 1886 | venice |
| T141 | DestinationConcept 1905 1920 | hustle & bustle |
| T144 | Abs_TripDuration 1935 1942 | weekend |
| T145 | DestinationConcept 1946 1954 | sea side |
| T83 | DestinationModifier 1955 1980 | within 5 hours drive from |
| T44 | From_Destinations 1981 1995 | kolkata, India |
| T150 | AccommodationConcept 2006 2018 | dog friendly |
| T149 | AccommodationType 2019 2025 | hotels |
| T151 | AccommodationConcept 2037 2048 | night clubs |
| T146 | To_Destinations 2052 2058 | Zurich |
| T147 | To_Destinations 2063 2068 | Basel |
| T103 | Abs_Traveler 2070 2071 | i |
| T156 | AccommodationType 2088 2093 | hotel |
| T155 | To_Destinations 2099 2117 | Bordeaux in France |
| T157 | DestinationConcept 2125 2129 | golf |
| T158 | DestinationConcept 2134 2142 | mountain |
| T162 | Abs_Traveler 2143 2151 | Romantic |

-continued

| | | |
|---|---|---|
| T163 | AccommodationConcept 2156 2161 | quiet |
| T161 | AccommodationType 2162 2167 | hotel |
| T164 | AccommodationConcept 2173 2176 | spa |
| T140 | DestinationModifier 2201 2208 | outside |
| T160 | To_Destinations 2209 2215 | london |
| T173 | AccommodationType 2235 2241 | hotels |
| T170 | Abs_TripDuration 2248 2255 | weekend |
| T82 | To_Destinations 2264 2275 | chicago, il |
| T131 | sys_date-period 2276 2288 | this weekend |
| T179 | AccommodationType 2308 2314 | hotels |
| T177 | To_Destinations 2318 2327 | Barcelona |
| T181 | Abs_Traveler 2335 2344 | honeymoon |
| T175 | sys_date-period 2348 2357 | September |
| T105 | Abs_Traveler 2359 2360 | i |
| T185 | AccommodationConcept 2378 2386 | boutique |
| T122 | AccommodationConcept 2387 2393 | design |
| T186 | AccommodationConcept 2395 2402 | stylish |
| T187 | AccommodationConcept 2407 2414 | gourmet |
| T184 | AccommodationType 2415 2420 | hotel |
| T182 | To_Destinations 2424 2430 | lisbon |
| T106 | Abs_Traveler 2431 2432 | i |
| T191 | AccommodationType 2453 2458 | hotel |
| T188 | To_Destinations 2464 2482 | Bordeaux in France |
| T193 | AccommodationConcept 2490 2503 | swimming pool |
| T117 | Abs_Traveler 2504 2506 | We |
| T197 | AccommodationConcept 2523 2528 | quiet |
| T194 | To_Destinations 2563 2576 | Washington DC |
| T125 | Abs_Traveler 2577 2578 | i |
| T199 | AccommodationType 2592 2598 | hotels |
| T200 | POI 2607 2622 | Arc de Triomphe |
| T201 | POI 2627 2647 | Palais des Tuileries |
| T128 | Abs_Traveler 2648 2649 | I |
| T202 | AccommodationType 2670 2675 | hotel |
| T203 | POI 2684 2697 | Louvre museum |
| T204 | POI 2702 2717 | Arc de Triomphe |
| T208 | Abs_Traveler 2718 2726 | Romantic |
| T209 | AccommodationConcept 2731 2736 | quiet |
| T207 | AccommodationType 2737 2742 | hotel |
| T210 | AccommodationConcept 2748 2751 | spa |
| T205 | To_Destinations 2781 2787 | london |
| T216 | Abs_Traveler 2788 2796 | Romantic |
| T217 | AccommodationConcept 2801 2806 | quiet |
| T215 | AccommodationType 2807 2812 | hotel |
| T218 | AccommodationConcept 2818 2821 | spa |
| T213 | To_Destinations 2846 2857 | Oxfordshire |
| T22 | Abs_Traveler 2871 2872 | i |
| T19 | Abs_Traveler 2891 2905 | my girlfriend' |
| T221 | To_Destinations 2919 2927 | Shanghai |
| T152 | Abs_Traveler 2928 2929 | I |
| T226 | AccommodationConcept 2947 2957 | waterfront |
| T227 | AccommodationConcept 2959 2965 | design |
| T228 | AccommodationConcept 2970 2977 | gourmet |
| T225 | AccommodationType 2978 2983 | hotel |
| T223 | To_Destinations 2987 2996 | Barcelona |
| T234 | AccommodationConcept 3014 3019 | small |
| T232 | AccommodationType 3020 3025 | hotel |
| T235 | DestinationConcept 3035 3043 | old city |
| T229 | To_Destinations 3047 3064 | Dubrovnik Croatia |
| T240 | AccommodationType 3085 3090 | hotel |
| T238 | To_Destinations 3094 3100 | Prague |
| T242 | Abs_Traveler 3108 3117 | honeymoon |
| T29 | sys_date-period 3121 3130 | September |
| T247 | AccommodationType 3151 3157 | hotels |
| T244 | Abs_TripDuration 3162 3171 | a weekend |
| T245 | To_Destinations 3180 3187 | chicago |
| T243 | sys_date-period 3188 3200 | this weekend |
| T138 | Abs_Traveler 3201 3202 | i |
| T254 | AccommodationType 3219 3224 | hotel |
| T251 | To_Destinations 3230 3248 | Bordeaux in France |
| T255 | AccommodationConcept 3256 3269 | swimming pool |
| T257 | Abs_TripDuration 3284 3291 | weekend |
| T259 | DestinationConcept 3295 3303 | sea side |
| T256 | DestinationModifier 3304 3329 | within 5 hours drive from |
| T258 | From_Destinations 3330 3337 | kolkata |
| T110 | Abs_Traveler 3338 3339 | I |
| T263 | AccommodationType 3347 3352 | hotel |
| T261 | To_Destinations 3356 3365 | Barcelona |
| T264 | AccommodationConcept 3374 3384 | waterfront |
| T266 | AccommodationConcept 3386 3393 | gourmet |
| T265 | AccommodationConcept 3398 3404 | design |
| T107 | Abs_Traveler 3405 3406 | I |
| T267 | AccommodationType 3427 3432 | hotel |
| T268 | POI 3456 3471 | Arc de Triomphe |
| T196 | Abs_Traveler 3472 3473 | I |
| T269 | CostRelative 3481 3486 | cheap |
| T271 | AccommodationType 3487 3492 | hotel |
| T46 | DestinationModifier 3496 3503 | midtown |
| T270 | To_Destinations 3504 3513 | Manhattan |
| T272 | AccommodationConcept 3519 3537 | doesn't allow pets |
| T148 | Abs_Traveler 3538 3539 | I |
| T281 | AccommodationType 3547 3552 | hotel |
| T279 | To_Destinations 3556 3562 | London |
| T278 | DailyMax_AmountOfMoney 3574 3580 | 200GBP |
| T52 | sys_date-period 3585 3603 | 23 June to 28 June |
| T111 | Abs_Traveler 3604 3605 | I |
| T289 | AccommodationType 3613 3618 | hotel |
| T287 | To_Destinations 3622 3628 | London |
| T286 | DailyMax_AmountOfMoney 3640 3646 | 300GBP |
| T54 | sys_date-period 3651 3669 | 23 June to 28 June |
| T153 | Abs_Traveler 3670 3671 | i |
| T290 | AccommodationType 3685 3691 | hotels |
| T291 | POI 3700 3715 | Arc de Triomphe |
| T292 | POI 3720 3735 | Parc de Monceau |
| T159 | Abs_Traveler 3736 3737 | I |
| T299 | AccommodationType 3745 3750 | hotel |
| T297 | To_Destinations 3754 3763 | Barcelona |
| T143 | Abs_TripDuration 3780 3787 | weekend |
| T60 | sys_date-period 3791 3800 | September |
| T304 | Abs_Traveler 3801 3816 | Family friendly |
| T303 | AccommodationType 3817 3822 | hotel |
| T305 | AccommodationConcept 3834 3838 | pool |
| T302 | To_Destinations 3842 3864 | port Douglas Australia |
| T308 | AccommodationType 3871 3877 | hotels |
| T142 | DestinationModifier 3893 3903 | central of |
| T307 | To_Destinations 3904 3906 | LA |
| T311 | Abs_Traveler 3920 3927 | student |
| T165 | Abs_Traveler 3929 3930 | I |
| T313 | AccommodationType 3938 3943 | hotel |
| T314 | POI 3953 3981 | email innovations conference |
| T312 | To_Destinations 3982 3991 | las vegas |
| T316 | AccommodationType 4010 4015 | hotel |
| T315 | To_Destinations 4027 4034 | Tuscany |
| T318 | Abs_Traveler 4035 4053 | with my girlfriend |
| T166 | Abs_Traveler 4055 4056 | I |
| T321 | AccommodationType 4064 4069 | hotel |
| T322 | AccommodationConcept 4075 4089 | swimming pools |
| T260 | DestinationModifier 4090 4106 | inside a city in |
| T319 | To_Destinations 4107 4116 | Barcelona |
| T168 | Abs_Traveler 4117 4118 | I |
| T95 | DestinationConcept 4152 4168 | famous monuments |
| T323 | To_Destinations 4172 4177 | Paris |
| T169 | Abs_Traveler 4184 4186 | me |
| T325 | AccommodationType 4187 4193 | hotels |
| T326 | AccommodationConcept 4199 4211 | wedding hall |
| T327 | POI 4225 4240 | Arc de Triomphe |
| T330 | AccommodationType 4260 4266 | hotels |
| T329 | To_Destinations 4270 4292 | Mecklenburg Vorpommern |
| T332 | AccommodationConcept 4296 4301 | relax |
| T176 | Abs_Traveler 4303 4304 | I |
| T333 | AccommodationType 4333 4338 | hotel |
| T334 | POI 4346 4361 | Arc de Triomphe |
| T171 | Abs_Traveler 4377 4378 | I |
| T336 | DestinationConcept 4407 4415 | monument |
| T335 | To_Destinations 4419 4424 | paris |
| T340 | AccommodationType 4441 4446 | hotel |
| T342 | Abs_Traveler 4457 4475 | bachelorette party |
| T338 | To_Destinations 4479 4486 | chicago |
| T346 | AccommodationType 4492 4497 | hotel |
| T345 | To_Destinations 4505 4519 | french riviera |
| T348 | DestinationConcept 4525 4532 | hilltop |
| T274 | AccommodationConcept 4538 4547 | sea views |
| T174 | Abs_Traveler 4548 4549 | i |
| T354 | AccommodationType 4566 4571 | hotel |
| T351 | To_Destinations 4577 4585 | Bordeaux |
| T353 | To_Destinations 4589 4595 | France |
| T100 | DestinationConcept 4603 4607 | golf |
| T359 | Abs_Traveler 4608 4621 | My wife and I |

-continued

| | | | |
|---|---|---|---|
| T358 | Abs_Traveler 4640 4648 | romantic | |
| T357 | AccommodationType 4649 4654 | hotel | |
| T355 | To_Destinations 4658 4667 | Cleveland | |
| T362 | AccommodationConcept 4668 4680 | pet-friendly | |
| T262 | DestinationModifier 4690 4716 | within driving distance of | |
| T360 | To_Destinations 4717 4727 | Austin, TX | |
| T365 | To_Destinations 4728 4737 | Barcelona | |
| T367 | AccommodationType 4738 4743 | hotel | |
| T273 | DestinationModifier 4744 4755 | in the city | |
| T368 | DestinationConcept 4756 4767 | trendy area | |
| T249 | Abs_Traveler 4768 4776 | 2 adults | |
| T364 | CostRelative 4777 4786 | low price | |
| T372 | AccommodationType 4792 4797 | hotel | |
| T371 | POI 4801 4814 | isle of capri | |
| T374 | AccommodationConcept 4815 4822 | private | |
| T375 | AccommodationConcept 4827 4832 | quiet | |
| T250 | Abs_Traveler 4837 4845 | 2 adults | |
| T380 | AccommodationType 4851 4857 | hotels | |
| T382 | AccommodationConcept 4871 4876 | views | |
| T379 | To_Destinations 4884 4896 | amalfi coast | |
| T377 | sys_date-period 4901 4905 | july | |
| T192 | Abs_Traveler 4906 4907 | I | |
| T391 | AccommodationType 4915 4920 | hotel | |
| T389 | To_Destinations 4924 4930 | London | |
| T388 | CostRelative 4932 4941 | best rate | |
| T178 | sys_date-period 4946 4964 | 23 June to 28 June | |
| T198 | Abs_Traveler 4965 4966 | i | |
| T392 | AccommodationType 4977 4983 | hotels | |
| T394 | POI 4992 5007 | Arc de Triomphe | |
| T172 | AccommodationConcept 5019 5023 | pool | |
| T211 | Abs_Traveler 5024 5025 | I | |
| T402 | AccommodationType 5033 5038 | hotel | |
| T400 | To_Destinations 5042 5048 | London | |
| T399 | CostRelative 5050 5058 | cheapest | |
| T154 | sys_date-period 5063 5081 | 23 June to 28 June | |
| T189 | Abs_Traveler 5087 5089 | me | |
| T405 | AccommodationType 5090 5096 | hotels | |
| T406 | DestinationConcept 5121 5130 | monuments | |
| T403 | To_Destinations 5134 5139 | Paris | |
| T190 | Abs_Traveler 5153 5154 | I | |
| T410 | AccommodationConcept 5171 5183 | tennis court | |
| T408 | To_Destinations 5187 5196 | Lanzarote | |
| T413 | To_Destinations 5198 5207 | Barcelona | |
| T483 | DestinationModifier 5213 5224 | in the city | |
| T415 | DestinationConcept 5225 5236 | trendy area | |
| T167 | Abs_Traveler 5237 5245 | 2 adults | |
| T412 | CostRelative 5246 5254 | low cost | |
| T212 | Abs_Traveler 5255 5256 | I | |
| T423 | AccommodationType 5274 5279 | hotel | |
| T421 | To_Destinations 5283 5288 | Paris | |
| T424 | AccommodationConcept 5296 5300 | pool | |
| T214 | sys_date-period 5305 5311 | August | |
| T219 | Abs_Traveler 5312 5313 | I | |
| T427 | AccommodationType 5321 5326 | hotel | |
| T425 | To_Destinations 5330 5339 | Manhattan | |
| T428 | DestinationConcept 5345 5355 | activities | |
| T429 | Abs_Traveler 5360 5368 | children | |
| T434 | AccommodationType 5387 5393 | hotels | |
| T432 | To_Destinations 5397 5408 | Mexico City | |
| T206 | sys_date-period 5416 5424 | Late May | |
| T436 | HotelName 5426 5465 | Canyon Ranch Wellness Resort Kaplankaya | |
| T437 | To_Destinations 5468 5481 | Mugla, Turkey | |
| T220 | Abs_Traveler 5482 5483 | I | |
| T443 | AccommodationType 5501 5506 | hotel | |
| T441 | To_Destinations 5510 5515 | Paris | |
| T444 | AccommodationConcept 5523 5527 | pool | |
| T195 | sys_date-period 5528 5537 | this July | |
| T224 | Abs_Traveler 5543 5545 | me | |
| T445 | AccommodationType 5546 5552 | hotels | |
| T446 | AccommodationConcept 5562 5565 | spa | |
| T447 | POI 5578 5593 | Arc de Triomphe | |
| T183 | Abs_TripDuration 5594 5601 | Weekend | |
| T450 | DestinationConcept 5602 5607 | beach | |
| T451 | AccommodationConcept 5610 5613 | Spa | |
| T449 | AccommodationType 5614 5619 | hotel | |
| T180 | DestinationModifier 5620 5642 | with 2 hrs flight from london | |
| T448 | From_Destinations 5643 5649 | london | |
| T456 | AccommodationType 5669 5675 | hotels | |
| T453 | Abs_TripDuration 5682 5689 | weekend | |
| T454 | To_Destinations 5698 5705 | chicago | |
| T462 | AccommodationType 5711 5717 | hotels | |
| T461 | To_Destinations 5729 5745 | St. Peter Ording | |
| T222 | sys_date-period 5746 5759 | end of August | |
| T465 | To_Destinations 5761 5766 | Praha | |
| T275 | Abs_Traveler 5767 5773 | family | |
| T276 | AccommodationConcept 5774 5779 | small | |
| T466 | AccommodationType 5780 5785 | hotel | |
| T230 | sys_date-period 5789 5795 | summer | |
| T469 | DestinationConcept 5798 5815 | historical center | |
| T473 | AccommodationType 5828 5834 | hotels | |
| T471 | To_Destinations 5838 5844 | Prague | |
| T476 | AccommodationType 5879 5885 | hotels | |
| T477 | DestinationConcept 5910 5916 | museum | |
| T474 | To_Destinations 5920 5925 | Paris | |
| T479 | To_Destinations 5926 5933 | tuscany | |
| T480 | AccommodationType 5934 5939 | villa | |
| T481 | DestinationConcept 5945 5957 | country side | |
| T277 | DestinationModifier 5965 5980 | heart of region | |
| T485 | Abs_TripDuration 6000 6005 | 4 day | |
| T246 | From_Destinations 6016 6025 | Barcelona | |
| T486 | To_Destinations 6029 6035 | monaco | |
| T488 | To_Destinations 6058 6064 | dallas | |
| T490 | DestinationConcept 6069 6072 | bbq | |
| T491 | DestinationConcept 6077 6089 | cowboys game | |
| T494 | To_Destinations 6090 6097 | chicago | |
| T496 | sys_date-period 6098 6104 | summer | |
| T487 | Abs_Traveler 6119 6132 | two daughters | |
| T493 | CostRelative 6137 6144 | cheaper | |
| T500 | Abs_Traveler 6145 6160 | Family friendly | |
| T499 | AccommodationType 6161 6166 | hotel | |
| T501 | AccommodationConcept 6178 6182 | pool | |
| T498 | To_Destinations 6186 6198 | port Douglas | |
| T248 | Abs_Traveler 6199 6200 | i | |
| T506 | Abs_HotelStarRating 6219 6225 | 5 star | |
| T505 | AccommodationType 6226 6231 | hotel | |
| T503 | To_Destinations 6235 6252 | sunny isles beach | |
| T241 | Abs_Traveler 6253 6254 | i | |
| T511 | Abs_Traveler 6269 6281 | kid friendly | |
| T510 | AccommodationType 6282 6287 | hotel | |
| T509 | To_Destinations 6291 6306 | jacksonhole, wy | |
| T233 | Abs_Traveler 6312 6314 | me | |
| T514 | AccommodationType 6315 6321 | hotels | |
| T280 | POI 6330 6350 | Palais des Tuileries | |
| T282 | To_Destinations 6354 6360 | france | |
| T231 | Abs_Traveler 6366 6368 | me | |
| T518 | AccommodationType 6369 6375 | hotels | |
| T519 | DestinationConcept 6400 6405 | tower | |
| T516 | To_Destinations 6409 6414 | Paris | |
| T236 | Abs_Traveler 6420 6422 | me | |
| T523 | AccommodationType 6423 6429 | hotels | |
| T524 | DestinationConcept 6454 6459 | tower | |
| T521 | To_Destinations 6463 6468 | tokyo | |
| T237 | Abs_Traveler 6474 6476 | me | |
| T528 | AccommodationType 6477 6483 | hotels | |
| T529 | AccommodationConcept 6489 6509 | 24 hour room service | |
| T526 | To_Destinations 6513 6522 | barcelona | |
| T239 | Abs_Traveler 6528 6530 | me | |
| T531 | AccommodationType 6533 6538 | hotel | |
| T532 | POI 6566 6576 | the Louvre | |
| T40 | Abs_Traveler 5821 5823 | me | |
| T283 | Abs_Traveler 5876 5878 | me | |
| T284 | PerDay 327 336 | per night | |
| T285 | Comparisons 401 410 | more than | |
| T288 | Comparisons 3564 3573 | less than | |
| T293 | Comparisons 3630 3639 | less than | |
| T294 | Negator 1891 1900 | away from | |
| R1 | Negation Arg1:T294 Arg2:T141 | | |

Example Travel Related Intents

```
const normalizedIntentHash = {
  'Find A Hotel': 'hotel',
  'Modify (Add) Hotel Search': 'modifyAddHotelSearch',
  'Modify (Replace) Hotel Search': 'modifyReplaceHotelSearch',
  'Hotel Amenity Checker': 'hotelAmenityChecker',
```

-continued

```
    'Find A Destination': 'destination',
    'Modify (Add) Destination Search': 'modifyAddDestination-
Search',
    'Modify (Replace) Destination Search':
'modifyReplaceDestinationSearch',
    'Find A Flight': 'flight',
    'destination_details': 'destination_details',
    'hotel_details': 'hotel_details',
    'smalltalk': 'smalltalk',
    'Greetings': 'greetings',
    'GreetingsWelcome': 'greetings',
    'GreetingsHowAreYou': 'GreetingsHowAreYou',
    'AnsweringFollowUpQuestion': 'AnsweringFollowUpQuestion',
    'ContactCallCenter': 'contactCallCenter',
    'Instructions': 'instructions',
    'Book Hotel': 'bookHotel',
    'TermsAndConditions': 'TermsAndConditions',
    'FrequentlyAskedQuestions': 'FrequentlyAskedQuestions',
    'Get Bots Name': 'GetBotsName',
    'Default Fallback Intent': 'DefaultFallbackIntent',
    'Out of Scope': 'OutOfScope',
    'DepartureAirportsServed': 'DepartureAirportsServed',
};
```

Example Real Estate Related Intents

```
const normalizedIntentHash = {
    'Book a Tour': 'bookaTour',
};
```

Example Response Interaction Rules

Ok, I understood:

If concepts Comma separated concepts with trailing "and" ex "pool, spa, and golf"

If adults/kids mention, "with X adults and X children" ex "with 2 adults and 2 children"

If rooms, "in X rooms" ex "in 2 rooms"

If airline cabin type "X class flight" ex "business class flight"

If stars, "X[-X] star hotel" ex "3 star hotel", "3-5 star hotel"

If destination, "a trip to X" ex "a trip to Dubai"

If dates, "from X to X" ex "from May 1, 2018 to May 4, 2018"

If budget max, no min "under X", ex "under $1000"

If budget min, no max, "budget of X", ex budget of "$1000"

If budget min and max, "budget X-X", ex bud $1000-$2000"

If origin airport "departing from X", ex "departing from JFK"

If point of interest selected, "Here are the closest hotels to X." ex "Here are the closest hotels to Eiffel Tower".

What is claimed is:

1. A chat driven artificial intelligence system, comprising:
a processor; and
a non-transitory computer-readable medium comprising instructions for:
initializing a chat system widget executing on a user device in a display container on a third party web page, wherein initializing the chat system widget executing on the user device, comprises:
receiving a first request from the chat system widget at the user device including an identifier associated with the chat system widget;
determining a first concept associated with the third party web page;
based on the identifier associated with the chat system widget, determining a data service to call;
sending a request to the determined data service, the request including the first concept associated with the third party web page;
receiving first content related to the first concept from the data service;
determining an initial interaction based on the identifier for the chat system widget;
forming a response to the chat system widget including the first content related to the concept and the initial interaction; and
returning the response to the chat system widget at the user device to be rendered at the user device in a chat driven interface displayed in the display container in the third party web page at the user device by presenting the initial interaction in a chat portion of the chat driven interface and the first content in a display portion of the chat driven interface such that the first content is presented in the display portion of the chat interface.

2. The system of claim 1, the non-transitory computer-readable medium further comprising instructions for:
receiving a second request from the chat system widget at the user device, the second request including a current interaction entered by a user in the chat portion of the chat driven interface displayed in the display container of the third party web page at the user device;
retrieving a session associated with the user, wherein the session includes one or more previous frames associated with previous user interactions with the chat portion of the chat driven interface in a current session;
creating a working frame including one or more intents and one or more concepts expressed in the previous user interactions and included in the one or more previous frames associated with previous user interactions;
sending a request to a natural language processing extraction service, wherein the request includes the current interaction;
receiving a response from the natural language processing extraction service including a determined intent and a determined concept;
evaluating the determined intent and the one or more intents included in the previous frames to determine a canonical intent for the working frame;
evaluating the determined concept and the one or more concepts included in the previous frames to determine a canonical concept for the working frame;
based on the canonical intent determined for the working frame, determining the data service to call;
sending a request to the determined data service, the request including the canonical concept determined for the working frame;
receiving second content related to the canonical concept from the data service;
applying a set of follow-up rules to the current interaction and the previous interaction to determine a follow-up interaction;
forming a second response to the chat system widget including the second content related to the canonical concept and the follow-up interaction; and
returning the response to the chat system widget at the user device to be rendered at the user device in the chat driven interface displayed in the display container on the third party web page at the user device by presenting the follow-up interaction in the chat portion of the chat driven interface and the second content in the display portion of the chat driven interface such that the second content presented in the display portion of the chat driven interface is synchronized with an intent or concept expressed in the chat portion of the chat driven interface.

3. The system of claim 1, wherein the chat system widget was provided to the user device in response to a request to a distribution network from the user device, the distribution network distinct from the chat driven artificial intelligence system.

4. The system of claim 1, wherein the concept associated with the third party web page was included in the request and was determined at the user device by the chat system widget from one or more tags included in association with the third party web page or the display container on the third party web page.

5. The system of claim 1, wherein the concept was determined from a site index at the chat driven artificial intelligence system by:
   determining a Universal Resource Locator (URL) associated with the third party web page from the received request; and
   accessing the site index at the chat driven artificial intelligence system with the URL to determine the concept associated with the third party web page.

6. The system of claim 2, wherein the first content or second content is associated with a publisher of the third-party web page.

7. A non-transitory computer readable medium, comprising instructions for implementing a chat driven artificial intelligence system, the instructions executable for:
   initializing a chat system widget executing on a user device in a display container on a third party web page, wherein initializing the chat system widget executing on the user device, comprises:
   receiving a first request from the chat system widget at the user device including an identifier associated with the chat system widget;
   determining a first concept associated with the third party web page;
   based on the identifier associated with the chat system widget, determining a data service to call;
   sending a request to the determined data service, the request including the first concept associated with the third party web page;
   receiving first content related to the first concept from the data service;
   determining an initial interaction based on the identifier for the chat system widget;
   forming a response to the chat system widget including the first content related to the concept and the initial interaction; and
   returning the response to the chat system widget at the user device to be rendered at the user device in a chat driven interface displayed in the display container in the third party web page at the user device by presenting the initial interaction in a chat portion of the chat driven interface and the first content in a display portion of the chat driven interface such that the first content is presented in the display portion of the chat interface.

8. The non-transitory computer readable medium of claim 7, further comprising instructions for:
   receiving a second request from the chat system widget at the user device, the second request including a current interaction entered by a user in the chat portion of the chat driven interface displayed in the display container of the third party web page at the user device;
   retrieving a session associated with the user, wherein the session includes one or more previous frames associated with previous user interactions with the chat portion of the chat driven interface in a current session;
   creating a working frame including one or more intents and one or more concepts expressed in the previous user interactions and included in the one or more previous frames associated with previous user interactions;
   sending a request to a natural language processing extraction service, wherein the request includes the current interaction;
   receiving a response from the natural language processing extraction service including a determined intent and a determined concept;
   evaluating the determined intent and the one or more intents included in the previous frames to determine a canonical intent for the working frame;
   evaluating the determined concept and the one or more concepts included in the previous frames to determine a canonical concept for the working frame;
   based on the canonical intent determined for the working frame, determining the data service to call;
   sending a request to the determined data service, the request including the canonical concept determined for the working frame;
   receiving second content related to the canonical concept from the data service;
   applying a set of follow-up rules to the current interaction and the previous interaction to determine a follow-up interaction;
   forming a second response to the chat system widget including the second content related to the canonical concept and the follow-up interaction; and
   returning the response to the chat system widget at the user device to be rendered at the user device in the chat driven interface displayed in the display container on the third party web page at the user device by presenting the follow-up interaction in the chat portion of the chat driven interface and the second content in the display portion of the chat driven interface such that the second content presented in the display portion of the chat driven interface is synchronized with an intent or concept expressed in the chat portion of the chat driven interface.

9. The non-transitory computer readable medium of claim 7, wherein the chat system widget was provided to the user device in response to a request to a distribution network from the user device, the distribution network distinct from the chat driven artificial intelligence system.

10. The non-transitory computer readable medium of claim 7, wherein the concept associated with the third party web page was included in the request and was determined at the user device by the chat system widget from one or more tags included in association with the third party web page or the display container on the third party web page.

11. The non-transitory computer readable medium of claim 7, wherein the concept was determined from a site index at the chat driven artificial intelligence system by:
   determining a Universal Resource Locator (URL) associated with the third party web page from the received request; and
   accessing the site index at the chat driven artificial intelligence system with the URL to determine the concept associated with the third party web page.

12. The non-transitory computer readable medium of claim 8, wherein the first content or second content is associated with a publisher of the third-party web page.

13. A method for a chat driven artificial intelligence system, comprising:
  initializing a chat system widget executing on a user device in a display container on a third party web page, wherein initializing the chat system widget executing on the user device, comprises:
  receiving a first request from the chat system widget at the user device including an identifier associated with the chat system widget;
  determining a first concept associated with the third party web page;
  based on the identifier associated with the chat system widget, determining a data service to call;
  sending a request to the determined data service, the request including the first concept associated with the third party web page;
  receiving first content related to the first concept from the data service;
  determining an initial interaction based on the identifier for the chat system widget;
  forming a response to the chat system widget including the first content related to the concept and the initial interaction; and
  returning the response to the chat system widget at the user device to be rendered at the user device in a chat driven interface displayed in the display container in the third party web page at the user device by presenting the initial interaction in a chat portion of the chat driven interface and the first content in a display portion of the chat driven interface such that the first content is presented in the display portion of the chat interface.

14. The method of claim 13, further comprising:
  receiving a second request from the chat system widget at the user device, the second request including a current interaction entered by a user in the chat portion of the chat driven interface displayed in the display container of the third party web page at the user device;
  retrieving a session associated with the user, wherein the session includes one or more previous frames associated with previous user interactions with the chat portion of the chat driven interface in a current session;
  creating a working frame including one or more intents and one or more concepts expressed in the previous user interactions and included in the one or more previous frames associated with previous user interactions;
  sending a request to a natural language processing extraction service, wherein the request includes the current interaction;
  receiving a response from the natural language processing extraction service including a determined intent and a determined concept;
  evaluating the determined intent and the one or more intents included in the previous frames to determine a canonical intent for the working frame;
  evaluating the determined concept and the one or more concepts included in the previous frames to determine a canonical concept for the working frame;
  based on the canonical intent determined for the working frame, determining the data service to call;
  sending a request to the determined data service, the request including the canonical concept determined for the working frame;
  receiving second content related to the canonical concept from the data service;
  applying a set of follow-up rules to the current interaction and the previous interaction to determine a follow-up interaction;
  forming a second response to the chat system widget including the second content related to the canonical concept and the follow-up interaction; and
  returning the response to the chat system widget at the user device to be rendered at the user device in the chat driven interface displayed in the display container on the third party web page at the user device by presenting the follow-up interaction in the chat portion of the chat driven interface and the second content in the display portion of the chat driven interface such that the second content presented in the display portion of the chat driven interface is synchronized with an intent or concept expressed in the chat portion of the chat driven interface.

15. The method of claim 13, wherein the chat system widget was provided to the user device in response to a request to a distribution network from the user device, the distribution network distinct from the chat driven artificial intelligence system.

16. The method of claim 13, wherein the concept associated with the third party web page was included in the request and was determined at the user device by the chat system widget from one or more tags included in association with the third party web page or the display container on the third party web page.

17. The method of claim 13, wherein the concept was determined from a site index at the chat driven artificial intelligence system by:
  determining a Universal Resource Locator (URL) associated with the third party web page from the received request; and
  accessing the site index at the chat driven artificial intelligence system with the URL to determine the concept associated with the third party web page.

18. The method of claim 14, wherein the first content or second content is associated with a publisher of the third-party web page.

* * * * *